US 12,457,362 B2

(12) United States Patent
Iguchi et al.

(10) Patent No.: US 12,457,362 B2
(45) Date of Patent: Oct. 28, 2025

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Noritaka Iguchi, Osaka (JP); Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 106 days.

(21) Appl. No.: 17/509,249

(22) Filed: Oct. 25, 2021

(65) Prior Publication Data

US 2022/0046280 A1    Feb. 10, 2022

Related U.S. Application Data

(63) Continuation of application No. PCT/JP2020/018633, filed on May 8, 2020.

(60) Provisional application No. 62/846,047, filed on May 10, 2019.

(51) Int. Cl.
*H04N 19/597* (2014.01)
*H04N 19/46* (2014.01)

(52) U.S. Cl.
CPC .......... *H04N 19/597* (2014.11); *H04N 19/46* (2014.11)

(58) Field of Classification Search
None
See application file for complete search history.

(56) References Cited

U.S. PATENT DOCUMENTS

| 9,466,143 | B1 * | 10/2016 | Walvoord | ............... G06T 7/579 |
| 9,595,976 | B1 * | 3/2017 | Hemmer | ............. H03M 7/4006 |
| 9,633,473 | B2 * | 4/2017 | Tian | ....................... H04N 19/91 |
| 10,403,037 | B1 * | 9/2019 | Boardman | ............. G06V 10/17 |
| 10,650,590 | B1 * | 5/2020 | Topiwala | ................. H04L 67/61 |
| 10,930,069 | B1 * | 2/2021 | Jackson | .................. G06T 17/20 |
| 11,651,523 | B2 * | 5/2023 | Aflaki | ..................... H04N 19/85 |
| | | | | 382/242 |
| 2014/0375638 | A1 | 12/2014 | Tomaru et al. | |
| 2016/0086353 | A1 * | 3/2016 | Lukac | ....................... G06T 9/00 |
| | | | | 345/419 |

(Continued)

FOREIGN PATENT DOCUMENTS

| CA | 3078455 A1 * | 5/2019 | ............... G06T 1/00 |
| EP | 3468182 A1 * | 4/2019 | ............. G06T 15/04 |

(Continued)

OTHER PUBLICATIONS

International Search Report issued Jun. 30, 2020 in International (PCT) Application No. PCT/JP2020/018633.

*Primary Examiner* — Stefan Gadomski
(74) *Attorney, Agent, or Firm* — Wenderoth, Lind & Ponack, L.L.P.

(57) ABSTRACT

A three-dimensional data encoding method includes: encoding point cloud data to generate encoded data; and generating a bitstream including the encoded data. The bitstream includes first information indicating a sensor corresponding to the point cloud data.

18 Claims, 45 Drawing Sheets

(56) References Cited

U.S. PATENT DOCUMENTS

| | | | |
|---|---|---|---|
| 2016/0163031 A1* | 6/2016 | Gordon | G06T 15/205 |
| | | | 348/46 |
| 2016/0266256 A1 | 9/2016 | Allen et al. | |
| 2017/0347122 A1* | 11/2017 | Chou | G06T 17/005 |
| 2018/0137224 A1* | 5/2018 | Hemmer | G06F 3/0673 |
| 2018/0137653 A1* | 5/2018 | Hemmer | G06T 9/40 |
| 2018/0261020 A1* | 9/2018 | Petousis | G07C 5/0841 |
| 2018/0268570 A1* | 9/2018 | Budagavi | G06T 9/001 |
| 2018/0278956 A1 | 9/2018 | Toma et al. | |
| 2018/0338017 A1* | 11/2018 | Mekuria | H04L 67/1097 |
| 2018/0349715 A1* | 12/2018 | Gupta | G08G 1/0129 |
| 2019/0108654 A1* | 4/2019 | Lasserre | G06T 9/001 |
| 2019/0108655 A1* | 4/2019 | Lasserre | G06T 17/00 |
| 2019/0114830 A1* | 4/2019 | Bouazizi | G06F 3/013 |
| 2019/0122393 A1* | 4/2019 | Sinharoy | G06T 9/001 |
| 2019/0139266 A1* | 5/2019 | Budagavi | G06T 9/001 |
| 2019/0197739 A1* | 6/2019 | Sinharoy | G06T 7/55 |
| 2019/0304139 A1* | 10/2019 | Joshi | G06T 9/001 |
| 2019/0311500 A1* | 10/2019 | Mammou | G06T 9/001 |
| 2019/0313110 A1* | 10/2019 | Mammou | G06T 7/248 |
| 2019/0318488 A1* | 10/2019 | Lim | H04N 21/8547 |
| 2019/0318509 A1* | 10/2019 | Budagavi | G06F 18/23 |
| 2020/0018606 A1* | 1/2020 | Wolcott | G01C 21/3819 |
| 2020/0045292 A1* | 2/2020 | Boyce | H04N 13/275 |
| 2020/0228836 A1* | 7/2020 | Schwarz | G06T 17/10 |
| 2020/0242811 A1 | 7/2020 | Wang et al. | |
| 2020/0244993 A1* | 7/2020 | Schwarz | H04N 13/194 |
| 2020/0302237 A1* | 9/2020 | Hennings Yeomans | G06V 20/56 |
| 2020/0359035 A1* | 11/2020 | Chevet | H04N 19/182 |
| 2020/0359053 A1* | 11/2020 | Yano | H04N 19/186 |
| 2020/0380765 A1* | 12/2020 | Thudor | G06T 15/04 |
| 2020/0389639 A1* | 12/2020 | Rhyu | G06T 3/00 |
| 2021/0006806 A1* | 1/2021 | Schwarz | H04N 19/597 |
| 2021/0014293 A1* | 1/2021 | Yip | H04N 19/91 |
| 2021/0112277 A1* | 4/2021 | Ricard | G06T 17/00 |
| 2021/0152849 A1* | 5/2021 | Guede | H04N 19/132 |
| 2021/0176496 A1* | 6/2021 | Chupeau | H04N 19/65 |
| 2021/0183109 A1* | 6/2021 | Chevet | H04N 19/597 |
| 2021/0192796 A1* | 6/2021 | Aflaki Beni | G06T 9/40 |
| 2021/0241496 A1* | 8/2021 | Pesonen | H04N 19/137 |
| 2021/0250600 A1* | 8/2021 | Kuma | G06T 9/00 |
| 2021/0385454 A1* | 12/2021 | Fleureau | H04N 19/124 |
| 2023/0062296 A1* | 3/2023 | Ricard | G06T 9/001 |
| 2023/0132473 A1* | 5/2023 | Lee | H04N 13/366 |
| | | | 382/154 |

FOREIGN PATENT DOCUMENTS

| | | | | |
|---|---|---|---|---|
| JP | 2016-189184 | | 11/2016 | |
| WO | 2014/020663 | | 2/2014 | |
| WO | 2017/104115 | | 6/2017 | |
| WO | WO-2019013430 A1 | * | 1/2019 | G06T 9/001 |
| WO | 2019/078292 | | 4/2019 | |
| WO | WO-2019078696 A1 | * | 4/2019 | G06K 9/6202 |

* cited by examiner

| | GEOMETRY INFORMATION | ATTRIBUTE INFORMATION |
|---|---|---|
| n = 1 | $G(1) = (x_1, y_1, z_1)$ | $A(1) = (R_1, G_1, B_1)$ |
| n = 2 | $G(2) = (x_2, y_2, z_2)$ | $A(2) = (R_2, G_2, B_2)$ |
| ⋮ | ⋮ | ⋮ |
| n = N | $G(N) = (x_N, y_N, z_N)$ | $A(N) = (R_N, G_N, B_N)$ |

GENERAL SYNCHRONIZATION INFORMATION

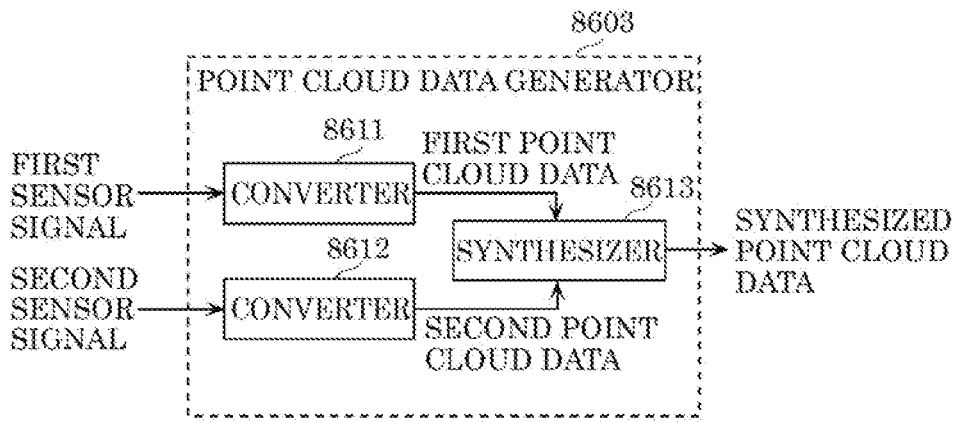

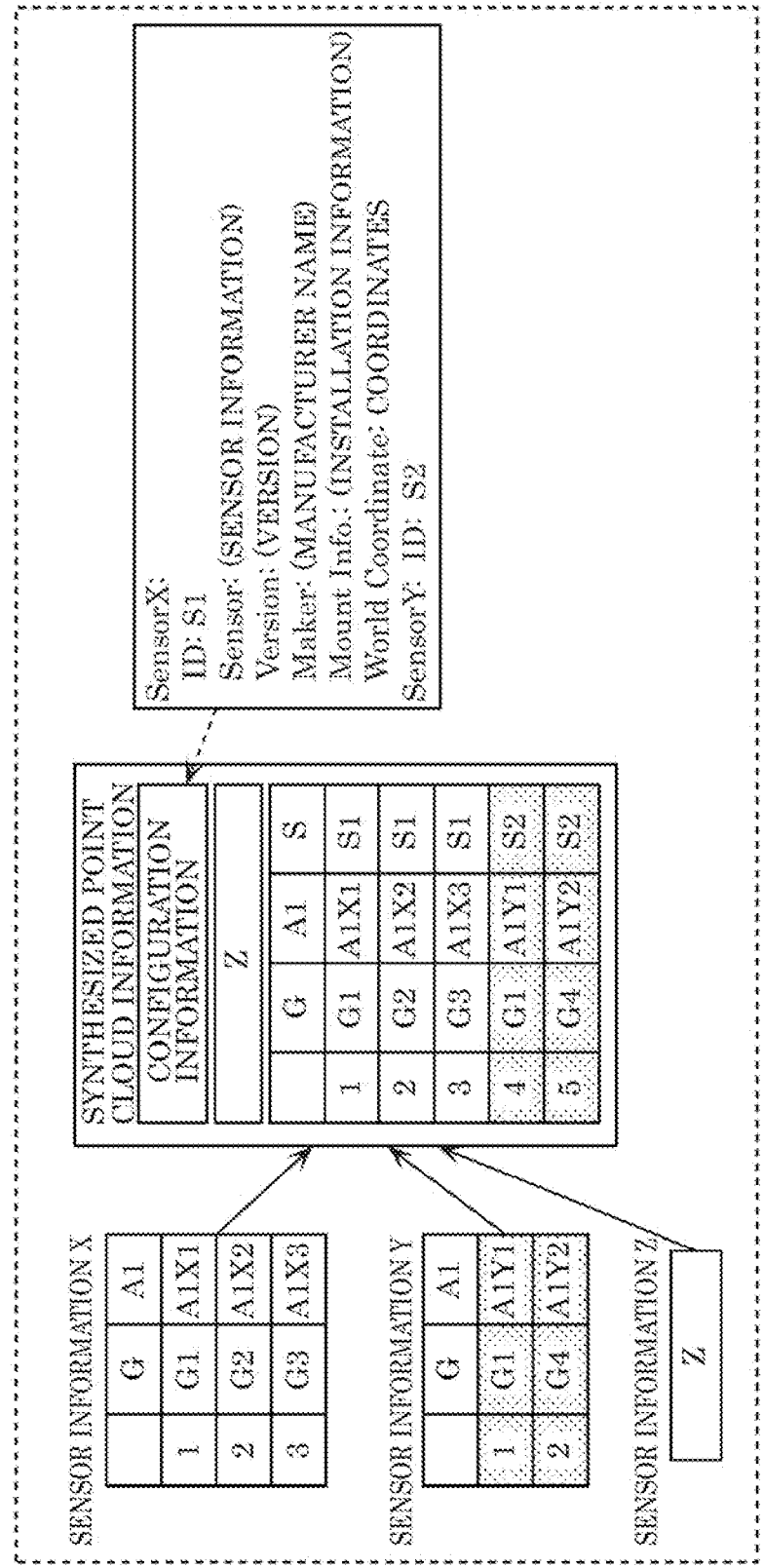

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a. U.S. continuation application of PCT International Patent Application Number PCT/JP2020/018633 filed on May 8, 2020, claiming the benefit of priority of U.S. Provisional Patent Application No. 62/846,047 filed on May 10, 2019, the entire contents of which are hereby incorporated by reference.

BACKGROUND

1. Technical Field

The present disclosure relates to a three-dimensional data encoding method, three-dimensional data decoding method, three-dimensional data encoding device, and three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced. Video Coding (MPEG-4 AVC) and High Efficiency Video Coding (HEVC) standardized by MPEG).

Meanwhile, point cloud compression is partially supported by for example, an open-source library (Point Cloud Library) for point cloud-related processing.

Furthermore, a technique for searching for and displaying a facility located in the surroundings of the vehicle by using three-dimensional map data is known (for example, see International Publication WO 2014/020663).

SUMMARY

For such point-cloud data, it is desired for the three-dimensional data decoding device that receives the point cloud data to be able to appropriately extract the point cloud data according to applications.

The present disclosure provides a three-dimensional data encoding method or a three-dimensional data encoding device that can generate a bitstream from which point cloud data can be appropriately extracted, or a three-dimensional data decoding method or a three-dimensional data decoding device that decodes the bitstream.

A three-dimensional data encoding method according to an aspect of the present disclosure includes: encoding point cloud data to generate encoded data; and generating a bitstream including the encoded data, wherein the bitstream includes first information indicating a sensor corresponding to the point cloud data.

A three-dimensional data decoding method according to an aspect of the present disclosure includes; decoding a bitstream including (i) encoded data generated by encoding point cloud data and (ii) first information indicating a sensor corresponding to the point cloud data, to obtain the first information and the point cloud data.

The present disclosure can provide a three-dimensional data encoding method or a three-dimensional data encoding device that can generate a bitstream from which point cloud data can be appropriately extracted, or a three-dimensional data decoding method or a three-dimensional data decoding device that decodes the bitstream.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 36 is a block diagram of a point cloud data generator according to Embodiment 2.

FIG. 37 is a diagram illustrating an example of information on three-dimensional points according to Embodiment 2.

FIG. 38 is a diagram illustrating an example of information on three-dimensional points according to Embodiment 2.

FIG. 39 is a diagram illustrating an example of information on three-dimensional points according to Embodiment 2.

FIG. 40 is a diagram for describing a synthesizing process according to Embodiment 2.

DETAILED DESCRIPTION OF THE EMBODIMENT

Figure 1:
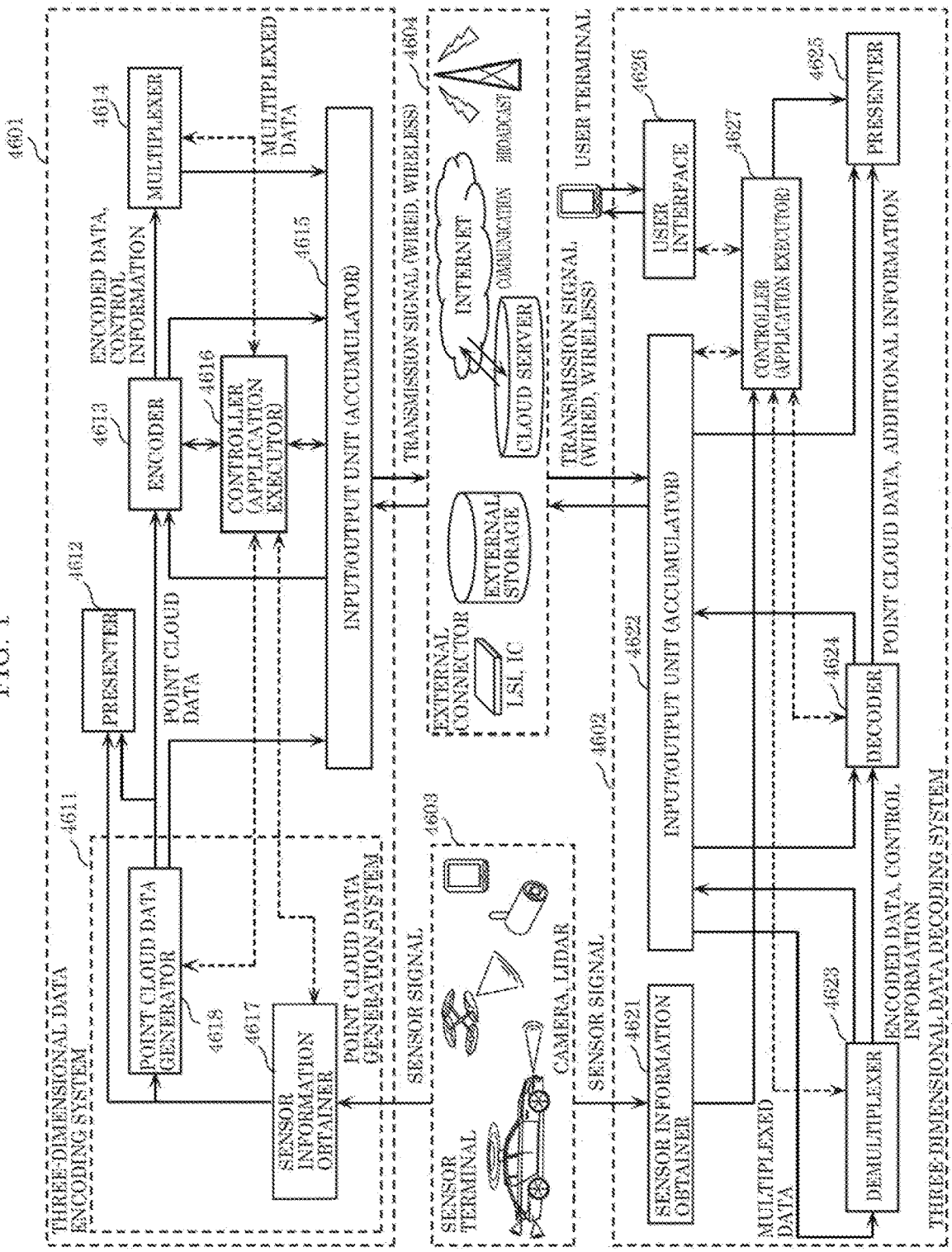
FIG. 1 is a diagram illustrating a configuration of a three-dimensional data encoding and decoding system according to Embodiment 1.

A three-dimensional data encoding method according to an aspect of the present disclosure includes: encoding point cloud data to generate encoded data; and generating a bitstream including the encoded data. The bitstream includes first information indicating a sensor corresponding to the point cloud data.

According to this, the three-dimensional data decoding device can extract the point cloud data obtained by a desired sensor by using the first information. Therefore, the three-dimensional data encoding method can generate a bitstream from which the point cloud data can be appropriately extracted.

For example, the first information may include items of second information respectively generated for three-dimensional points included in the point cloud data, the items of second information each indicating a sensor corresponding to the three-dimensional point for which the item of second information was generated.

For example, the point cloud data may include, for each of the three-dimensional points, geometry information and one or more items of attribute information, and the items of second information may each be included in the encoded data as one of the one or more items of attribute information of a corresponding one of the three-dimensional points.

For example, the bitstream may include third information which is common to the three-dimensional points, the items of second information may be identifiers of the sensors, and the third information may include fourth information indicating a relationship between the identifiers of the sensors and the sensors.

For example, the bitstream may include third information which is common to the three-dimensional points, and the third information may indicate a total number of three-dimensional points, among the three-dimensional points, for each of the sensors.

For example, the point cloud data may include, for each of the three-dimensional points, geometry information and one or more items of attribute information, and the first information may indicate one or more sensors respectively corresponding to the one or more items of attribute information.

For example, the three-dimensional data encoding method may further include synthesizing first point cloud data which is based on a first sensor and second point cloud data which is based on a second sensor to generate the point-cloud data. In the synthesizing, when attribute information of a first point having same geometry information is included in the first point cloud data and the second point cloud data, attribute information based on (i) the attribute information of the first point included in the first point cloud data and (ii) the attribute information of the first point included in the second point cloud data may be generated as synthesized attribute information, and the first information may indicate that information of the first point included in the point cloud data is based on the first sensor and the second sensor.

For example, in the encoding of the point cloud data: the point cloud data may be divided into first point cloud data which is based on a first sensor and second point cloud data which is based on a second sensor; and the first point cloud data and the second point cloud data may be encoded to generate the encoded data. The bitstream may include first control information for the first point cloud data and second control information for the second point cloud data. The first information may include (i) information included in the first control information and indicating a sensor corresponding to the first point cloud data and (ii) information included in the second control information and indicating a sensor corresponding to the second point cloud data.

For example, in the encoding of the point cloud data: the point cloud data may be divided into first point cloud data which is based on a first sensor and second point cloud data which is based on the second sensor; and the first point cloud data and the second point cloud data may be encoded to generate the encoded data. The bitstream may include control information which is common to the first point cloud data and the second point cloud data, and the first information may be included in the control information.

A three-dimensional data decoding method according to an aspect of the present disclosure includes decoding a bitstream including (i) encoded data generated by encoding point cloud data and (ii) first information indicating a sensor corresponding to the point cloud data, to obtain the first information and the point cloud data.

According to this, the three-dimensional data decoding method can obtain the point cloud data by decoding the bitstream from which the point cloud data can be appropriately extracted.

For example, the first information may include items of second information respectively generated for three-dimensional points included in the point cloud data, the items of second information each indicating a sensor corresponding to the three-dimensional point for which the item of second information was generated.

For example, the point cloud data may include, for each of the three-dimensional points, geometry information and one or more items of attribute information, and the items of second information may each be included in the encoded data as one of the one or more items of attribute information of a corresponding one of the three-dimensional points.

For example, the bitstream may include third information which is common to the three-dimensional points, the items of second information may be identifiers of the sensors, and the third information may include fourth information indicating a relationship between the identifiers of the sensors and the sensors.

For example, the bitstream may include third information which is coniniori to the three-dimensional points, and the third information may indicate a total number of three-dimensional points, among the three-dimensional points, for each of the sensors.

For example, the point cloud data may include, for each of the three-dimensional points, geometry information and one or more items of attribute information, and the first information may indicate one or more sensors respectively corresponding to the one or more items of attribute information.

For example, the point cloud data may be generated by synthesizing first point cloud data which is based on a first sensor and second point cloud data which is based on a second sensor. In the synthesizing, when attribute information of a first point having same geometry information is included in the first point cloud data and the second point cloud data, information based on (i) the attribute information of the first point included in the first point cloud data and (ii) the attribute information of the first point included in the second point cloud data may be generated as synthesized attribute information, and the first information may indicate that information of the first point included in the point cloud data is based on the first sensor and the second sensor.

For example, the encoded data may be generated by dividing the point cloud data into first point cloud data which is based on a first sensor and second point cloud data which is based on a second sensor, and encoding the first point cloud data and the second point cloud data. The bitstream may include first control information for the first point cloud data and second control information for the second point cloud data. The first information may include (i) information included in the first control information and indicating a sensor corresponding to the first point cloud data and (i) information included in the second control information and indicating a sensor corresponding to the second point cloud data.

For example, the encoded data may be generated by dividing the point cloud data into first point cloud data which is based on a first sensor and second point cloud data which is based on a second sensor, and encoding the first point cloud data and the second point cloud data. The bitstream may include control information which is common to the first point cloud data and the second point cloud data, and the first information may be included in the control information.

For example, a three-dimensional data encoding device according to an aspect of the present disclosure includes: a processor; and memory. Using the memory, the processor: encodes point cloud data to generate encoded data; and generates a bitstream including the encoded data. The bitstream includes first information indicating a sensor corresponding to the point cloud data.

According to this, the three-dimensional data decoding device can extract the point cloud data obtained by a desired sensor by using the first information. Therefore, the three-dimensional data encoding device can generate a bitstream from which the point cloud data can be appropriately extracted.

Furthermore, a three-dimensional data decoding device according to an aspect of the present disclosure includes: a processor; and memory. Using the memory the processor: decodes a bitstream including (i) encoded data generated by encoding point cloud data and (ii) first information indicating a sensor corresponding to the point cloud data, to obtain the first information and the point cloud data.

According to this, the three-dimensional data decoding device can obtain the point cloud data by decoding the bitstream from which the point cloud data can be appropriately extracted.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. Note that each of the following embodiments show a specific example of the present disclosure. The numerical values, shapes, materials, structural components, the arrangement and connection of the structural components, steps, the processing order of the steps, etc. shown in the following embodiments are mere examples, and thus are not intended to limit the present disclosure. Of the structural components described in the following embodiments, structural components not recited in any one of the independent claims will be described as optional structural components.

Embodiment 1

A configuration of a three-dimensional data (point cloud data) encoding and decoding system according to this embodiment will be first described. FIG. 1 is a diagram showing an example of a configuration of the three-dimensional data encoding and decoding system according to this embodiment. As shown in FIG. 1, the three-dimensional data encoding and decoding system includes three-dimensional data encoding system 4601, three-dimensional data decoding system 4602, sensor terminal 4603, and external connector 4604. Three-dimensional data encoding system 4601 generates encoded data or multiplexed data by encoding point cloud data, which is three-dimensional data. Three-dimensional data encoding system 4601 may be a three-dimensional data encoding device implemented by a single device or a system implemented by a plurality of devices. The three-dimensional data encoding device may include a part of a plurality of processors included in three-dimensional data encoding system 4601.

Three-dimensional data encoding system 4601 includes point cloud data generation system 4611, presenter 4612, encoder 4613, multiplexer 4614, input/output unit 4615, and controller 4616. Point cloud data generation system 4611 includes sensor information obtainer 4617, and point cloud data generator 4618.

Sensor information obtainer 4617 obtains sensor information from sensor terminal 4603, and outputs the sensor information to point cloud data generator 4618. Point cloud data generator 4618 generates point cloud data from the sensor information, and outputs the point cloud data to encoder 4613.

Presenter 4612 presents the sensor information or point cloud data to a user. For example, presenter 4612 displays information or an image based on the sensor information or point cloud data.

Encoder 4613 encodes (compresses) the point cloud data, and outputs the resulting encoded data, control information (signaling information) obtained in the course of the encoding, and other additional information to multiplexer 4614. The additional information includes the sensor information, for example.

Multiplexer 4614 generates multiplexed data by multiplexing the encoded data, the control information, and the additional information input thereto from encoder 4613. A format of the multiplexed data is a file format for accumulation or a packet format for transmission, for example.

Input/output unit 4615 (a communication unit or interface, for example) outputs the multiplexed data to the outside. Alternatively the multiplexed data may be accumulated in an accumulator, such as an internal memory. Controller 4616 (or an application executor) controls each processor. That is, controller 4616 controls the encoding, the multiplexing, or other processing.

Note that the sensor information may be input to encoder 4613 or multiplexer 4614. Alternatively input/output unit 4615 may output the point cloud data or encoded data to the outside as it is.

A transmission signal (multiplexed data) output from three-dimensional data encoding system 4601 is input to three-dimensional data decoding system 4602 via external connector 4604.

Three-dimensional data decoding system 4602 generates point cloud data, which is three-dimensional data, by decoding the encoded data or multiplexed data. Note that three-dimensional data decoding system 4602 may be a three-dimensional data decoding device implemented by a single device or a system implemented by a plurality of devices. The three-dimensional data decoding device may include a part of a plurality of processors included in three-dimensional data decoding system 4602.

Three-dimensional data decoding system 4602 includes sensor information obtainer 4621, input/output unit 4622, demultiplexer 4623, decoder 4624, presenter 4625, user interface 4626, and controller 4627.

Sensor information obtainer 4621 obtains sensor information from sensor terminal 4603.

Input/output unit 4622 obtains the transmission signal, decodes the transmission signal into the multiplexed data (file format or packet), and outputs the multiplexed data to demultiplexer 4623.

Demultiplexer 4623 Obtains the encoded data, the control information, and the additional information from the multiplexed data, and outputs the encoded data, the control information, and the additional information to decoder 4624.

Decoder 4624 reconstructs the point cloud data by decoding the encoded data.

Presenter 4625 presents the point cloud data to a user. For example, presenter 4625 displays information or an image based on the point cloud data. User interface 4626 obtains an indication based on a manipulation by the user. Controller 4627 (or an application executor) controls each processor. That is, controller 4627 controls the demultiplexing, the decoding, the presentation, or other processing.

Note that input/output unit 4622 may obtain the point cloud data or encoded data as it is from the outside. Presenter 4625 may obtain additional information, such as sensor information, and present information based on the additional information. Presenter 4625 may perform a presentation based on an indication from a user obtained on user interface 4626.

Sensor terminal 4603 generates sensor information, which is information obtained by a sensor. Sensor terminal 4603 is a terminal provided with a sensor or a camera. For example, sensor terminal 4603 is a mobile body such as an automobile, a flying object, such as an aircraft, a mobile terminal, or a camera.

Sensor information that can be generated by sensor terminal 4603 includes (1) the distance (geometry information)

between sensor terminal 4603 and an object, color, or the reflectance of the object obtained by LiDAR, a millimeter wave radar, or an infrared sensor or (2) the distance (geometry information) between a camera and an object, color, or the reflectance of the object obtained by a plurality of monocular camera images or a stereo-camera image, for example. The sensor information may include the posture, orientation, gyro (angular velocity), position (GPS information or altitude), velocity; acceleration of the sensor, or the acquisition time of the sensor information, for example. The sensor information may include air temperature, air pressure, air humidity, or magnetism, for example.

External connector 4604 is implemented by an integrated circuit (LSI or IC), an external accumulator, communication with a cloud server via the Internet, or broadcasting, for example.

Figures 2, 3:
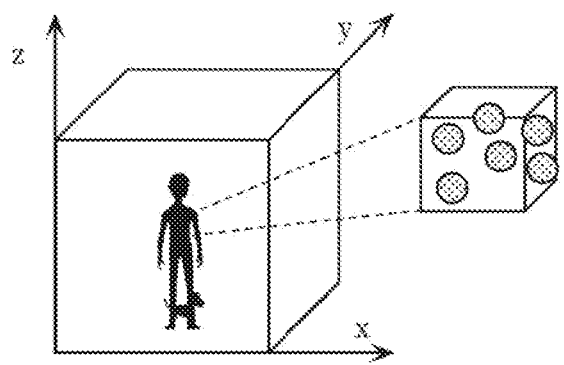
FIG. 2 is a diagram illustrating a structure example of point cloud data according to Embodiment 1.
FIG. 3 is a diagram illustrating a structure example of a data file indicating the point cloud data according to Embodiment 1.

Next, point cloud data will be described FIG. 2 is a diagram showing a configuration of point cloud data. FIG. 3 is a diagram showing a configuration example of a data file describing information of the point cloud data.

Point cloud data includes data on a plurality of points. Data on each point includes geometry information (three-dimensional coordinates) and attribute information associated with the geometry information. A set of a plurality of such points is referred to as a point cloud. For example, a point cloud indicates a three-dimensional shape of an object.

Geometry information (position), such as three-dimensional coordinates, may be referred to as geometry. Data on each point may include attribute information (attribute) on a plurality of types of attributes. A type of attribute is color or reflectance, for example.

One piece of attribute information may be associated with one piece of geometry information, or attribute information on a plurality of different types of attributes may be associated with one piece of geometry information. Alternatively a plurality of pieces of attribute information on the same type of attribute may be associated with one piece of geometry information.

The configuration example of a data file shown in FIG. 3 is an example in which geometry information and attribute information are associated with each other in a one-to-one relationship, and geometry information and attribute information on N points forming point cloud data are shown.

The geometry information is information on three axes, specifically an x-axis, a y-axis, and a z-axis, for example. The attribute information is RGB color information, for example. A representative data file is ply file, for example.

Figure 4:
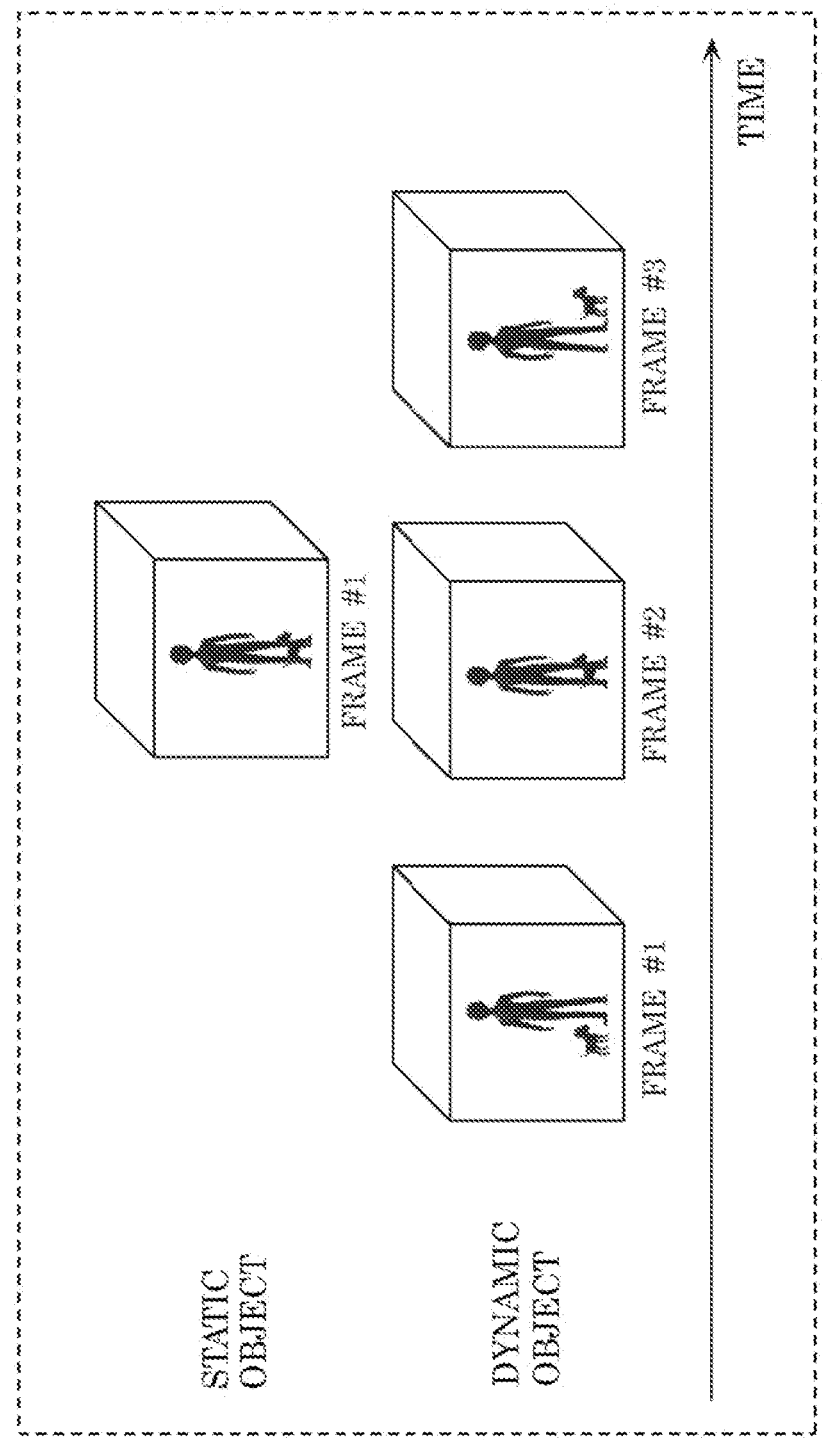
FIG. 4 is a diagram illustrating types of the point cloud data according to Embodiment 1.

Next, types of point cloud data will be described. FIG. 4 is a diagram showing types of point cloud data. As shown in FIG. 4, point cloud data includes a static object and a dynamic object.

The static object is three-dimensional point cloud data at an arbitrary time (a time point). The dynamic object is three-dimensional point cloud data that varies with time. In the following, three-dimensional point cloud data associated with a time point will be referred to as a PCC frame or a frame.

The object may be a point cloud whose range is limited to some extent, such as ordinary video data, or may be a large point cloud whose range is not limited, such as map information.

There are point cloud data having varying densities. There may be sparse point cloud data and dense point cloud data.

In the following, each processor will be described in detail. Sensor information is obtained by various means, including a distance sensor such as LiDAR or a range finder, a stereo camera, or a combination of a Plurality of monocular cameras. Point cloud data generator 4618 generates point cloud data based on the sensor information obtained by sensor information obtainer 4617. Point cloud data generator 4618 generates geometry information as point cloud data, and adds attribute information associated with the geometry information to the geometry information.

When generating geometry information or adding attribute information, point cloud data generator 4618 may process the point cloud data. For example, point cloud data generator 4618 may reduce the data amount by omitting a point cloud whose position coincides with the position of another point cloud. Point cloud data generator 4618 may also convert the geometry information (such as shifting, rotating or normalizing the position) or render the attribute information.

Note that, although FIG. 1 shows point cloud data generation system 4611 as being included in three-dimensional data encoding system 4601, point cloud data generation system 4611 may be independently provided outside three-dimensional data encoding system 4601.

Encoder 4613 generates encoded data by encoding point cloud data according to an encoding method previously defined. In general, there are the two types of encoding methods described below. One is an encoding method using geometry information, which will be referred to as a first encoding method, hereinafter. The other is an encoding method using a video codec, which will be referred to as a second encoding method, hereinafter.

Decoder 4624 decodes the encoded data into the point cloud data using the encoding method previously defined.

Multiplexer 4614 generates multiplexed data by multiplexing the encoded data in an existing multiplexing method. The generated multiplexed data is transmitted or accumulated. Multiplexer 4614 multiplexes not only the PCC-encoded data but also another medium, such as a video, an audio, subtitles, an application, or a file, or reference time information. Multiplexer 4614 may further multiplex attribute information associated with sensor information or point cloud data.

Multiplexing schemes or file formats include ISOBMFF, MPEG-DASH, which is a transmission scheme based on ISOBMFF, MMT, MPEG-2 TS Systems, or RMP for example.

Demultiplexer 4623 extracts PCC-encoded data, other media, time information and the like from the multiplexed data.

Input/output unit 4615 transmits the multiplexed data in a method suitable for the transmission medium or accumulation medium, such as broadcasting or communication. Input/output unit 4615 may communicate with another device over the Internet or communicate with an accumulator, such as a cloud server.

As a communication protocol, http, ftp, TCP, UDP, IP, or the like is used. The pull communication scheme or the push communication scheme can be used.

A wired transmission or a wireless transmission can be used. For the wired transmission, Ethernet (registered trademark), USB, RS-232C, HDMI (registered trademark), or a coaxial cable is used, for example. For the wireless transmission, 3G/4G/5G of the 3rd Generation Partnership Project (3GPP) prescribed in the Institute of Electrical and Electronics Engineers (IEEE), wireless local area network (LAN), Wi-Fi (registered trademark), Bluetooth (registered trademark), or a millimeter wave is used, for example.

As a broadcasting scheme, DVB-T2, DVB-S2, DVB-C2, ATS3.0, or ISDB-S3 is used, for example.

Figure 5:
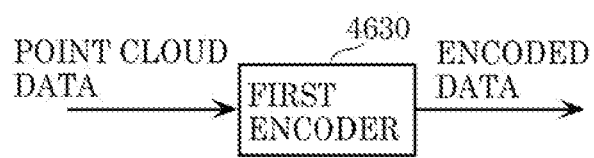
FIG. 5 is a diagram illustrating a structure of a first encoder according to Embodiment 1.
Figure 6:
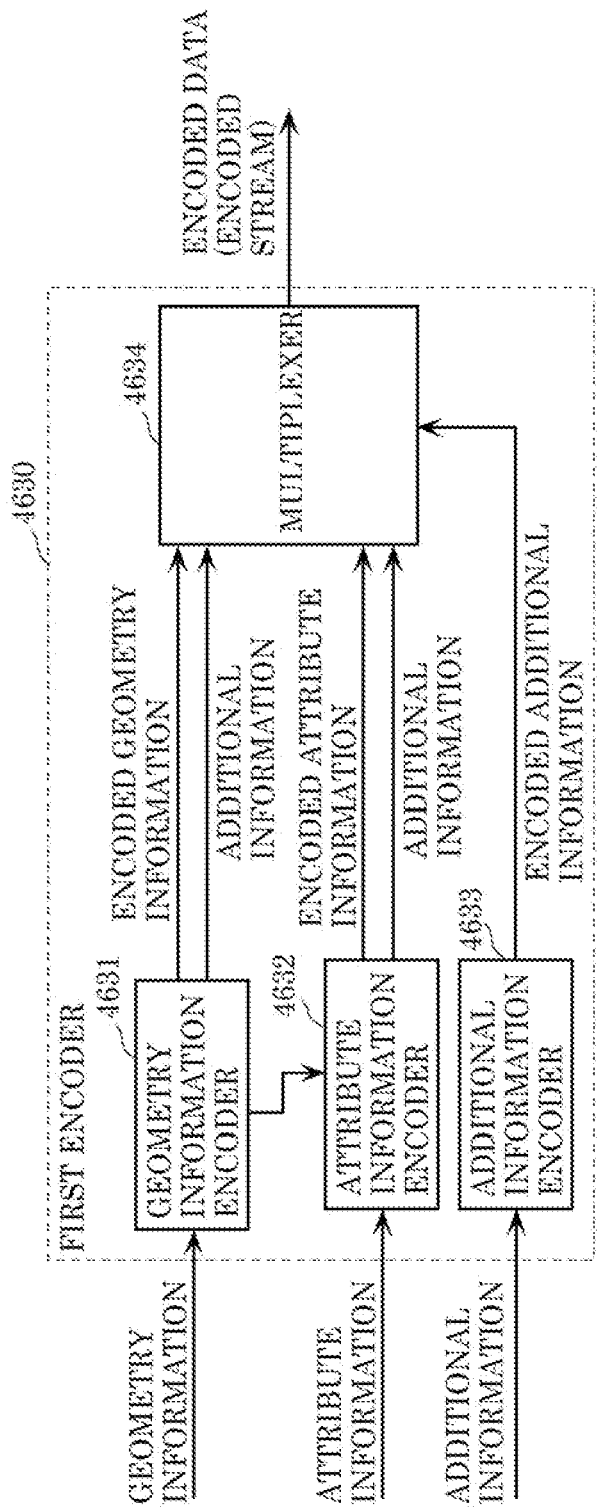
FIG. 6 is a block diagram illustrating the first encoder according to Embodiment 1.

FIG. 5 is a diagram showing a configuration of first encoder 4630, which is an example of encoder 4613 that performs encoding in the first encoding method. FIG. 6 is a block diagram showing first encoder 4630. First encoder 4630 generates encoded data (encoded stream) by encoding point cloud data in the first encoding method. First encoder 4630 includes geometry information encoder 4631, attribute information encoder 4632, additional information encoder 4633, and multiplexer 4634.

First encoder 4630 is characterized by performing encoding by keeping a three-dimensional structure in mind. First encoder 4630 is further characterized in that attribute information encoder 4632 performs encoding using information obtained from geometry information encoder 4631. The first encoding method is referred to also as geometry-based PCC (GPCC).

Point cloud data is PCC point cloud data like a PLY file or PCC point cloud data generated from sensor information, and includes geometry information (position), attribute information (attribute), and other additional information (metadata). The geometry information is input to geometry information encoder 4631, the attribute information is input to attribute information encoder 4632, and the additional information is input to additional information encoder 4633.

Geometry information encoder 4631 generates encoded geometry information (compressed geometry), which is encoded data, by encoding geometry information. For example, geometry information encoder 4631 encodes geometry information using an N-ary tree structure, such as an octree. Specifically, in the case of an octree, a current space is divided into eight nodes (subspaces), 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in each node becomes equal to or less than a threshold.

Attribute information encoder 4632 generates encoded attribute information (compressed attribute), which is encoded data, by encoding attribute information using configuration information generated by geometry information encoder 4631. For example, attribute information encoder 4632 determines a reference point (reference node) that is to be referred to in encoding a current point (current node) to be processed based on the octree structure generated by geometry information encoder 4631. For example, attribute information encoder 4632 refers to a node whose parent node in the octree is the same as the parent node of the current node, of peripheral nodes or neighboring nodes. Note that the method of determining a reference relationship is not limited to this method.

The process of encoding attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Additional information encoder 4638 generates encoded additional information (compressed metadata), which is encoded data, by encoding compressible data of additional information.

Multiplexer 4634 generates encoded stream (compressed stream), which is encoded data, by multiplexing encoded geometry information, encoded attribute information, encoded additional information, and other additional information. The generated encoded stream is output to a processor in a system layer (not shown).

Figure 7:
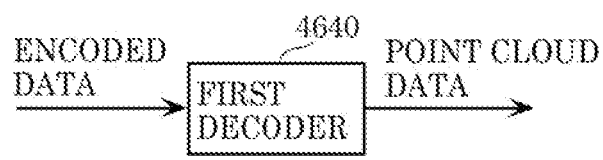
FIG. 7 is a diagram illustrating a structure of a first decoder according to Embodiment 1.
Figure 8:
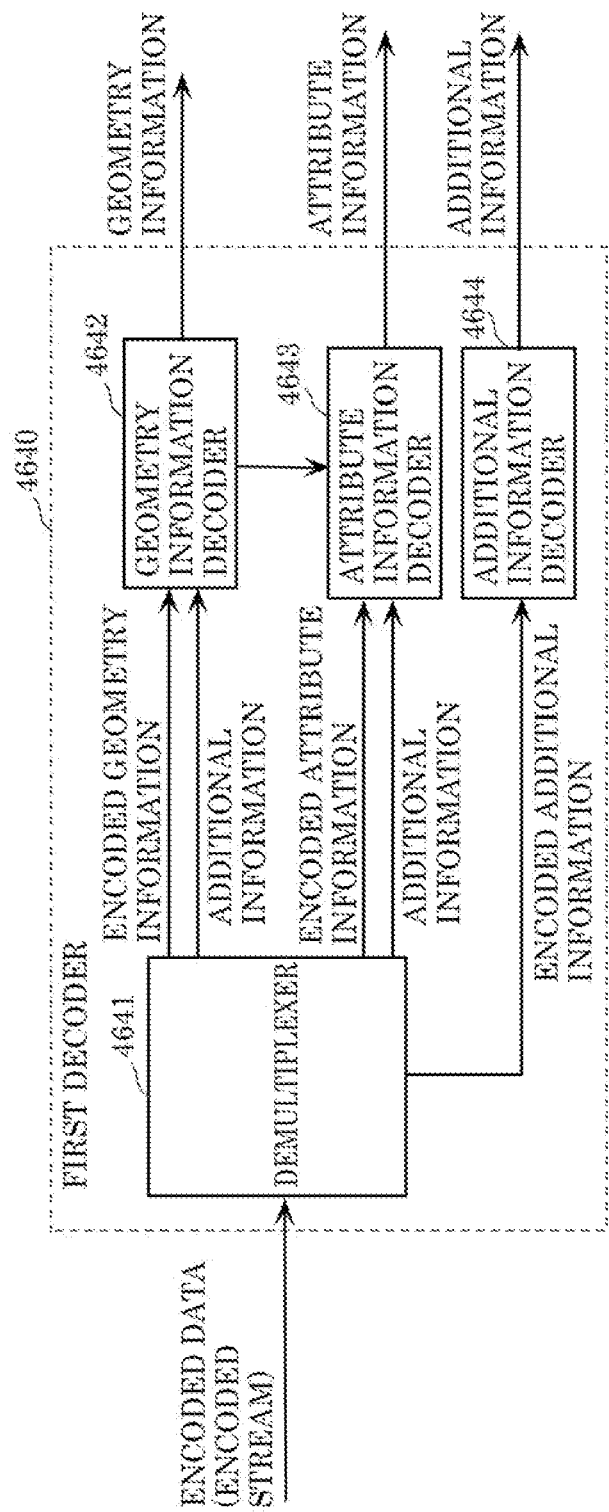
FIG. 8 is a block diagram illustrating the first decoder according to Embodiment 1.

Next, first decoder 4640, which is an example of decoder 4624 that performs decoding in the first encoding method, will be described. FIG. 7 is a diagram showing a configuration of first decoder 4640. FIG. 8 is a block diagram showing first decoder 4640. First decoder 4640 generates point cloud data by decoding encoded data (encoded stream) encoded in the first encoding method in the first encoding method. First decoder 4640 includes demultiplexer 4641, geometry information decoder 4642, attribute information decoder 4643, and additional information decoder 4644.

An encoded stream (compressed stream), which is encoded data, is input to first decoder 4640 from a processor in a system layer (not shown).

Demultiplexer 4641 separates encoded geometry information (compressed geometry), encoded attribute information (compressed attribute), encoded additional information (compressed metadata), and other additional information from the encoded data.

Geometry information decoder 4642 generates geometry information by decoding the encoded geometry information. For example, geometry information decoder 4642 restores the geometry information on a point cloud represented by three-dimensional coordinates from encoded geometry information represented by an N-ary structure, such as an octree.

Attribute information decoder 4643 decodes the encoded attribute information based on configuration information generated by geometry information decoder 4642. For example, attribute information decoder 4643 determines a reference point (reference node) that is to be referred to in decoding a current point (current node) to be processed based on the octree structure generated by geometry information decoder 4642. For example, attribute information decoder 4643 refers to a node whose parent node in the octree is the same as the parent node of the current node, of peripheral nodes or neighboring nodes. Note that the method of determining a reference relationship is not limited to this method.

The process of decoding attribute information may include at least one of an inverse quantization process, a prediction process, and an arithmetic decoding process. In this case, "refer to" means using a reference node for calculating a predicted value of attribute information or using a state of a reference node (occupancy information that indicates whether a reference node includes a point cloud or not, for example) for determining a parameter of decoding. For example, the parameter of decoding is a quantization parameter in the inverse quantization process or a context or the like in the arithmetic decoding.

Additional information decoder 4644 generates additional information by decoding the encoded additional information. First decoder 4640 uses additional information required for the decoding process for the geometry information and the attribute information in the decoding, and outputs additional information required for an application to the outside.

Figure 9:
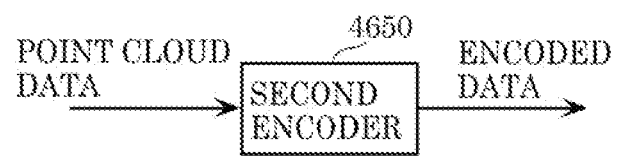
FIG. 9 is a diagram illustrating a structure of a second encoder according to Embodiment 1.
Figure 10:
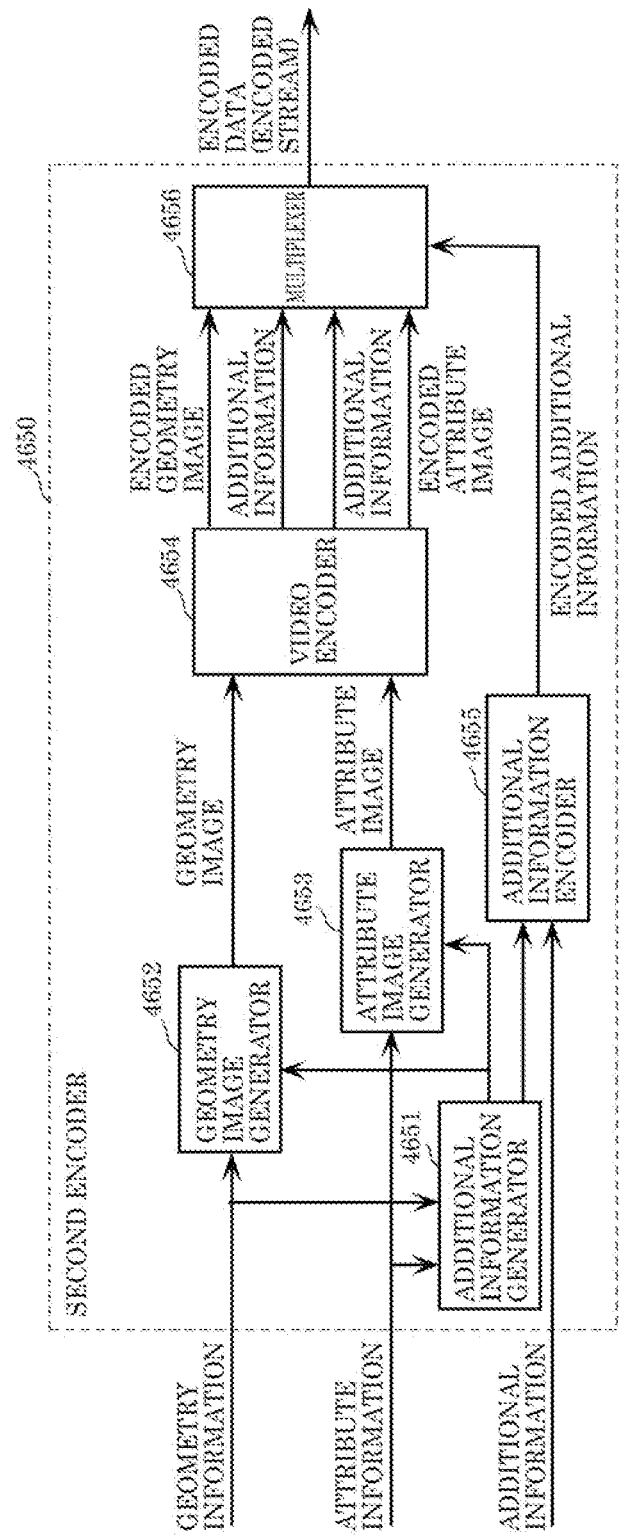
FIG. 10 is a block diagram illustrating the second encoder according to Embodiment 1.

Next, second encoder 4650, which is an example of encoder 4613 that performs encoding in the second encoding method, will be described. FIG. 9 is a diagram showing a configuration of second encoder 4650. FIG. 10 is a block diagram showing second encoder 4650.

Second encoder 4650 generates encoded data (encoded stream) by encoding point cloud data in the second encoding method. Second encoder 4650 includes additional information generator 4651, geometry image generator 4652, attribute image generator 4653, video encoder 4654, additional information encoder 4655, and multiplexer 4656.

Second encoder 4650 is characterized by generating a geometry image and an attribute image by projecting a three-dimensional structure onto a two-dimensional image, and encoding the generated geometry image and attribute image in an existing video encoding scheme. The second encoding method is referred to as video-based PCC (VPCC).

Point cloud data is PCC point cloud data like a PLY file or PCC point cloud data generated from sensor information, and includes geometry information (position), attribute information (attribute), and other additional information (metadata).

Additional information generator 4651 generates map information on a plurality of two-dimensional images by projecting a three-dimensional structure onto a two-dimensional image.

Geometry image generator 4652 generates a geometry image based on the geometry information and the map information generated by additional information generator 4651. The geometry image is a distance image in which distance (depth) is indicated as a pixel value, for example. The distance image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Attribute image generator 4653 generates an attribute image based on the attribute information and the map information generated by additional information generator 4651. The attribute image is an image in which attribute information (color (RGB), for example) is indicated as a pixel value, for example. The image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Video encoder 4654 generates an encoded geometry image (compressed geometry image) and an encoded attribute image (compressed attribute image), which are encoded data, by encoding the geometry image and the attribute image in a video encoding scheme. Note that, as the video encoding scheme, any well-known encoding method can be used. For example, the video encoding scheme is AVC or HEVC.

Additional information encoder 4655 generates encoded additional information (compressed metadata) by encoding the additional information, the map information and the like included in the point cloud data.

Multiplexer 4656 generates an encoded stream (compressed stream), which is encoded data, by multiplexing the encoded geometry image, the encoded attribute image, the encoded additional information, and other additional information. The generated encoded stream is output to a processor in a system layer (not shown).

Figure 11:
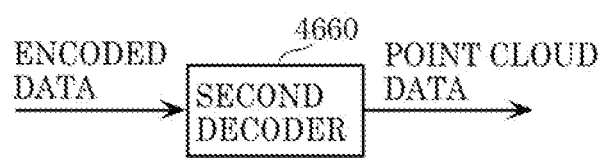
FIG. 11 is a diagram illustrating a structure of a second decoder according to Embodiment 1.
Figure 12:
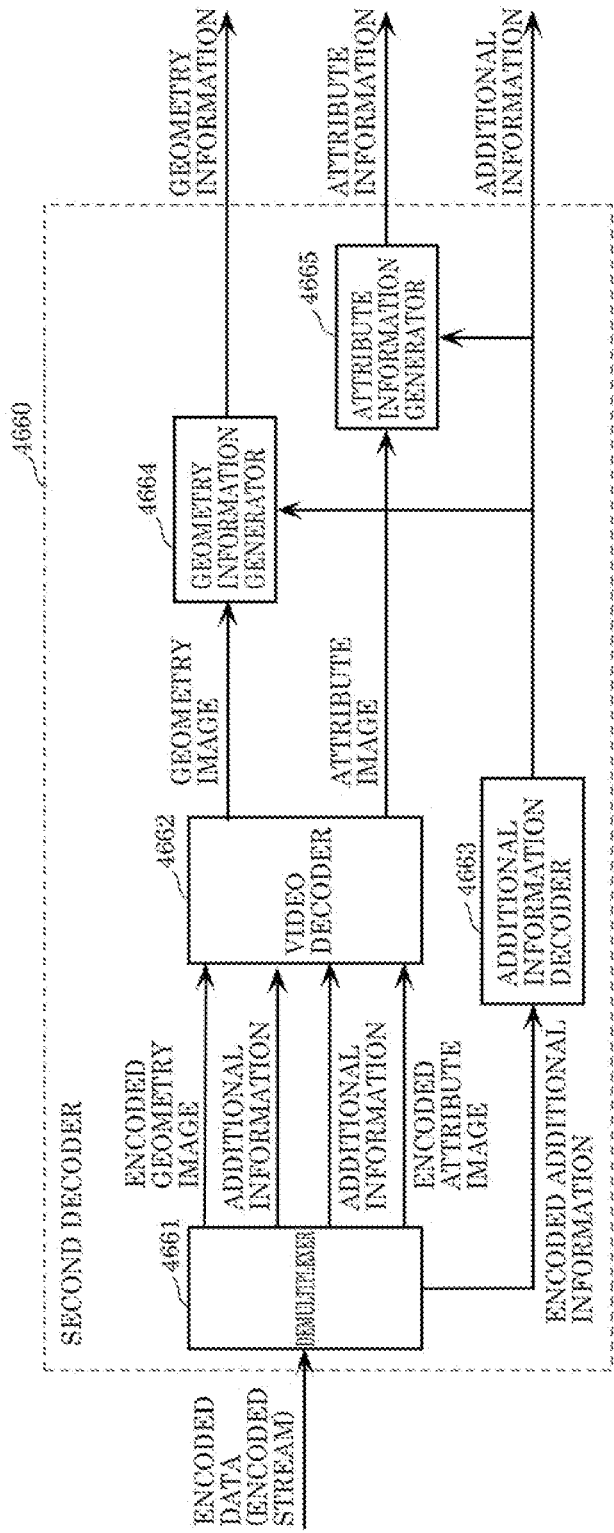
FIG. 12 is a block diagram illustrating the second decoder according to Embodiment 1.

Next, second decoder 4660, which is an example of decoder 4624 that performs decoding in the second encoding method, will be described. FIG. 11 is a diagram showing a configuration of second decoder 4660. FIG. 12 is a block diagram showing second decoder 4660. Second decoder 4660 generates point cloud data by decoding encoded data (encoded stream) encoded in the second encoding method in the second encoding method. Second decoder 4660 includes demultiplexer 4661, video decoder 4662, additional information decoder 4663, geometry information generator 4664, and attribute information generator 4665.

An encoded stream (compressed stream), which is encoded data, is input to second decoder 4660 from a processor in a system layer (not shown).

Demultiplexer 4661 separates an encoded geometry image (compressed geometry image), an encoded attribute image (compressed attribute image), an encoded additional information (compressed metadata), and other additional information from the encoded data.

Video decoder 4662 generates a geometry image and an attribute image by decoding the encoded geometry image and the encoded attribute image in a video encoding scheme. Note that, as the video encoding scheme, any well-known encoding method can be used. For example, the video encoding scheme is AVC or HEVC.

Additional information decoder 4663 generates additional information including map information or the like by decoding the encoded additional information.

Geometry information generator 4664 generates geometry information from the geometry image and the map information. Attribute information generator 4665 generates attribute information from the attribute image and the map information.

Second decoder 4660 uses additional information required for decoding in the decoding, and outputs additional information required for an application to the outside.

Figure 13:
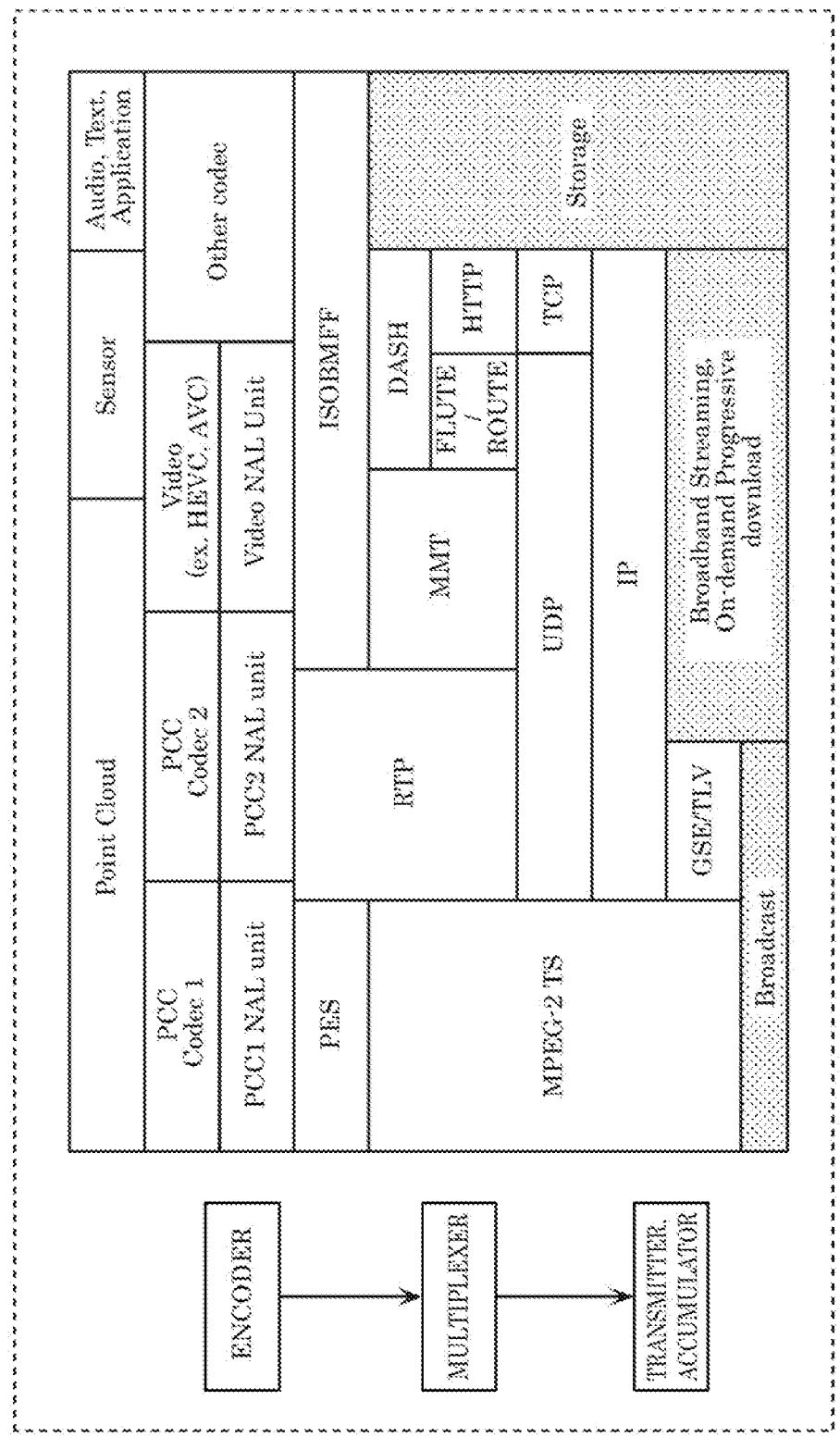
FIG. 13 is a diagram illustrating a protocol stack related to PCC encoded data according to Embodiment 1.

In the following, the PCC encoding scheme will be described. FIG. 13 is a diagram showing a protocol stack relating to PCC-encoded data, FIG. 13 shows an example in which PCC-encoded data is multiplexed with other medium data, such as a video (HEVC, for example) or an audio, or sensor information, and transmitted or accumulated.

A multiplexing scheme and a file format have a function of multiplexing various encoded data and transmitting or accumulating the data. To transmit or accumulate encoded data, the encoded data is converted into a format for the multiplexing scheme. For example, with HEVC, a technique for storing encoded data in a data structure referred to as a NAL unit and storing the NAL unit in ISOBMIFF is prescribed.

The same configuration is also assumed in the PCC. The sensor information may be PCC-encoded with point group data, may be encoded with another encoding method, may be directly stored in multiple layers without being encoded, or these can also be combined. Another encoding method is, specifically, another three-dimensional encoding method, or an encoding method that encodes data obtained by converting point group data to two-dimensional or one-dimensional data.

Figure 14:
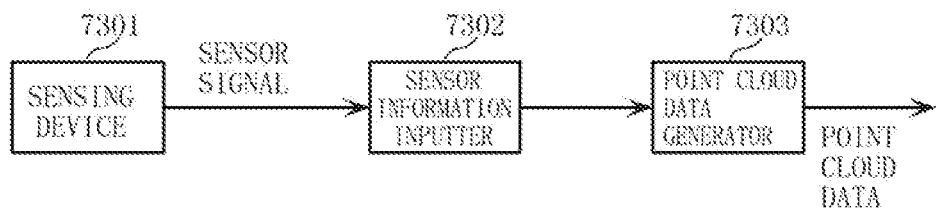
FIG. 14 is a diagram illustrating a configuration example of a point cloud data generation device according to Embodiment 1.
Figure 15:
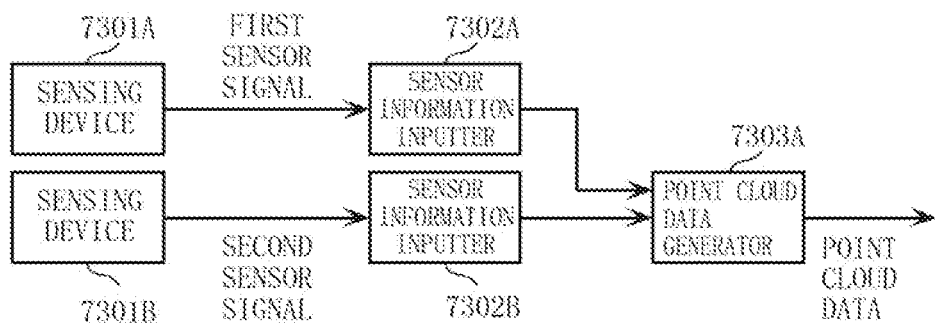
FIG. 15 is a diagram illustrating a configuration example of a point cloud data generation device according to Embodiment 1.
Figure 16:
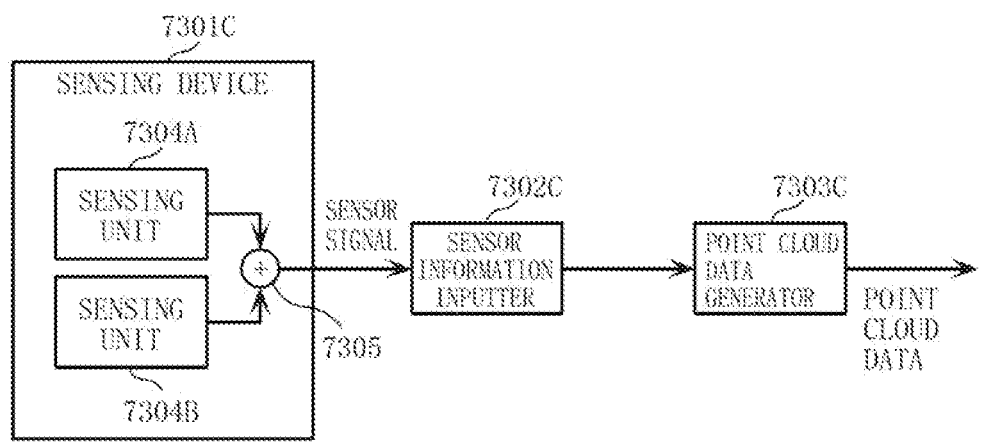
FIG. 16 is a diagram illustrating a configuration example of a point cloud data generation device according to Embodiment 1.

Hereinafter, an example of the configuration of generating point group data from the sensor signal (also called sensor information) will be described. FIG. 14 to FIG. 16 are diagrams each illustrating a configuration example of a point cloud data generation device that generates point group data from the sensor signal.

The point cloud data generation device illustrated in FIG. 14 generates point group data from the sensor signal obtained from one sensing device 7301. The point cloud data generation device illustrated in FIG. 14 includes sensing device 7301, sensor information inputter 7302, and point cloud data generator 7303. Sensor information inputter 7302 obtains the sensor signal obtained by sensing device 7301. Point cloud data generator 7303 generates point cloud data from the sensor signal obtained by sensor information inputter 7302. The generated point cloud data is output to, for example, a subsequent point cloud data encoder (not illustrated).

As illustrated in FIG. 15, point cloud data may be generated based on sensor signals obtained from two or more sensing devices. The point cloud data generation device illustrated in FIG. 15 includes sensing devices 7301A and 7301B, sensor information inputters 7302A and 7302B, and point cloud data generator 7303A. Sensor information inputter 7302A obtains a first sensor signal obtained by sensing device 7301A. Sensor information inputter 7302B obtains a second sensor signal obtained by sensing device 7301B. Point cloud data generator 7303A generates point cloud data from the two sensor signals obtained by sensor information inputters 7302A and 7302B. The generated point cloud data is output to, for example, a subsequent point cloud data encoder (not illustrated).

The point cloud data generation device illustrated in FIG. 16 includes sensing device 7301C, sensor information inputter 7302C, and point cloud data generator 7303C. Sensing device 7301C generates a sensor signal obtained by merging, with a predetermined method, two pieces of information that have been sensed by using two or more sensing methods. Sensing device 7301C includes sensing units 7304A and 7304B and merger 7305.

Sensing unit 7304A generates a first sensor signal with a first sensing method. Sensing unit 7304B generates a second sensor signal with a second sensing method. Merger 7305 merges the first sensor signal and the second sensor signal, and outputs the generated sensor signal to sensor information inputter 7302C.

Note that merger 7305 may select one of the first sensor signal and the second sensor signal based on a predetermined condition, and output the selected sensor signal. Additionally; when merging two sensor signals, merger 7305 may change a weight coefficient used for merging.

For example, merger 7305 may perform the determination of which sensor signal to select based on the obtained sensor signal, or based on another sensor signal.

For example, the first sensing method and the second sensing method may be different in the parameters of sensors, or may be different in the frequencies or mechanisms of sensing. Additionally, the sensor signal may also include the information indicating a sensing method, a parameter in sensing, or the like.

When switching between a plurality of sensing methods, merger 7305 may include, in the sensor signal, the information indicating which sensing method has been used, or the data of determination criteria for switching. When merging the sensor signals, merger 7305 may include, in the sensor signal, the information for identifying the merged sensing methods, the data of determination criteria for merging, or a merge coefficient.

Additionally, sensing device 7301C may output a plurality of sensor signals. In addition, sensing device 7301C may output the absolute value of the first sensor signal, and the difference value between the first sensor signal and the second sensor signal as the plurality of sensor signals.

Additionally, the sensor signal may also include the information indicating the relationship between the first sensing method and the second sensing method. For example, the sensor signal may include the absolute values or relative values of the reference position information of the first sensing method and the second sensing method, or may include the obtaining time of the sensor signal, reference time information, or the information indicating the angle of a sensor. Since, these pieces of information are included in the sensor signal, it becomes possible to correct the relationship between or synthesize the two sensor signals based on these pieces of information in a subsequent process.

Sensor information inputter 7302C obtains the sensor signal obtained by sensing device 7301C. Point cloud data generator 7303C generates point cloud data from the sensor signal obtained by sensor information inputter 7302C. The generated point cloud data is output to, for example, a subsequent point cloud data encoder (not illustrated).

In this manner, the point cloud data generation device generates point cloud data based on any one or two or more sensor signals of the above-described various sensor signals. Note that the point cloud data generation device may correct the geometry information or attribute information of points in the generation process of the point cloud data.

Note that the point cloud data generation device may have the configuration illustrated in any of FIG. 14 to FIG. 16, or may have a configuration in which a plurality of these are combined. Additionally the point cloud data generation device may use a fixed method, or may adaptively change the method to be used according to, for example, the object of sensing or the use case.

Figure 17:
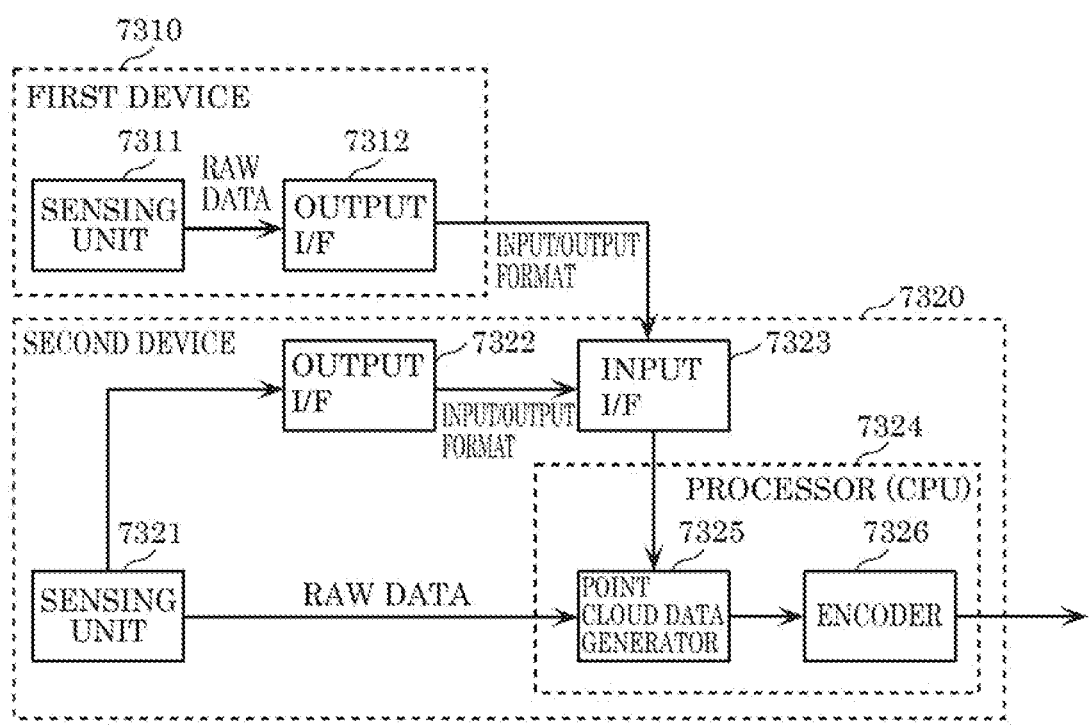
FIG. 17 is a diagram illustrating a configuration example of a point cloud data encoding system according to Embodiment 1.

Next, a configuration example of a point cloud data encoding system according to the present embodiment will be described. FIG. 17 is a diagram illustrating the configuration example of the point cloud data encoding system according to the present embodiment. The point cloud data encoding system illustrated in FIG. 17 includes first device 7310 and second device 7320.

First device 7310 includes sensing unit 7311 and output I/F (interface) 7312. Second device 7320 includes sensing unit 7321, output I/F 7322, input 7323, and processor 7324. Processor 7324 includes point cloud data generator 7325 and encoder 7326.

Sensing units 7311 or 7321 may be included in the same hardware or device as processor 7324 formed from a CPU and the like, or may be included in a different hardware or device.

Sensing unit 7321 is included in the same device (second device 7320) as processor 7324. In this case, the output signal (called RAW data) of sensing unit 7321 is directly input to point cloud data generator 7325.

Sensing unit 7311 is included in a different device (first device 7310) from processor 7324. In this case, RAW data that is output from sensing unit 7311 is converted to an input/output format (external output format) in output I/F 7312, and the formatted signal is input to second device 7320. Input UP 7328 included in second device 7320 converts the formatted signal to RAW data, and outputs the obtained RAW data to point cloud data generator 7325. Output I/F 7312 and input I/F 7323 have the functions of, for example, multiplexer 4614 and input/output unit 4615 illustrated in FIG. 1.

Additionally, the output signal (RAW data) from sensing unit 7321 included in the same device as processor 7324 may be converted to the input/output format by output I/F 7322, the signal formatted in input I/F 7323 may be converted to RAW data, and the obtained RAW data may be input to point cloud data generator 7325.

Additionally, in a case where a plurality of sensor signals are input, for example, when the sensor signal input from the other device and the sensor signal input from the same device are mixed, these sensor signals may be converted to the same format. Further, in conversion, each signal may be given an identifier that can specify the signal. For example, when transmission is performed by using the UDP (User Datagram Protocol), each signal may be identified with a transmission source address or transmission source port number of the IP (Internet Protocol) or the UDP. Accordingly, since the format input to point cloud data generator 7325 can be unified, the control of signals becomes easy.

Point cloud data generator 7325 generates point cloud data by using the input RAW data. Encoder 7326 encodes the generated point cloud data.

Figure 18:
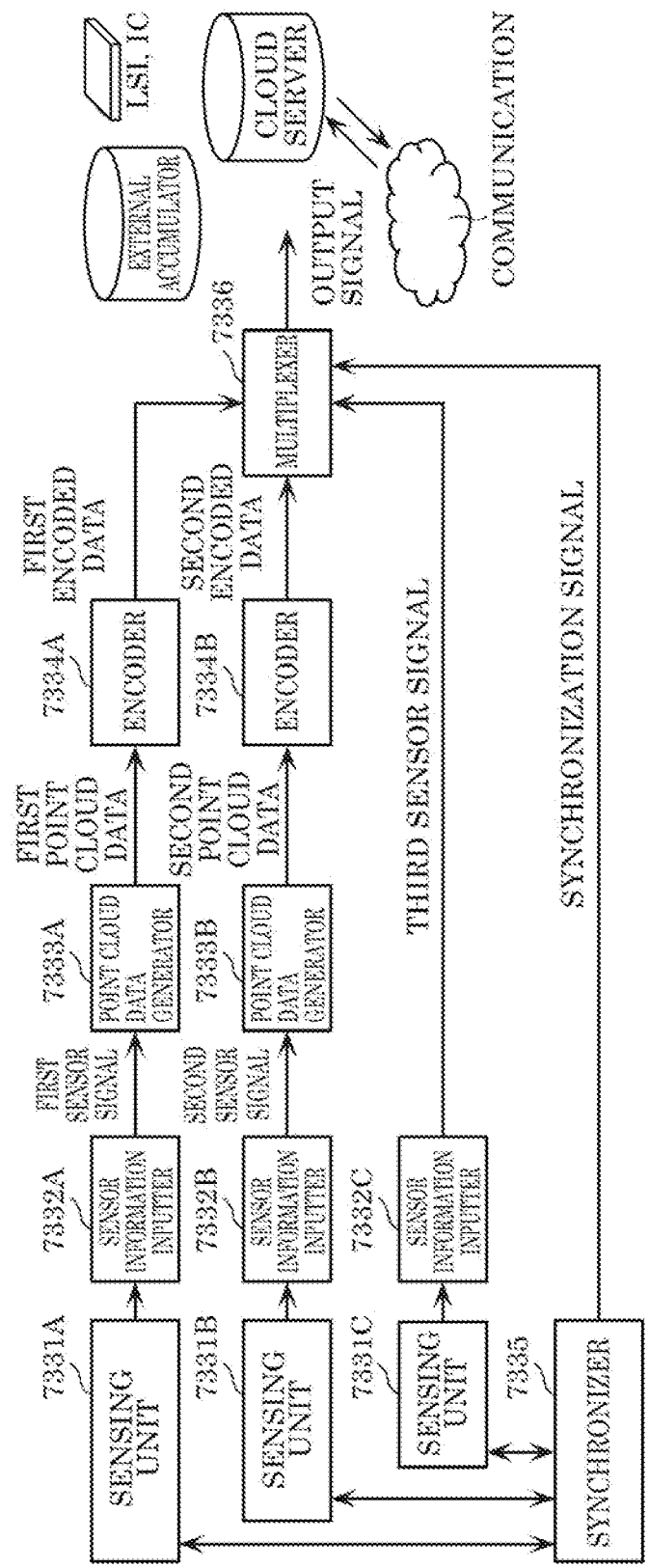
FIG. 18 is a diagram illustrating a configuration example of a three-dimensional data multiplexing device according to Embodiment 1.

Next, a configuration example of a three-dimensional data multiplexing device (three-dimensional data multiplexing system) according to the present embodiment will be described. FIG. 18 is a diagram illustrating a configuration example of a three-dimensional data multiplexing device according to the present embodiment. The three-dimensional data multiplexing device generates an output signal by encoding and multiplexing various sensor signals, and accumulates or transmits the generated output signal.

As illustrated in FIG. 18, the three-dimensional data multiplexing device includes sensing units 7331A, 7331B, and 7331C, sensor information inputters 7332A, 7332B, and 7332C, point cloud data generators 7333A and 7333B, encoders 7334A and 7334B, synchronizer 7335, and multiplexer 7336. Although the example is illustrated here in which three sensing units are used, the number of sensing units is not limited to this. Additionally, any combination of the following processing methods can be used for the processing method of the sensor signal from each sensing unit.

Sensor information inputter 7332A obtains a first sensor signal generated through sensing by sensing unit 7331A. Sensor information inputter 7332B obtains a second sensor signal generated through sensing by sensing unit 7331B. Sensor information inputter 7332C obtains a third sensor signal generated through sensing by sensing unit 73310.

Point cloud data generator 7333A generates first point cloud data from the first sensor signal. Point cloud data generator 7333B generates second point cloud data from the second sensor signal. At this time, depending on the difference between the sensing methods used by sensing unit 7331A and sensing unit 7331B (for example, directions, ranges, obtainable attributes, frequencies, resolutions, methods, or means), the number of points in the generated point cloud data, the range of points, and the attribute information may be different.

Encoder 7334A generates first encoded data by encoding the first point cloud data. Encoder 7334B generates second encoded data by encoding the second point cloud data. For example, encoder 7334A and encoder 7334B apply encoding methods that are different from each other. For example, encoder 7334A may use a first encoding scheme, and encoder 7334B may use a second encoding scheme different from the first encoding scheme. Note that encoder 7334A and encoder 7334B may use the same encoding scheme. Encoders 7334A and 7334B may compress the geometry information or attribute information of points in point cloud data by using entropy encoding or the like. Additionally, encoders 7334A and 7334B may store, as metadata, the sensor signals, the geometry information or angle information on sensors, time information, or the like.

Encoders 7334A and 7334B use encoding schemes suitable for the point cloud data. For example, the first encoding scheme is an encoding scheme that can expect a high coding rate for map information or static contents, and the second encoding scheme is an encoding scheme that can expect a high coding rate for contents such as AR or VR. In this case, encoders 7334A and 7334B may use encoding schemes suitable for the contents.

Alternatively, for example, the first encoding scheme is an encoding scheme that can expect a high coding rate for a point cloud based on the information obtained through sensing by a sensing unit such as a beam LiDAR, and the second encoding scheme is an encoding scheme that can expect a high coding rate for a point cloud based on the information obtained through sensing by a sensing unit such as a FLASH LiDAR. In this case, encoders 7334A and 7334B may use encoding schemes suitable for the sensing units.

Additionally, encoders 7334A and 7334B need not change the encoding schemes, but may use encoding tools suitable for the contents or the sensing units, or parameters related to encoding in the same encoding scheme.

The generated first encoded data and second encoded data are input to multiplexer 7336. For example, the third sensor signal sensed by sensing unit 7331C is data that does not need to be encoded. In this case, the generation and encoding of point cloud data are not performed, and the third sensor signal is directly input to multiplexer 7336. Note that encoding need not be performed for the purpose of low-latency transmission.

Synchronizer 7335 has a function for synchronizing a plurality of sensing units. For example, synchronizer 7335 uses the time information of sensing, time stamp information, angle information, and the like, as the information related to synchronization. These pieces of information related to synchronization may be multiplexed into an output signal as a synchronization signal, which is common information. Alternatively these pieces of information related to synchronization may be included in each sensor signal.

Multiplexer 7336 generates an output signal by multiplexing one or more pieces of encoded data, metadata, the RAW data of the sensor signals, and the synchronization signal. Additionally, multiplexer 7336 stores, in the output signal, the information for identifying each data, and the information indicating the corresponding relationship between each data.

Figure 19:
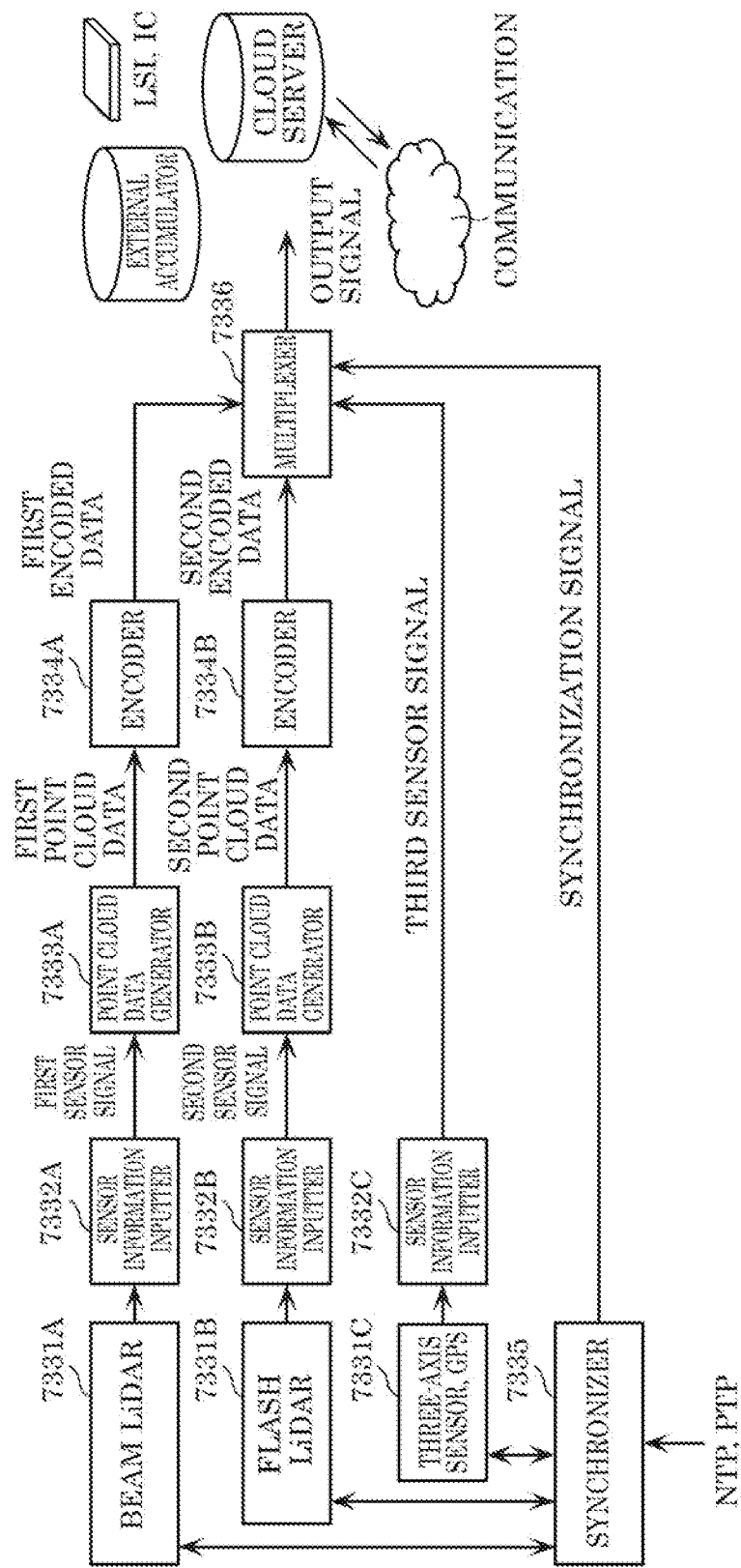
FIG. 19 is a diagram illustrating a concrete example of a three-dimensional data multiplexing device according to Embodiment 1.
Figure 20:
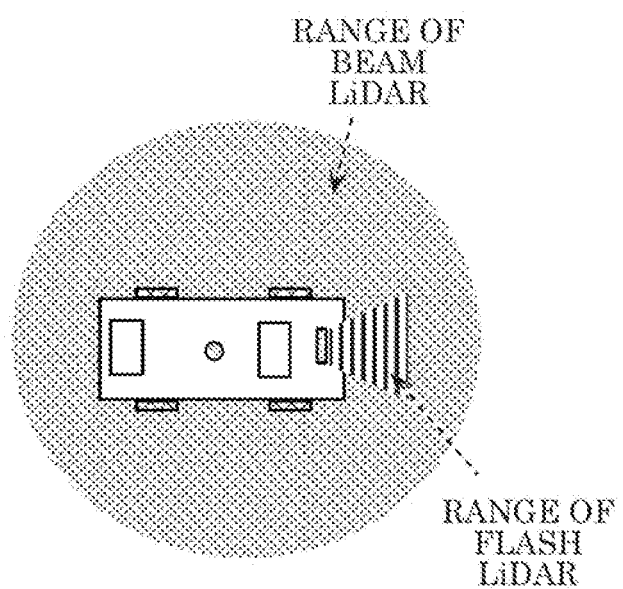
FIG. 20 is a diagram illustrating the sensor ranges of various sensors according to Embodiment 1.

FIG. 19 is a diagram illustrating a concrete example of a three-dimensional data multiplexing device. As illustrated in FIG. 19, a beam LiDAR is used as sensing unit 7331A, and a FLASH LiDAR is used as sensing unit 7331B, According to the characteristics of the LiDARs, the range and distance of a point cloud, the resolution, and the like are different. FIG. 20 is a diagram illustrating examples of the sensor ranges of the beam LiDAR and the FLASH LiDAR. For example, the beam LiDAR detects all directions in the periphery of a vehicle (sensor), and the FLASH LiDAR detects the range in one direction (for example, the front) of the vehicle.

Point cloud data generator 7333A generates first point cloud data based on the distance information and reflectance information on the beam irradiation angle obtained from the beam LiDAR. Point cloud data generator 7333B generates second point cloud data based on the two-dimensional distance information and reflectance obtained from the FLASH LiDAR. Note that point cloud data generators 7833A and 7333B may further use the two-dimensional color information or the like obtained by a camera, and generate point cloud data having both the color information and the reflectance.

Additionally, an in-vehicle sensor, which is a position information sensor, such as a three-axis gyro sensor, a three-axis acceleration sensor, or a GPS, is used as sensing unit 7331C. These pieces of sensor information are sensor information representing the state of an entire vehicle, and can also be called common information related to the first sensor signal and second sensor signal. These pieces of common sensor information may be encoded and multiplexed, or may be multiplexed without being encoded. Additionally these pieces of information may be stored and encoded in the first sensor signal and the second sensor signal as additional information that is common to point cloud data. Or a common sensor information may be stored in one sensor signal of the first sensor signal and the second sensor signal. In this case, the information indicating which sensor signal stores the common sensor information may be indicated in, for example, the other sensor signal or the synchronization signal.

Additionally as the information about the time to obtain the sensor, the timestamp based on reference time information such as the NTP (Network Time Protocol) or the PTP (Precision Time Protocol) is given to the first point cloud data based on the beam LiDAR, and to the second point cloud data based on the FLASH LiDAR. The timestamps of the sensors are synchronized with common reference time, and are encoded by encoders 7334A and 7334B, respectively.

Additionally, the reference time information indicating the common reference time may be multiplexed as the synchronization signal. The reference time information need not be multiplexed. The three-dimensional data demultiplexing device (three-dimensional data decoding device) obtains the respective timestamps from the encoded data of the plurality of sensor signals. Since the timestamps are synchronized with the common reference time, the three-dimensional data demultiplexing device can achieve synchronization among the plurality of sensors by operating the decoded data of the plurality of sensor signals based on the respective timestamps.

Note that the corresponding time information may be set for each of the beam LiDAR and the FLASH LiDAR. Additionally, a three-axis sensor may be provided for each of the beam LiDAR and the FLASH LiDAR. In that case, common time such as the Internet time is used for each NTP. In addition, each three-axis sensor is calibrated in advance, and a plurality of three-axis sensors that are synchronized in advance are used.

Figure 21:
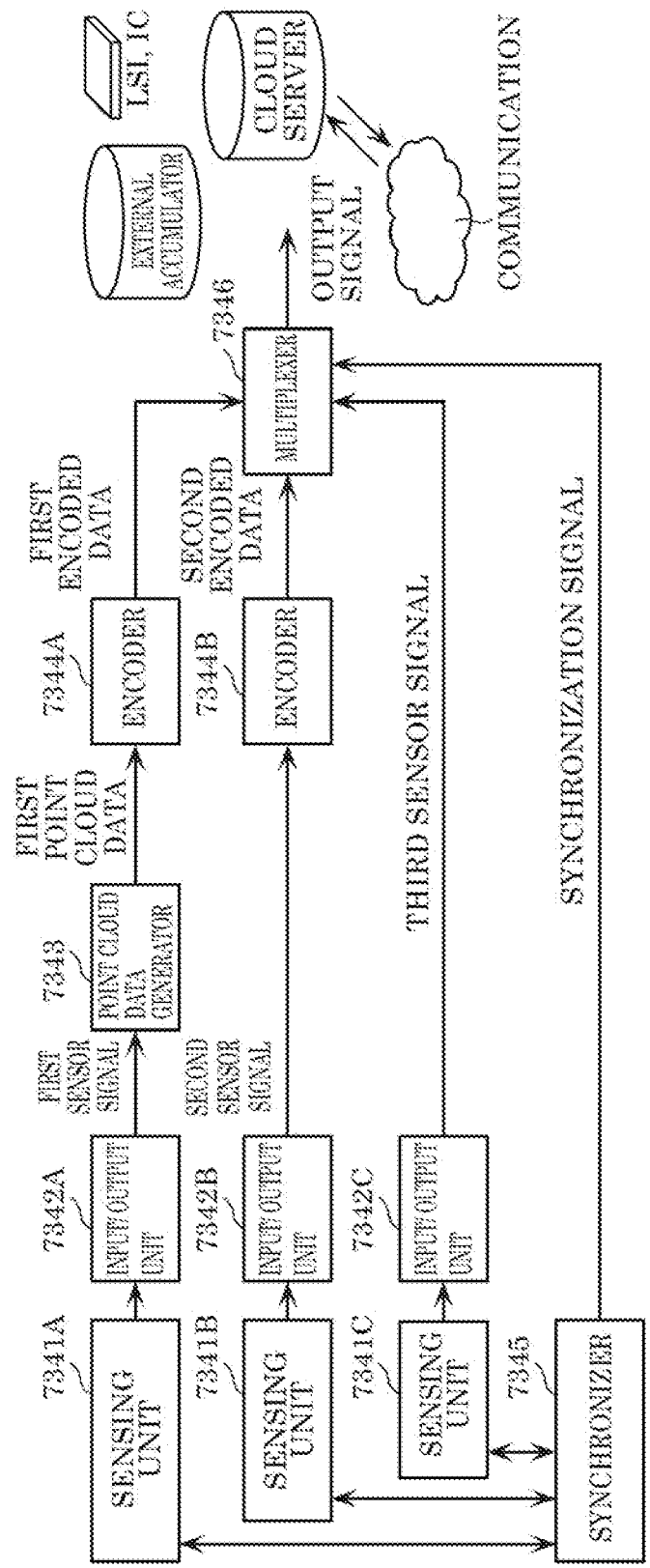
FIG. 21 is a diagram illustrating another configuration example of a three-dimensional data multiplexing device according to Embodiment 1.

FIG. 21 is a diagram illustrating another configuration example of a three-dimensional data multiplexing device. As illustrated in FIG. 21, the three-dimensional data multiplexing device includes sensing units 7341A, 7341B, and 7341C, input/output units 7342A, 7342B, and 7342C, point cloud data generator 7343, encoders 7344A and 7344B, synchronizer 7345, and multiplexer 7346.

Input/output unit 7342A obtains a first sensor signal generated through sensing by sensing unit 7341A. Input/output unit 7342B obtains a second sensor signal generated through sensing by sensing unit 7341B. Input/output unit 7342C obtains a third sensor signal generated through sensing by sensing unit 7341C. Note that Input/output units 7342A, 7342B, and 7342C may have memories that accumulate the obtained sensor signals.

Point cloud data generator 7343 generates first point cloud data from the first sensor signal. Encoder 7344A generates first encoded data by encoding the first point cloud data. Encoder 7344B generates second encoded data by encoding the second sensor signal.

Synchronizer 7345 has a function for synchronizing a plurality of sensing units. Multiplexer 7346 generates an output signal by multiplexing one or more pieces of encoded data, metadata, the RAW data of the sensor signals, and the synchronization signal.

In this manner, in the configuration illustrated in FIG. 21, point cloud data is not generated from the sensor signal (RAW data) obtained by sensing unit 7341B, and the sensor signal is directly encoded as the RAW data. For example, when the second sensor signal is two-dimensional information obtained by the FLASH LiDAR, or a CMOS sensor such as a camera, encoder 7344B encodes the second sensor signal by using a video codec such as an AVC or an HEVC. Accordingly encoding with a high coding efficiency can be achieved. Additionally a low-cost system construction is enabled by utilizing an existing codec.

In this manner, the three-dimensional data multiplexing device uses means for encoding point cloud data after conversion, together with means for directly encoding the RAW data without conversion to point cloud data according to the sensing units, and multiplexes each encoded data.

Next, an example of the technique of generating an output signal in a predetermined file format by multiplexing will be described. Hereinafter, an example in a case where the predetermined file format is the ISOBMFF (ISO based media file format) will be described. Note that the file format is not limited to the ISOBMFF, and the other file formats may be used.

ISOBMFF is a file format standard prescribed in ISO/IEC14496-12. ISOBMFF is a standard that does not depend on any medium, and prescribes a format that allows data of various media, such as a video, an audio, and a text, to be multiplexed and stored.

The storing method for each medium in the ISOBMFF is specified separately. For example, the storing method for AVC video and HEVC video is specified in ISO/IEC14496-1.5.

Figure 22:
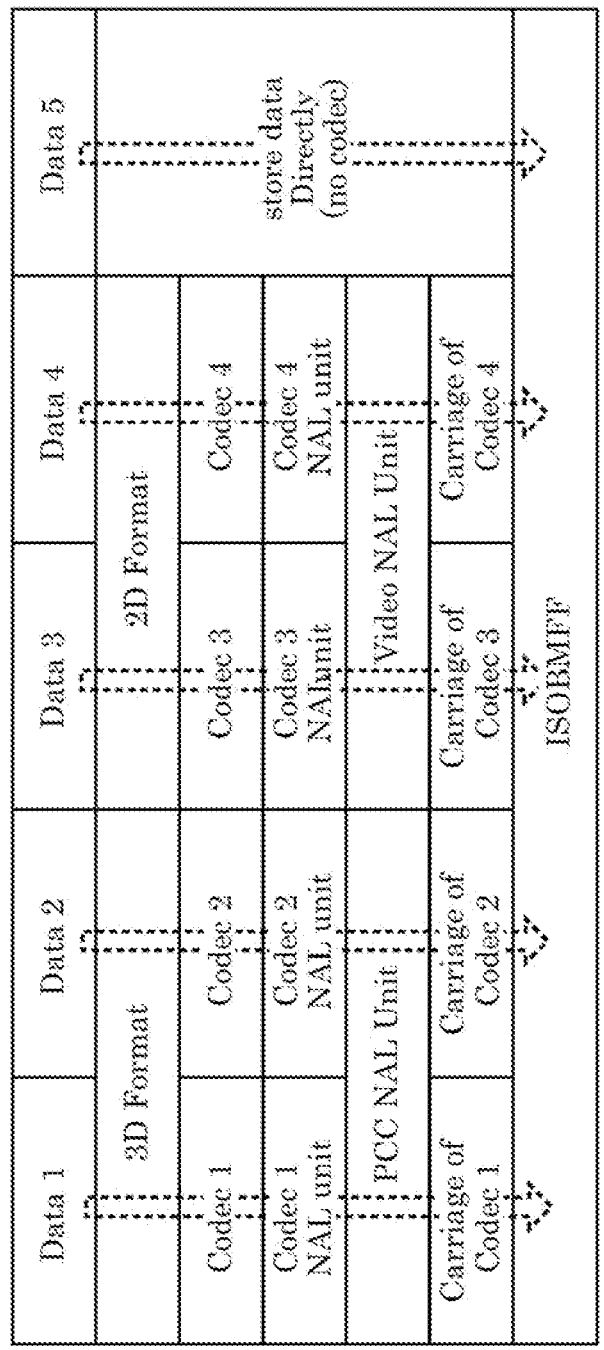
FIG. 22 is a diagram illustrating the protocol for storing a plurality of pieces of information in a file format according to Embodiment 1.

On the other hand, a method is required that stores, in the ISOBMFF, the encoded data of the data obtained from a plurality of pieces of sensor information (sensor signals). FIG. 22 is a diagram illustrating the protocol for encoding a plurality of pieces of sensor information with various encoding methods, respectively, and storing the pieces of sensor information in the ISOBMFF.

Data1 to Data5 are sensor data (sensor signals) obtained from various types of sensors, respectively, and are, for example, RAW data or the like. Data1 and Data2 are converted to a 3D point-cloud format, and are encoded by using encoding method Codec1 or Codec2 for the 3D point-cloud format. Additionally, Data3 and Data4 are converted to a format of 2D data such as an image, and are encoded by using encoding method Codec3 or Codec4 for the 2D data format.

Each encoded data is converted to a NAL unit with a predetermined method, and is stored in the ISOBMFF. Note that a NAL unit may be in a format common to the 3D Format and the 2D Format, or may be in a different format. Additionally, NAL units of different encoding methods may be in a common format, or may be in different formats. Note that, in addition to the 3D and 2D formats listed here, the format of the sensor data may be a format for 1D, or the other format.

Data5 is a case where sensor data obtained from a sensor is directly stored in the ISOBMFF without encoding.

By providing a format for storing the data of arbitrary combination of these pieces of data integrally it becomes easy to manage the data of a system that handles a plurality of sensors, and it becomes possible to achieve various functions.

Figure 23:
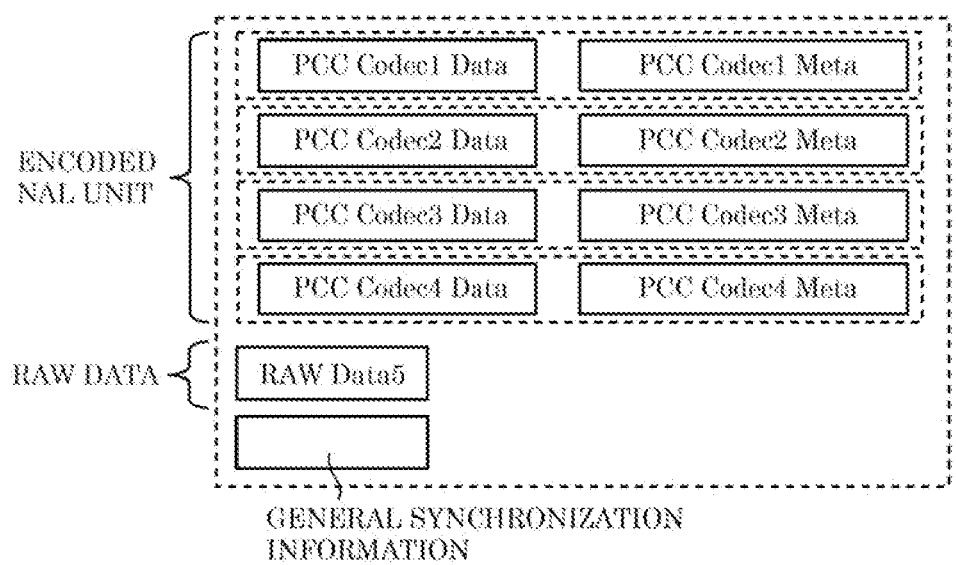
FIG. 23 is a diagram illustrating a configuration example of input data according to Embodiment 1.
Figure 24:
FIG. 24 is a diagram illustrating a configuration example of a NAL unit according to Embodiment 1.
Figure 25:
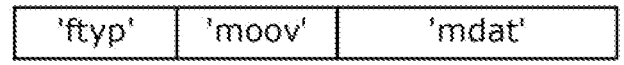
FIG. 25 is a diagram illustrating a configuration example of ISOBMFF according to Embodiment 1.
Figure 26:
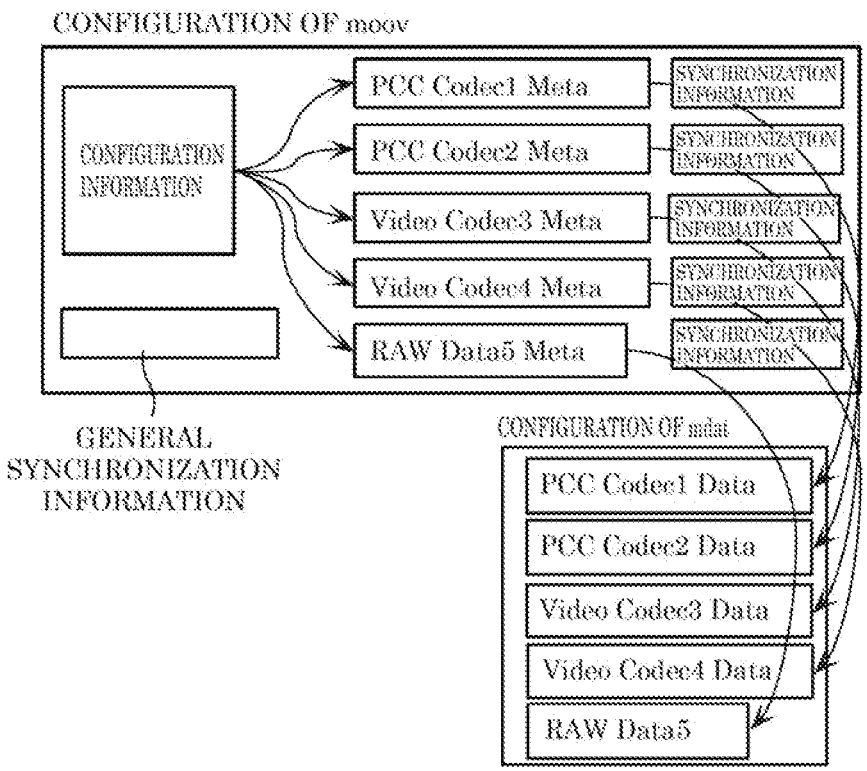
FIG. 26 is a diagram illustrating configuration examples of moov and mdat according to Embodiment 1.

Next, the configuration of the ISOBMFF will be described. The three-dimensional data multiplexing device stores a plurality of pieces of sensor data in the ISOBMFF. FIG. 23 is a diagram illustrating a configuration example of input data to be multiplexed. FIG. 24 is a diagram illustrating a configuration example of a NAL unit. FIG. 25 is a diagram illustrating a configuration example of the ISOBMFF. FIG. 26 is a diagram illustrating configuration examples of moov and mdat.

Encoded data included in input data is broadly divided into encoded-data (Data) and metadata (Meta). As the metadata, there are metadata indicated by the header for each encoded data, and metadata stored in an independent NAL unit as a parameter set. Additionally, metadata may be included in encoded data. The three-dimensional data multiplexing device stores, in one ISOBMFF, a NAL unit for each of these plurality of different codecs and RAW data.

The ISOBMFF is formed by a box structure. As the boxes of the ISOBMFF there are "moov" and "meta" that mainly store metadata, and "mdat" that stores data.

Encoded data and RAW data are stored in "mdat" in the ISOBMFF per sample. Additionally, metadata in input data is stored in "trak" of "moov" in the ISOMBFF in a predetermined format for each encoded data. The metadata and synchronization information included in the encoded data are also stored in "moov."

The information for obtaining data from "mdat" (address information (offset information) of data from the top of a file, the size of data, and the like) is stored in the metadata for each encoded data. Additionally the file type of subsequent data and the like are indicated in "ftyp."

Note that the format and box names may be other than those listed here, as long as they have the same functions.

Additionally, in a use case such as real time communication, the unit obtained by dividing the boxes such as "moov" and "mdat" may be transmitted in a time separated manner. In addition, the data of the divided unit may be interleaved.

The three-dimensional data multiplexing device defines a box indicating configuration information (hereinafter simply described as configuration information), and stores, in the configuration information, the identification information of a plurality of pieces of data included in a file. Additionally, the three-dimensional data multiplexing device stores, in the configuration information, the identification information with which the metadata of each data can be accessed.

Figure 27:
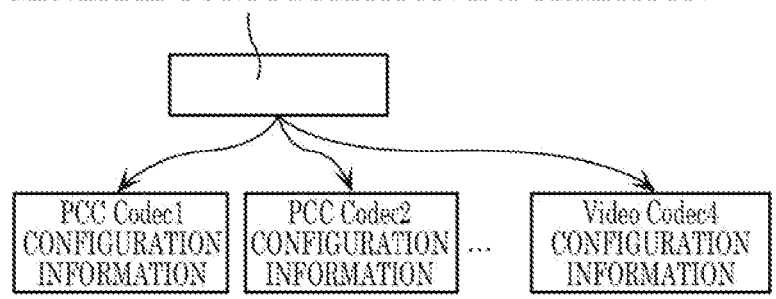
FIG. 27 is a diagram illustrating a configuration example of configuration information according to Embodiment 1.
Figure 28:
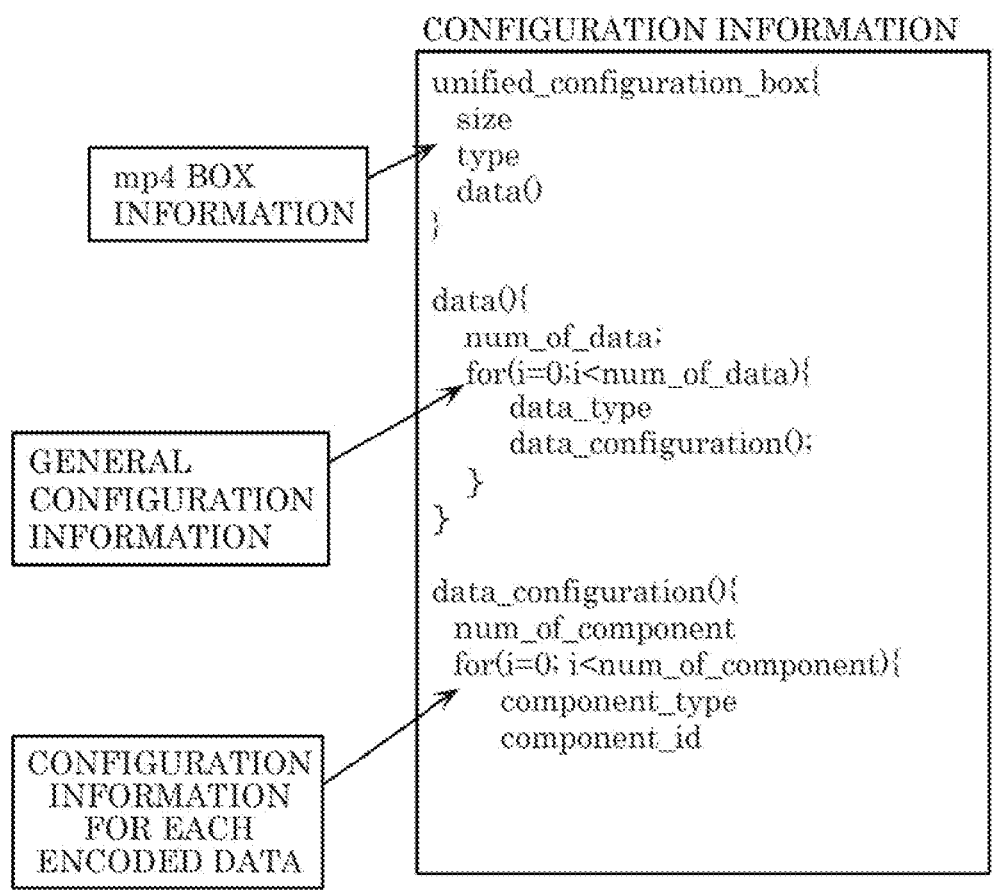
FIG. 28 is a diagram illustrating a syntax example of configuration information according to Embodiment 1.

FIG. 27 is a diagram illustrating a configuration example of configuration information. FIG. 28 is a diagram illustrating a syntax example of configuration information.

The configuration information indicates the information on contents and components forming an ISOBMFF file, the sensor information at the time of obtaining the original data of components, format information, an encoding method, and the like.

As illustrated in FIG. 27, the configuration information includes general configuration information, and configuration information for each encoded data. A plurality of pieces of configuration information may be the same data structure or box, or may be different data structures or boxes.

In type in an mp4 box, the fact that it is a configuration information box is indicated by 4CC such as "msuc". The configuration of a plurality of pieces of data with different encoding schemes is indicated in the general configuration information (data ( )), data ( ) includes num_of_data, data_type, and data_configuration.

num_of_data indicates the number of encoded data and RAW data forming a file data_type indicates the identification information for each data. That is, data_type indicates the types of a plurality of pieces of data.

Specifically data_type indicates whether data is point cloud data or a sensor signal (for example, RAW data). Additionally, data_type may indicate whether or not data is encoded. In addition, data_type may indicate the encoding method (encoding scheme) used for encoding of encoded data. The encoding method is, for example, GPPC or VPPC. Additionally, the encoding method may be Codec1 to 4 or the like illustrated in FIG. 22. In addition, data_type may illustrate the information for identifying the configuration information.

Additionally data_type may indicate the type of the original data of point cloud data. The type of the original data is the kind of a sensor (for example, 2D sensor, 3D sensor, or the like) that has generated a sensor signal, or the like, in a case where the original data is the sensor signal. Additionally data_type may include the information indicating the data format (for example, 1D information, 2D information, 3D information, or the like) of a sensor signal.

For example, data_type=0 indicates PCC Codec1, data_type=1 indicates PCC Codec2, data_type=2 indicates Video Codec3, and data_type=4 indicates 3D axis sensor RAW data. data_configuration indicates the configuration information for each data.

data_configuration ( ) is the configuration information for each encoded data, and includes num_of_component, component_type, and component_id.

num_of_component indicates the number of components in encoded data. component_type indicates the type of a component. For example, in the case of PCC encoding, component_type indicates whether a component is geometry, attribute, or metadata.

component_id indicates a unique identifier for associating a component with other metadata and data.

Note that the method of encoding may be an encoding method used for audio, texts, applications, or 360-degree images, in addition to a video codec and a PCC codec. Additionally, data may be processed data such as mesh or CAD. In addition, the method of encoding may be the same codec, or an encoding method with a different profile, level or tool, and any encoding method can be integrally handled.

In this manner, by multiplexing required data into one file in order to utilize point cloud data decoded in the three-dimensional data demultiplexing device in applications, it is possible to make the file management and synchronization management handled in the applications easier.

Figure 29:
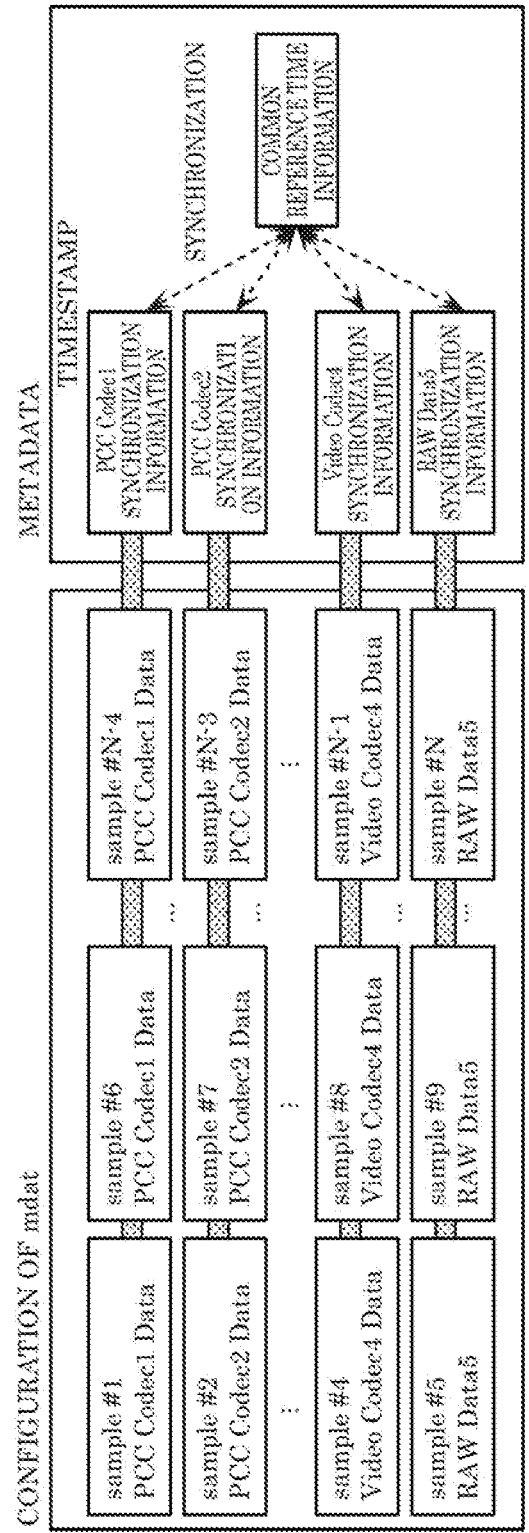
FIG. 29 is a diagram illustrating a configuration example of mdat according to Embodiment 1.

FIG. 29 is a diagram illustrating a configuration example of a data box "mdat". Each encoded data or RAW data is individually stored in a sample, which is the minimum unit of the data box.

Additionally, the synchronization information such as timestamp for each encoded data included in a file is set based on general synchronization information such as common reference time. Additionally, it is assumed that each synchronization information is synchronized information.

Additionally, the synchronization information may be made common among a plurality of pieces of encoded data by for example, aligning the reference time, time resolution, and time interval in the timestamps of the plurality of pieces of encoded data. In that case, the synchronization information may be stored in any one or more of the synchronization information for each encoded data and the common synchronization information. In that case, metadata includes at least one of the information indicating the location where common time information is stored, and the information indicating that the synchronization information is common.

When synchronization is achieved among pieces of encoded data, the three-dimensional data multiplexing device may store a plurality of pieces of synchronized encoded data as one sample. On the other hand, when at least one of the reference time, time resolution, and time interval is not aligned among a plurality of pieces of encoded data, the three-dimensional data multiplexing device may separately derive difference information indicating the difference in timestamps between encoded data, and may store the derived difference information in an output signal. Additionally, the three-dimensional data multiplexing device may store, in the output signal, a flag indicating whether or not synchronization is achieved.

The three-dimensional data demultiplexing device achieves synchronization between encoded data by processing each sample at the time indicated in the timestamp indicated in metadata, by using the synchronization information of each encoded data and the general synchronization information.

Figure 30:
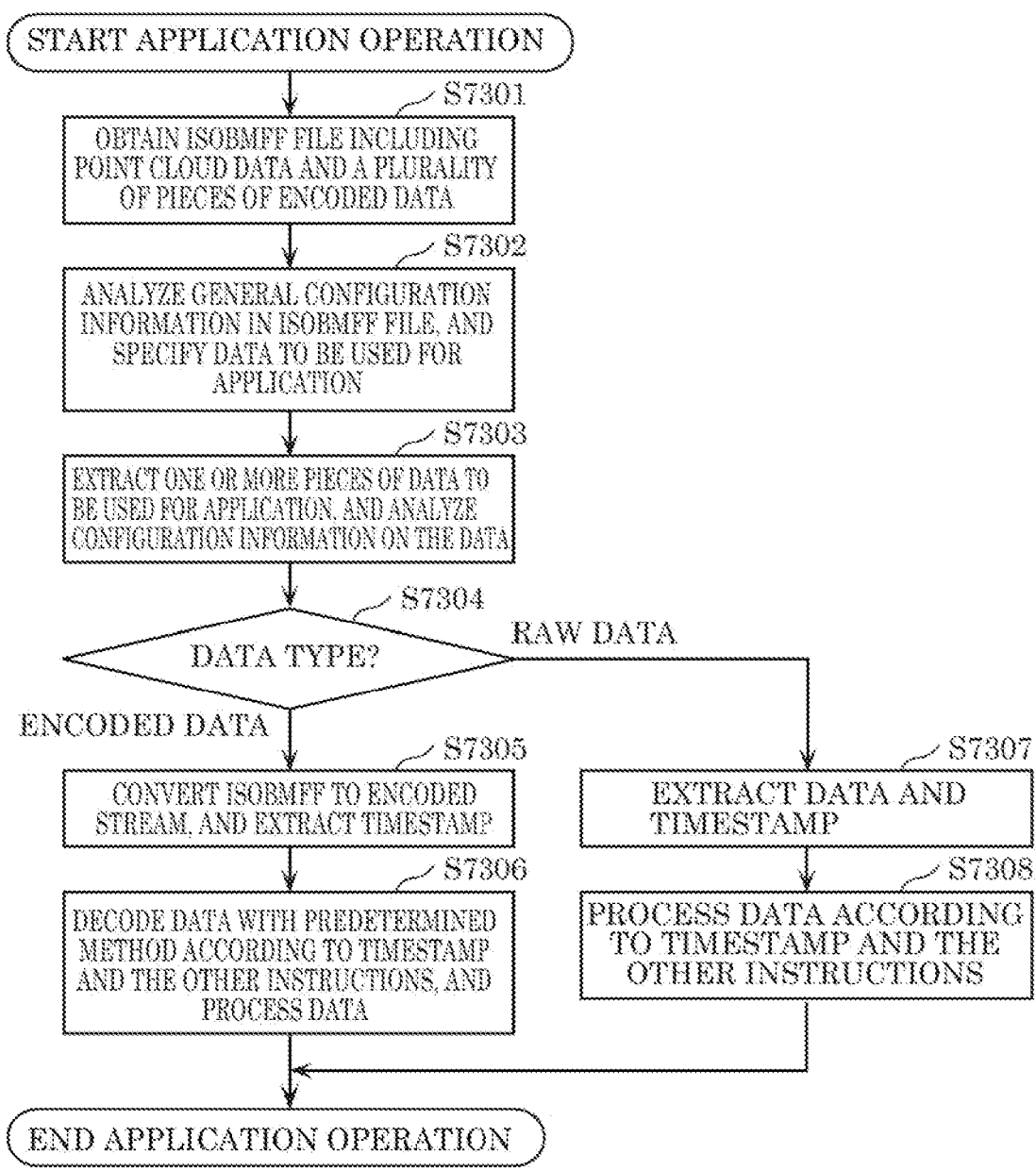
FIG. 30 is a flowchart illustrating an example of an application process according to Embodiment 1.

Hereinafter, an example of an application process will be described. FIG. 30 is a flowchart illustrating an example of the application process. When an application operation is started, a three-dimensional data demultiplexing device obtains an ISOBMFF file including point cloud data and a plurality of pieces of encoded data (S7301). For example, the three-dimensional data demultiplexing device may obtain the ISOBMFF file through communication, or may read the ISOBMFF file from the accumulated data.

Next, the three-dimensional data demultiplexing device analyzes the general configuration information in the ISOBMFF file, and specifies the data to be used for the application (S7302). For example, the three-dimensional data demultiplexing device obtains data that is used for processing, and does not obtain data that is not used for processing.

Next, the three-dimensional data demultiplexing device extracts one or more pieces of data to be used for the application, and analyzes the configuration information on the data (S7303).

When the type of the data is encoded data (encoded data in S7304), the three-dimensional data demultiplexing device converts the ISOBMFF to an encoded stream, and extracts a timestamp (S7305). Additionally, the three-dimensional data demultiplexing device refers to, for example, the flag indicating whether or not the synchronization between data is aligned to determine whether or not the synchronization between data is aligned, and may perform a synchronization process when not aligned.

Next, the three-dimensional data demultiplexing device decodes the data with a predetermined method according to the timestamp and the other instructions, and processes the decoded data (S7306).

On the other hand, when the type of the data is RAW data (RAW data in S7304), the three-dimensional data demultiplexing device extracts the data and timestamp (S7307). Additionally, the three-dimensional data demultiplexing device may refer to, for example, the flag indicating whether or not the synchronization between data is aligned to determine whether or not the synchronization between data is aligned, and may perform a synchronization process when not aligned. Next, the three-dimensional data demultiplexing device processes the data according to the timestamp and the other instructions (S7308).

Figure 31:
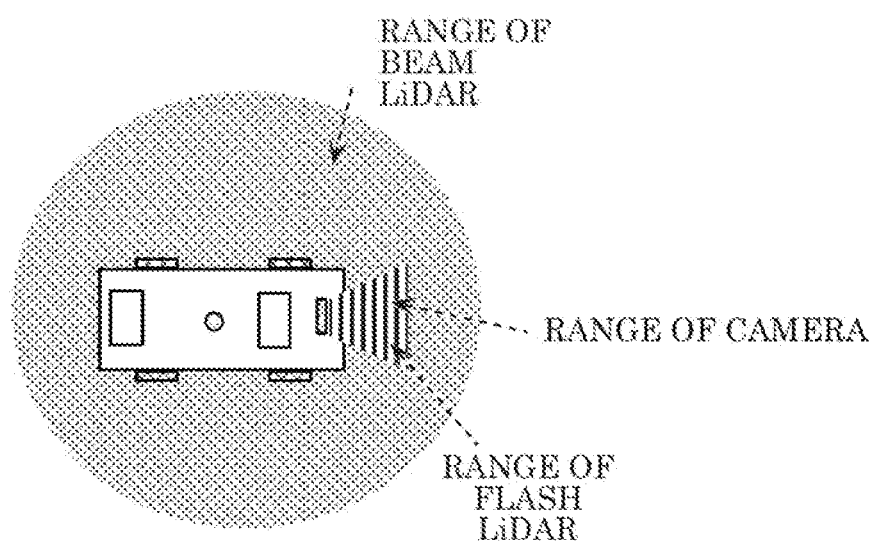
FIG. 31 is a diagram illustrating the sensor range of various sensors according to Embodiment 1.

For example, an example will be described in which the sensor signals obtained by a beam LiDAR, a FLASH LiDAR, and a camera are encoded and multiplexed with respective different encoding schemes. FIG. 31 is a diagram illustrating examples of the sensor ranges of a beam LiDAR, a FLASH LiDAR, and a camera. For example, the beam LiDAR detects all directions in the periphery of a vehicle (sensor), and the FLASH LiDAR and the camera detect the range in one direction (for example, the front) of the vehicle.

In the case of an application that integrally handles a LiDAR point cloud, the three-dimensional data demultiplexing device refers to the general configuration information, and extracts and decodes the encoded data of the beam LiDAR and the FLASH LiDAR. Additionally, the three-dimensional data demultiplexing device does not extract camera images.

According to the timestamps of the beam LiDAR and the FLASH LiDAR, the three-dimensional data demultiplexing device simultaneously processes the respective encoded data of the time of the same timestamp.

For example, the three-dimensional data demultiplexing device may present the processed data with a presentation device, may synthesize the point cloud data of the beam LiDAR and the FLASH LiDAR, or may perform process such as rendering.

Additionally in the case of an application that performs calibration between data, the three-dimensional data demultiplexing device may extract sensor geometry information, and use the sensor geometry information in the application.

For example, the three-dimensional data demultiplexing device may select whether to use beam LiDAR information or FLASH LiDAR information in the application, and may switch the process according to the selection result.

In this manner, since it is possible to adaptively change the obtaining of data and the encoding process according to the process of the application, the processing amount and the power consumption can be reduced.

Figure 32:
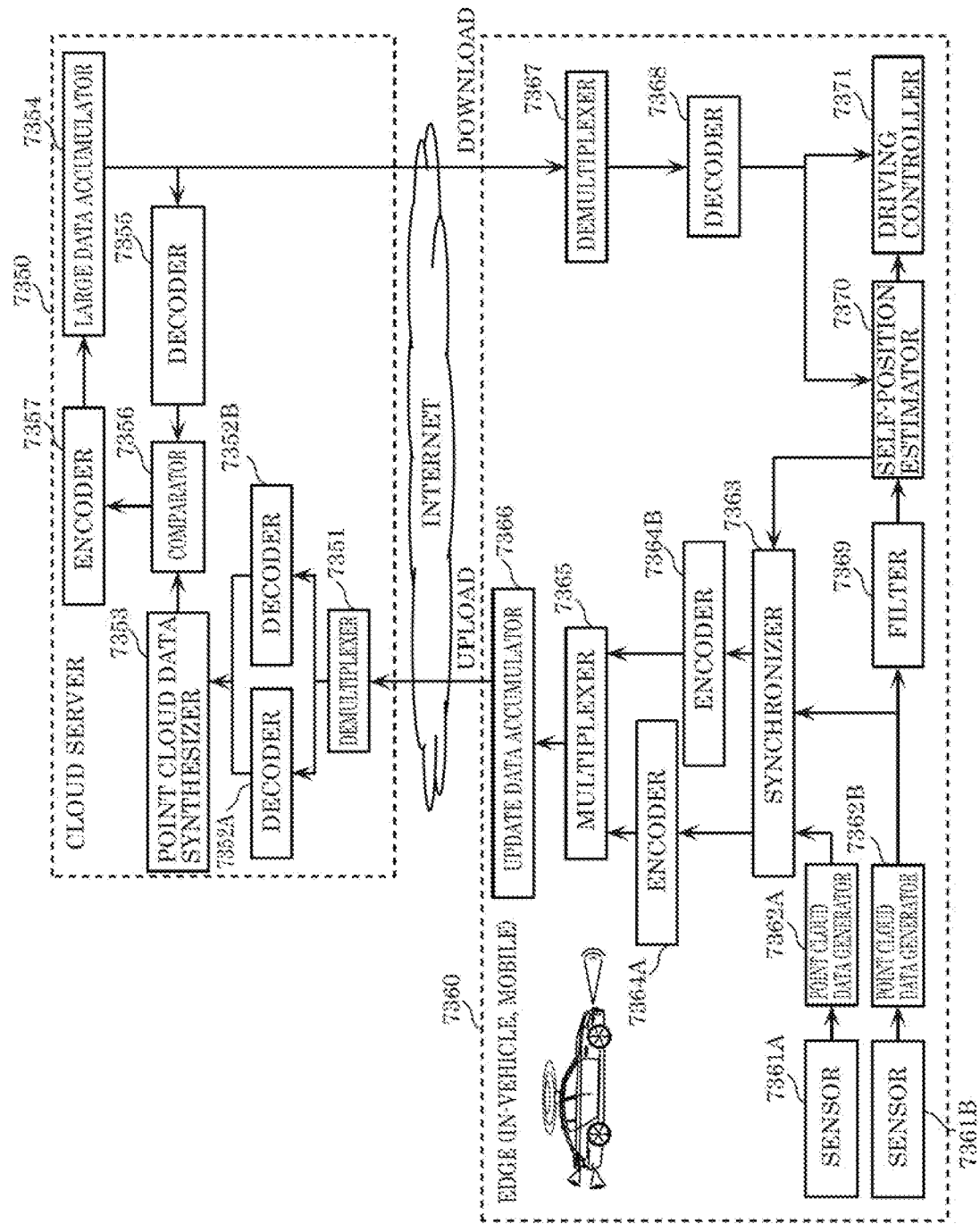
FIG. 32 is a diagram illustrating a configuration example of an automated driving system according to Embodiment 1.

Hereinafter, a use case in automated driving will be described. FIG. 32 is a diagram illustrating a configuration example of an automated driving system. This automated driving system includes cloud server 7350, and edge 7360 such as an in-vehicle device or a mobile device. Cloud server 7350 includes demultiplexer 7351, decoders 7352A, 7352B, and 7355, point cloud data synthesizer 7353, large data accumulator 7354, comparator 7356, and encoder 7357. Edge 7360 includes sensors 7361A and 7361B, point cloud data generators 7362A and 7362B, synchronizer 7363, encoders 7364A and 7364B, multiplexer 7365, update data accumulator 7366, demultiplexer 7367, decoder 7368, filter 7369, self-position estimator 7370, and driving controller 7371.

In this system, edge 7360 downloads large data, which is large point-cloud map data accumulated in cloud server 7350. Edge 7360 performs a self-position estimation process of edge 7360 (a vehicle or a terminal) by matching the large data with the sensor information obtained by edge 7360. Additionally, edge 7360 uploads the Obtained sensor information to cloud server 7350, and updates the large data to the latest map data.

Additionally in various applications that handle point cloud data in the system, point cloud data with different encoding methods are handled.

Cloud server 7350 encodes and multiplexes large data. Specifically, encoder 7357 performs encoding by using a third encoding method suitable for encoding a large point cloud. Additionally, encoder 7357 multiplexes encoded data. Large data accumulator 7354 accumulates the data encoded and multiplexed by encoder 7357.

Edge 7360 performs sensing. Specifically point cloud data generator 7362A generates first point cloud data (geometry information (geometry) and attribute information) by using the sensing information obtained by sensor 7361A. Point cloud data generator 7362B generates second point cloud data (geometry information and attribute information) by using the sensing information obtained by sensor 7361B. The generated first point cloud data and second point cloud data are used for the self-position estimation or vehicle control of automated driving, or for map updating. In each process, a part of information of the first point cloud data and the second point cloud data may be used.

Edge 7360 performs the self-position estimation. Specifically, edge 7360 downloads large data from cloud server 7350. Demultiplexer 7367 obtains encoded data by demultiplexing the large data in a file format. Decoder 7368 obtains large data, which is large point-cloud map data, by decoding the obtained encoded data.

Self-position estimator 7370 estimates the self-position in the map of a vehicle by matching the obtained large data with the first point cloud data and the second point cloud data generated by point cloud data generators 7362A and 7362B. Additionally driving controller 7371 uses the matching result or the self-position estimation result for driving control.

Note that self-position estimator 7370 and driving controller 7371 may extract specific information, such as geometry information, of the large data, and may perform processes by using the extracted information. Additionally, filter 7369 performs a process such as correction or decimation on the first point cloud data and the second point cloud data. Self-position estimator 7370 and driving controller 7371 may use the first point cloud data and second point cloud data on which the process has been performed. Additionally self-position estimator 7370 and driving controller 7371 may use the sensor signals obtained by sensors 7861A and 7361B.

Synchronizer 7363 performs time synchronization and geometry correction between a plurality of sensor signals or the pieces of data of a plurality of pieces of point cloud data. Additionally, synchronizer 7363 may correct the geometry information on the sensor signal or point cloud data to match the large data, based on geometry correction information on the large data and sensor data generated by the self-position estimation process.

Note that synchronization and geometry correction may be performed not by edge 7360, but by cloud server 7350. In this case, edge 7360 may multiplex the synchronization information and the geometry information to transmit the synchronization information and the geometry information to cloud server 7350.

Edge 7360 encodes and multiplexes the sensor signal or point cloud data. Specifically, the sensor signal or point cloud data is encoded by using a first encoding method or a second encoding method suitable for encoding each signal. For example, encoder 7364A generates first encoded data by encoding first point cloud data by using the first encoding method. Encoder 7364B generates second encoded data by encoding second point cloud data by using the second encoding method.

Multiplexer 7365 generates a multiplexed signal by multiplexing the first encoded data, the second encoded data, the synchronization information, and the like. Update data accumulator 7366 accumulates the generated multiplexed signal. Additionally, update data accumulator 7366 uploads the multiplexed signal to cloud server 7350.

Cloud server 7350 synthesizes the point cloud data. Specifically, demultiplexer 7351 obtains the first encoded data and the second encoded data by demultiplexing the multiplexed signal uploaded to cloud server 7350. Decoder 7352A obtains the first point cloud data (or sensor signal) by decoding the first encoded data. Decoder 7352B obtains the second point cloud data (or sensor signal) by decoding the second encoded data.

Point cloud data synthesizer 7353 synthesizes the first point cloud data and the second point cloud data with a predetermined method. When the synchronization information and the geometry correction information are multiplexed in the multiplexed signal, point cloud data synthesizer 7353 may perform synthesis by using these pieces of information.

Decoder 7355 demultiplexes and decodes the large data accumulated in large data accumulator 7354. Comparator 7356 compares the point cloud data generated based on the sensor signal obtained by edge 7360 with the large data held by cloud server 7350, and determines the point cloud data that needs to be updated. Comparator 7356 updates the point cloud data that is determined to need to be updated of the large data to the point cloud data obtained from edge 7360.

Encoder 7357 encodes and multiplexes the updated large data, and accumulates the obtained data in large data accumulator 7354.

As described above, the signals to be handled may be different, and the signals to be multiplexed or encoding methods may be different, according to the usage or applications to be used. Even in such a case, flexible decoding and application processes are enabled by multiplexing data of various encoding schemes by using the present embodiment. Additionally, even in a case where the encoding schemes of signals are different, by conversion to an encoding scheme suitable for demultiplexing, decoding, data conversion, encoding, and multiplexing processing, it becomes possible to build various applications and systems, and to offer of flexible services.

Figure 33:
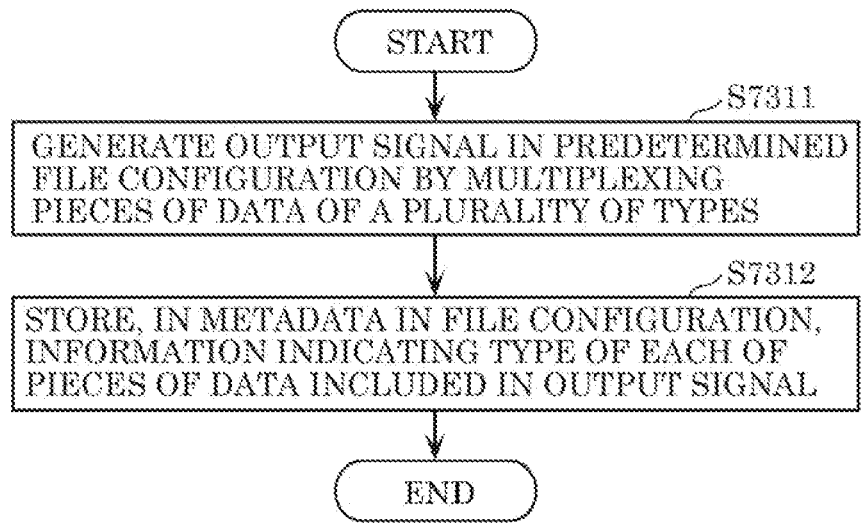
FIG. 33 is a flowchart of a three-dimensional data multiplexing process according to Embodiment 1.

As described above, the three-dimensional data multiplexing device according to the present embodiment performs the process illustrated in FIG. 33. The three-dimensional data multiplexing device generates an output signal in a predetermined file configuration (for example, the ISOBMFF) by multiplexing pieces of data of a plurality of types including point cloud data (S7311). Next, the three-dimensional data multiplexing device stores, in metadata (control information) in the file configuration, the information (for example, data_type) indicating the type of each of the pieces of data included in the output signal (S7312).

According to this, the three-dimensional data multiplexing device stores, in the metadata in the file configuration, the information indicating the type of each of the pieces of data included in the output signal. Accordingly, the type of each data can be easily determined in the three-dimensional data demultiplexing device that receives the output signal. In this manner, the three-dimensional data multiplexing device can appropriately multiplex and transmit point group data.

For example, the information indicating the type of each of the pieces of data indicates (1) an encoding scheme applied to the piece of data, (2) a configuration of the piece of data, (3) a type of a sensor that generated the piece of data, or (4) a data format of the piece of data.

For example, the metadata in the file configuration includes synchronization information for synchronizing times of the pieces of data included in the output signal. According to this, the pieces of data can be synchronized in the three-dimensional data demultiplexing device that receives the output signal.

For example, the synchronization information indicates a difference in timestamps between the pieces of data. According to this, the data amount of the output signal can be reduced.

For example, the three-dimensional data multiplexing device includes a processor and memory and the processor performs the above-described processes using the memory.

Figure 34:
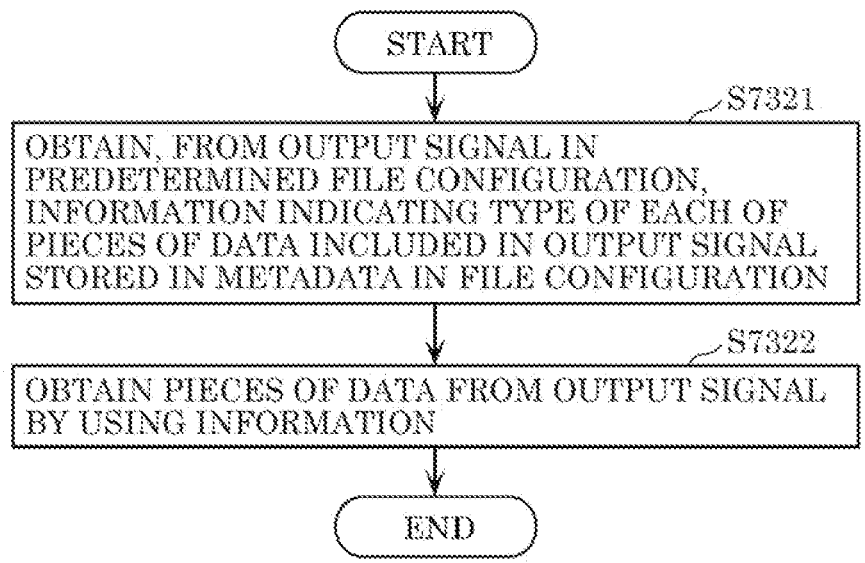
FIG. 34 is a flowchart of a three-dimensional data demultiplexing process according to Embodiment 1.

Furthermore, a three-dimensional data demultiplexing device according to this embodiment performs the process indicated in FIG. 34, The three-dimensional data demultiplexing device obtains, from an output signal generated by multiplexing pieces of data of a plurality of types including point cloud data, information (for example, data_type) indicating a type of each of the pieces of data included in the output signal, the output signal having a file configuration that is predetermined (for example, ISOBMFF), the information being stored in metadata in the file configuration (S7321). The three-dimensional data demultiplexing device obtains the pieces of data from the output signal, using the information indicating a type of each of the pieces of data (S7322). For example, the three-dimensional data demultiplexing device selectively obtains required data from the output signal, using the information indicating the type of each of the pieces of data. According to this, the three-dimensional data demultiplexing device can easily determine the type of each data.

For example, the information indicating the type of each of the pieces of data indicates (1) an encoding scheme applied to the piece of data, (2) a configuration of the piece of data, (3) a type of a sensor that generated the piece of data, or (4) a data format of the piece of data.

For example, the metadata in the file configuration includes synchronization information for synchronizing times of the pieces of data included in the output signal. For example, the three-dimensional data demultiplexing method synchronizes the pieces of data using the synchronization information.

For example, the synchronization information indicates a difference in timestamps between the pieces of data. For example, the synchronization information includes the information indicating the timestamp of any of a plurality of pieces of data, and the three-dimensional data demultiplexing device adds the difference indicated by the synchronization information to the timestamp of any of the pieces of data, thereby restoring the timestamps of the other pieces of data of the pieces of data. Accordingly, the data amount of the output signal can be reduced.

For example, the three-dimensional data demultiplexing device includes a processor and memory and the processor performs the above-described processes using the memory.

Embodiment 2

Figure 35:
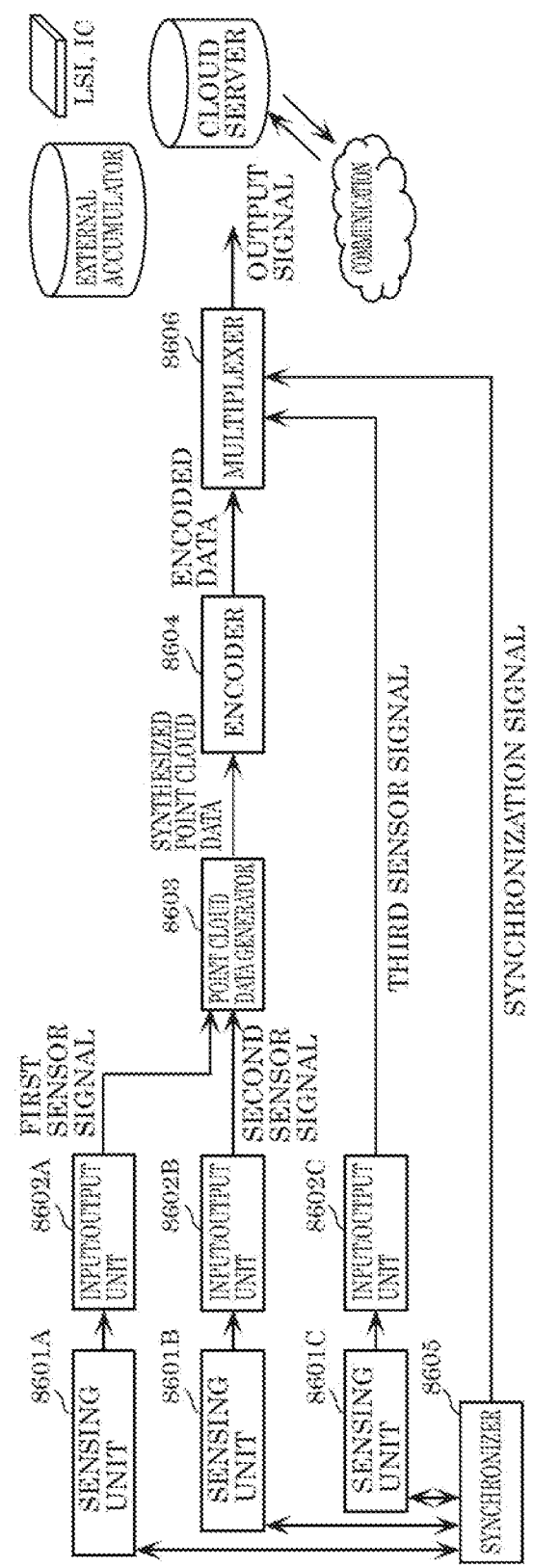
FIG. 35 is a diagram illustrating a configuration example of a three-dimensional data encoding device according to Embodiment 2.

First, the generation and synthesizing of point cloud data will be described. FIG. 35 is a diagram illustrating a configuration example of a three-dimensional data encoding device (three-dimensional data multiplexing device), which is an example of a system that processes a plurality of sensor signals. The three-dimensional data encoding device includes sensing units 8601A, 8601B, and 8601C, input/output unit 8602A, 8602B, and 8602C, point cloud data generator 8603, encoder 8604, synchronizer 8605, and multiplexer 8606.

Input/output unit 8602A obtains a first sensor signal generated by sensing in sensing unit 8601A. Input/output unit 8602B obtains a second sensor signal generated by sensing in sensing unit 8601B. Input/output unit 8602C obtains a third sensor signal generated by sensing in sensing unit 86010. Note that input/output units 8602A, 8602B, and 8602C may have a memory that accumulates the obtained sensor signals.

Point cloud data generator 8603 generates synthesized point cloud data by synthesizing (also called merging or fusion) the first sensor signal and the second sensor signal. Synthesized point cloud data includes the geometry information and attribute information on three-dimensional points obtained by first sensing unit 8601A and second sensing unit 8601B, and the other sensor information. Note that point cloud data generator 8603 may synthesize a synchronization signal for synchronizing a plurality of sensings, such as a third sensor signal, a common sensor signal, and common time information, based on the synchronization signal.

Encoder 8604 generates encoded data by encoding the synthesized point cloud data. Synchronizer 8605 has a function for synchronizing a plurality of sensing units. Multiplexer 8606 generates an output signal (bitstream) by multiplexing the encoded data, metadata, the RAW data of the sensor signals, and the synchronization signal.

FIG. 36 is a block diagram illustrating the configuration of point cloud data generator 8603. Point cloud data generator 8603 includes converters 8611 and 8612, and synthesizer 8613.

Converter 8611 generates first point cloud data from the first sensor signal. Converter 8612 generates second point cloud data from the second sensor signal. The sensor signals are, for example, one-dimensional information including the laser angle and distance information, or two-dimensional distance information, etc. obtained with a FLASH LiDAR or a camera. Converters 8611 and 8612 convert the one-dimensional or two-dimensional geometry information into three-dimensional geometry information (for example, (x, y, z) coordinates).

A point (three-dimensional point), which is a component of point cloud data, includes the geometry information such as three-dimensional coordinates, and the attribute information for the geometry information. FIG. 37 to FIG. 39 are diagrams illustrating examples of information on three-dimensional points. In the example illustrated in FIG. 37, one item of attribute information exists for one item of geometry information. In the examples illustrated in FIG. 38 and FIG. 39, two or more items of attribute information exist for one item of geometry information. When a plurality of items of attribute information exist for one item of geometry information, there are a case where a plurality of different attribute types exist, and a case where a plurality of items of attribute information of the same attribute type exist. The example illustrated in FIG. 37 is a case where, for example, one item of color information exists as the attribute information. Additionally, the example illustrated in FIG. 38 is a case where, for example, the color information and the information on reflectance exist. Further, the example illustrated in FIG. 39 is a case where, for example, three or more items of color information exist. Note that the geometry information has three values (x, y, z). The color information has three values (R, G, B), or (Y Cb, Cr). The reflectance has one value. In this manner, the geometry information and the attribute information may have information for each dimension.

Note that the attribute information based on the first sensor signal and the attribute information based on the second sensor signal may be items of attribute information of the same type (for example, color) of different objects, or may be items of attribute information of different types (for example, color and reflectance).

Hereinafter, synthesizing of point-cloud data files will be described. FIG. 40 is a diagram illustrating an example of synthesizing a plurality of sensor signals, and generating the synthesized point cloud data. The diagram illustrates the example of synthesizing sensor information X and sensor information Y that have the information for respective points, and sensor information Z having common information. Synthesized point cloud information, which is the point cloud information after synthesizing, includes the common information, the information for each point, and configuration information.

Hereinafter, an example will be described in which the sensor information X and the sensor information Y have the same attribute information (for example, color information or reflectance). For example, the configuration information includes a sensor ID and sensor information of a synthesizing source. In the example illustrated in FIG. 40, the configuration information includes, as the information on a sensor X (SensorX) that has generated the sensor information X, a sensor ID (ID=S1), sensor information (Sensor), the version (Version) of the sensor, the maker name (Maker) of the sensor, the mount information (Mount Info.) of the sensor, and the position coordinates (World Coordinate) of the sensor. Additionally the configuration information includes a sensor ID (ID=S2) as the information on the sensor Y (SensorY) that has generated the sensor information Y. In addition, these are examples and a part of the above-described information may be included as a sensor information.

Additionally, attribute information S, which indicates the sensor ID (S1 or S2), is included in the information on each point. In this manner, identification information (sensor ID) indicating from which sensor the data for each point has been obtained is indicated for each point.

Figure 41:
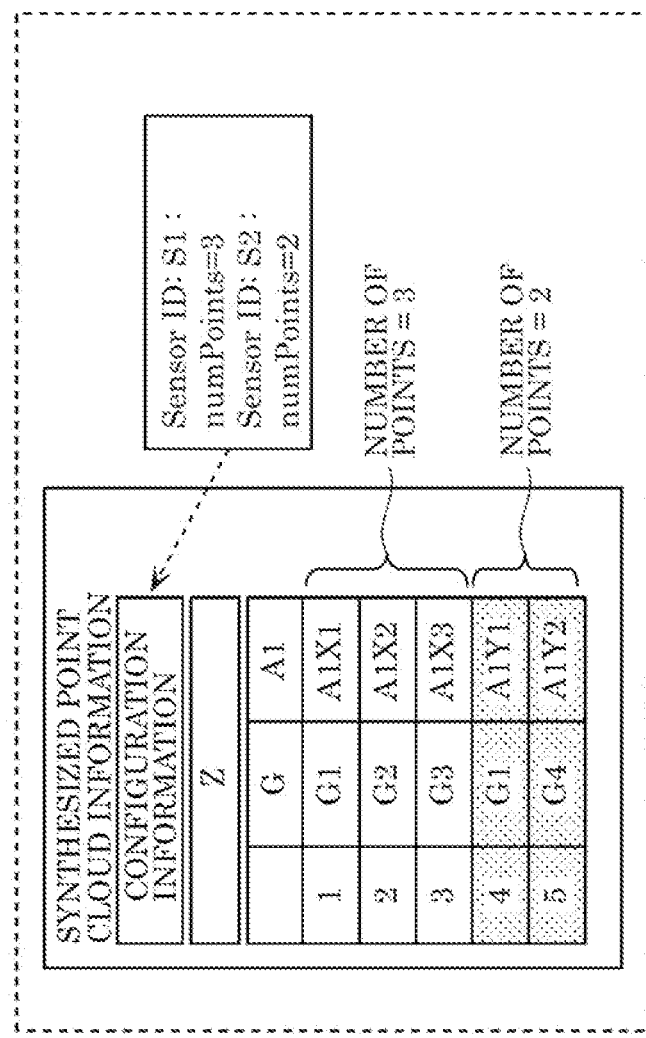
FIG. 41 is a diagram illustrating an example of synthesized point cloud information according to Embodiment 2.

FIG. 41 is a diagram illustrating an example in which the identification information indicating from which sensor the data for each point has been obtained is indicated in the configuration information. The configuration information illustrated in FIG. 41 includes the number of the points (numPoints) included in the synthesized point cloud information for each ID.

Additionally here, although the description has been given about the points obtained by sensing means such as the sensors, this is not the limitation. For example, an artificially given point may be defined as "Sensor ID: S4, . . . the point obtained by means other than the sensing means", since it is not the point obtained by the sensing means, and S4 may be given to the attribute information S, or a fixed value that means invalidation may be indicated in the attribute information S. Accordingly, the three-dimensional data decoding device can identify the point obtained by means that is not the sensing means in the synthesized point cloud.

Additionally the configuration information may include the information identifying a point obtained by means that is not the sensing means, or may include a flag indicating that the synthesized point cloud includes the point obtained by the means that is not the sensing means. Accordingly the three-dimensional data decoding device can distinguish whether or not the synthesized point cloud includes a point obtained by means that is not, the sensing means.

In addition, the example illustrated in FIG. 41, etc, is an example in which duplicated points are written as they are, when the geometry information is duplicated between the sensor information X and the sensor information Y (the first and fourth items of geometry information are G1 and are the same). Note that the three-dimensional data encoding device may merge the duplicated points with a predetermined method, or may select either one of the duplicated points. When merging the duplicated points, the three-dimensional data encoding device indicates, in the synthesized point cloud information, that the point is the data obtained by merging the items of information obtained from a plurality of sensors. For example, sensor ID (Sensor ID)=S1 indicates the data obtained by the sensor X, sensor ID=S2 indicates the data obtained by the sensor Y, and sensor ID=S3 indicates the data obtained by merging the data of the sensor X and the sensor Y.

Figure 42:
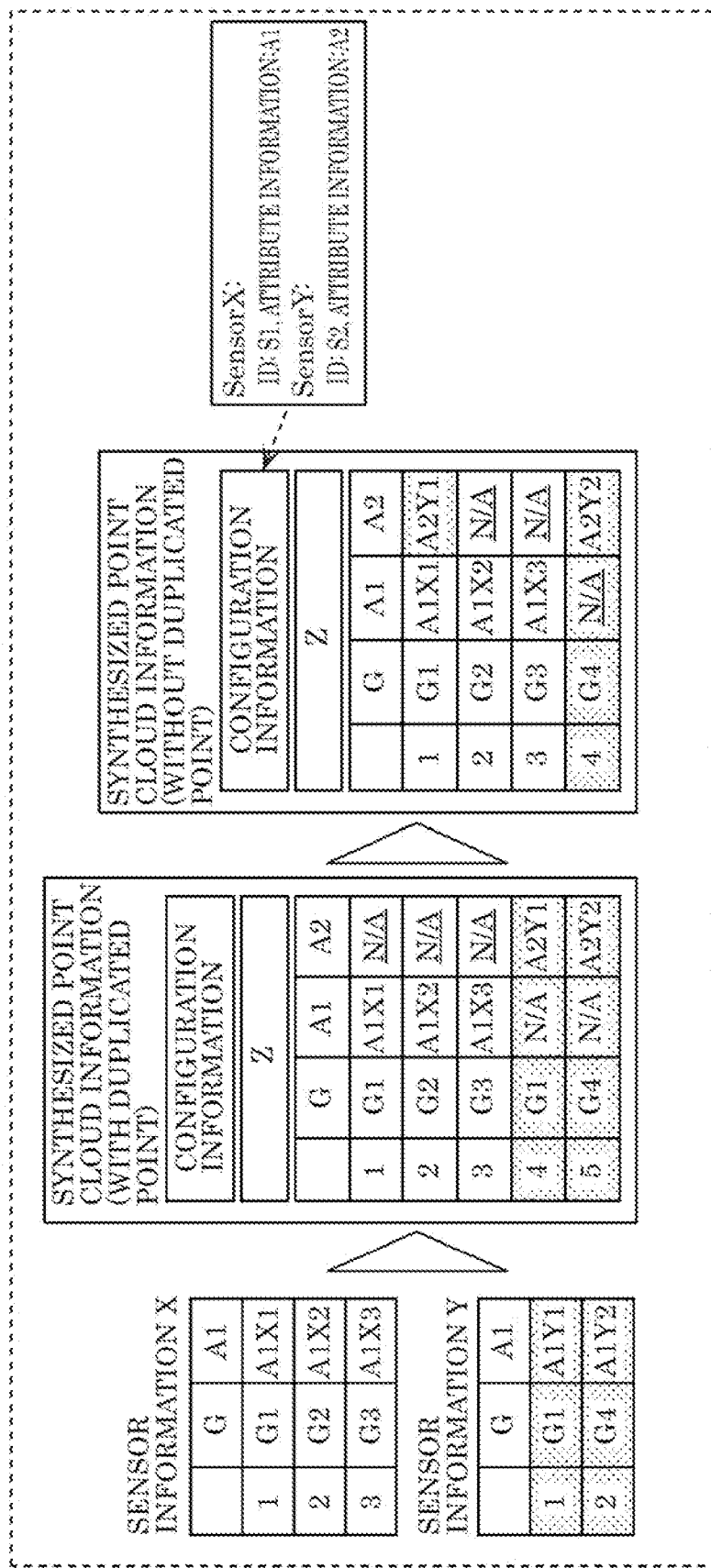
FIG. 42 is a diagram for describing the synthesizing process according to Embodiment 2.

Hereinafter, an example will be described in which the sensor information X and the sensor information Y have different attribute information. FIG. 42 is a diagram for describing a synthesizing process in this case. As illustrated in FIG. 42, the three-dimensional data encoding device obtains attribute information A1 (for example, color information) and attribute information A2 (for example, reflectance), which are different, from different items of sensor information, respectively, and synthesizes these. The configuration information includes the information on attribute information A1 and A2, and the identification information.

There are points whose items of geometry information are duplicated, and points whose items of geometry information are not duplicated in the points obtained by the sensor X and the sensor Y. When the geometry information is duplicated, in the synthesized geometry information, attribute information A1 and attribute information A2 exist for one item of geometry information. When the geometry information is not duplicated, in the synthesized geometry information, either one of attribute information A1 and attribute information A2 exists for one item of geometry information.

At this time, when the attribute information does not exist, information (N/A) indicating that the attribute information is not valid is indicated. Note that, although N/A is written in FIG. 42, it may be indicated by fixed values, such as 0 or −1, that it is not valid. Note that the information on a point including the attribute information that is not valid need not be indicated. Alternatively, the attribute information that is not valid may be interpolated or estimated with a predetermined method. In addition, the flag which shows whether the attribute information which is not valid is included may be included in configuration information.

Figure 43:
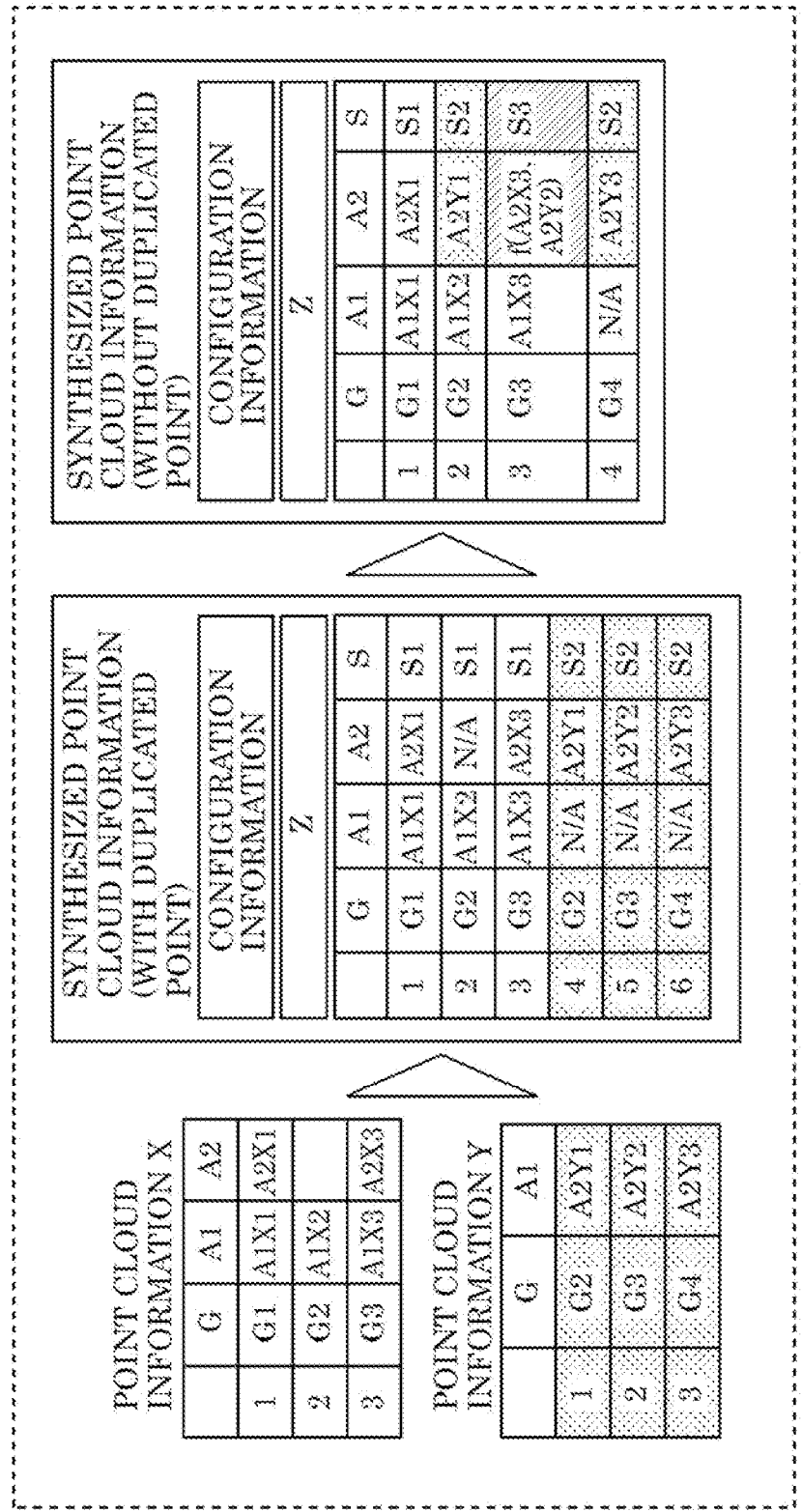
FIG. 43 is a diagram for describing the synthesizing process according to Embodiment 2.

Next, an example will be described in which point cloud information X has the attribute information A and the attribute information B, and point cloud information Y has the attribute information B. FIG. 43 is a diagram for describing the synthesizing process in this case.

The point cloud information X is point cloud information including two or more items of attribute information obtained from one item of sensor information. Note that the point cloud information X may be point cloud information converted from two or more items of sensor information in advance. Additionally the point cloud information Y is point cloud information having one item of attribute information.

In the point cloud information X, geometry information G2 does not have the valid attribute information A2. Additionally geometry information G2 and geometry information G3 are duplicated between the point cloud information X and the point cloud information Y.

The synthesized point cloud information (with duplicated point) is an example in which the information on duplicated points are individually written. The number of points included in the synthesized point cloud information is equal to what is obtained by synthesizing the numbers of points of the point cloud information before synthesizing. Additionally the configuration information indicates that the attribute information S is the identification information that indicates from which sensor the point information (the geometry information and the attribute information) has been obtained. Additionally the attribute information S is added as the information for each point.

The synthesized point cloud information (without duplicated point) is an example in which the items of information on the duplicated points in the synthesized point cloud information (with duplicated point) are merged. All attribute information A1 is the data obtained by the sensor X, and attribute information A2 is any one of the data obtained by the sensor X, the data obtained by the sensor Y, the data based on both data, and N/A.

The configuration information indicates that attribute information A1 has been obtained by the sensor X. Additionally, the attribute information indicates that the attribute information S is information indicating from which sensor attribute information A2 has been obtained, Note that the information indicating from which sensor attribute information A1 has been obtained may be provided as another attribute information.

Note that a flag indicating whether or not the duplicated points have been merged may be included in the configuration information in synthesizing the point cloud information. Additionally, a flag indicating whether or not the items of attribute information have been merged in merging of the duplicated points may be included in the configuration information, and an identifier indicating the method of merging may be included in the configuration information. Alternatively, when one item of attribute information has been selected without merging, an identifier indicating the selection criterion may be included in the configuration information.

The attribute information S indicates from which sensor the data of each point of attribute information A2 has been obtained. For example, sensor ID (Sensor ID)=S1 indicates the data obtained by the sensor X, sensor ID=S2 indicates the data obtained by the sensor Y, and sensor ID=S3 indicates that the data of the sensor X and the sensor Y is merged data.

Additionally, f(A2X3, A2Y2) in FIG. 43 indicates a value derived with a predetermined method that uses A2X3 and A2Y2. The predetermined method is an average value, a weighted average, or a method of selecting one value from a plurality of values based on a predetermined reference value (for example, the reliability of a sensor), etc.

As described above, by indicating, in the configuration information or the attribute information, from which sensor information or which point cloud information the point cloud data or the attribute information of the point cloud data is obtained, it is possible to realize efficient encoding or various flexible functions in the subsequent encoder or decoder, multiplexer or demultiplexer, or an application process.

Note that, here, although the example has been illustrated in which there are two items of attribute information, there may be three or more items of attribute information, or there may be a point cloud that does not include the attribute information.

Additionally, the attribute information S may be not only the information indicating from which sensor the point cloud information or the attribute information has been obtained, but also the information indicating from which sensor the geometry information has been obtained, or may indicate which class of data the combination of points is, by defining combinations (classes) of the geometry information and the attribute information.

Additionally, similar to FIG. 40, the configuration information illustrated in FIG. 43 may include, in addition to the sensor ID, at least one of the sensor information (Sensor), the version (Version) of the sensor, the maker name (Maker) of the sensor, the mount information (Mount Info.) of the sensor, and the position coordinates of the sensor (World Coordinate). Accordingly, the three-dimensional data decoding device can obtain the information on various sensors from the configuration information.

Figure 44:
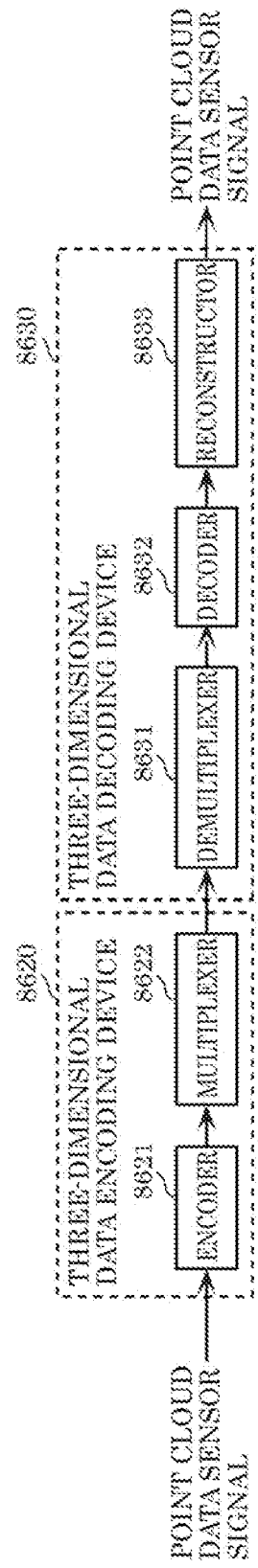
FIG. 44 is a block diagram of a three-dimensional data encoding decoding system according to Embodiment 2.

Next, the encoding method of the synthesized point cloud data will be described. FIG. 44 is a block diagram of a three-dimensional data encoding decoding system. The system illustrated in the diagram includes three-dimensional data encoding device 8620 and three-dimensional data decoding device 8630. Three-dimensional data encoding device 8620 includes encoder 8621 and multiplexer 8622. Encoder 8621 generates encoded data by encoding the synthesized point cloud data (or sensor signal). Multiplexer 8622 generates a multiplexed signal (bitstream) by multiplexing the encoded data.

Three-dimensional data decoding device 8630 includes demultiplexer 8631, decoder 8632, and reconstructor 8633. Demultiplexer 8631 generates encoded data by demultiplexing the multiplexed signal. Decoder 8632 generates decoded data by decoding the encoded data. Reconstructor 8633 restores point cloud data (or sensor signal) by reconstructing the decoded data.

Figure 45:
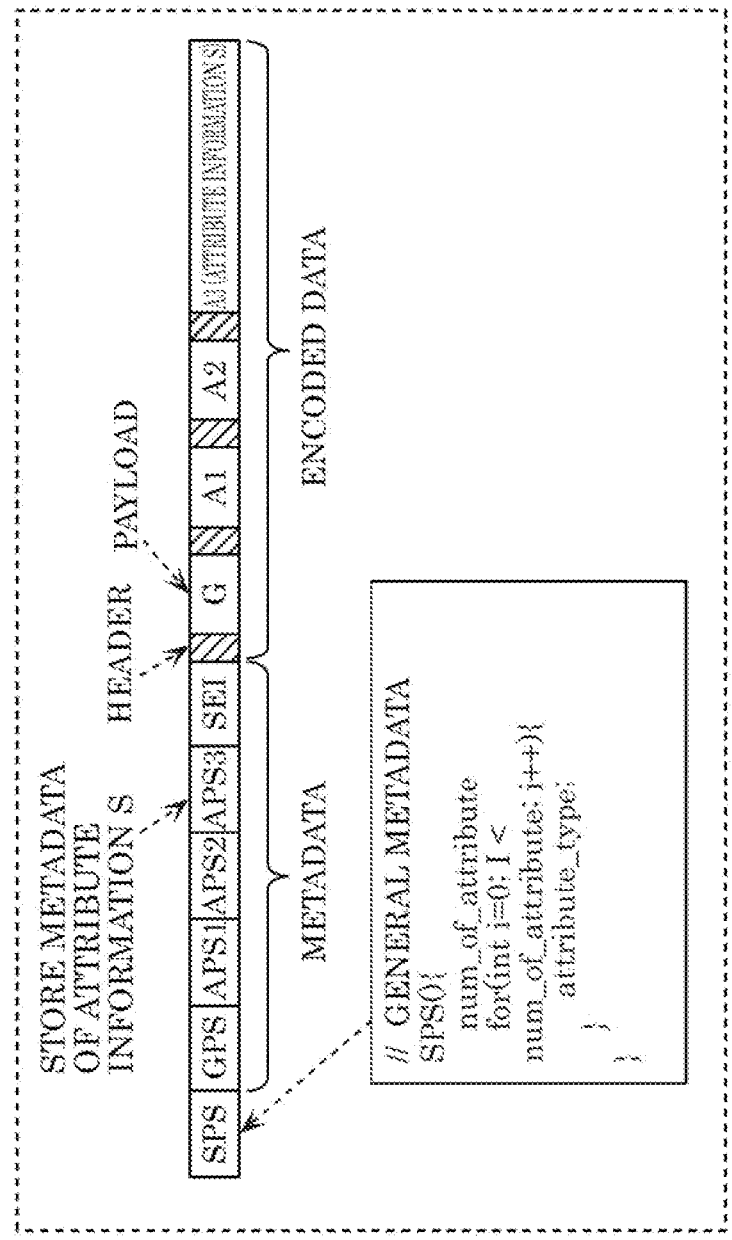
FIG. 45 is a diagram illustrating a configuration example of a bitstream according to Embodiment 2.

FIG. 45 is a diagram illustrating the structure of a bitstream including metadata and encoded data. SPS, which is the general metadata, includes a list of attribute information included in the point cloud data. The identification information (attribute_type) of the attribute information is stored in the list.

The attribute information (for example, "sensor attribute") indicating from which sensor the point cloud information or the attribute information has been obtained is defined. When the attribute information of attribute_type="sensor attribute" is included in the general point cloud information, attribute_type="sensor attribute" is indicated in the list of attribute information in the general metadata. Whether the sensor attribute information is one dimension or two dimensions may be defined, and the number of dimensions may be indicated.

Additionally, when not required for encoding, the general sensor information (Z) is stored in a SEI, which is an option, and when required for encoding, the general sensor information (Z) is stored in a SPS or an APS, etc. In addition, the metadata on the sensor attribute obtained from the configuration information is stored in metadata APS3 on the sensor attribute. Each of Geometry information G, attribute information A1, attribute information A2, and the attribute information S indicating the sensor attribute is compressed by entropy encoding, and is output as encoded data.

Additionally, SPS illustrated in FIG. 45 is the metadata of the entire encoded data, GPS is the metadata of the geometry information, APS is the metadata for each attribute information, SEI is the metadata of an option, G is the encoded data of the geometry information, and A1, A2, and A3 are attribute information encoded data.

Figure 46:
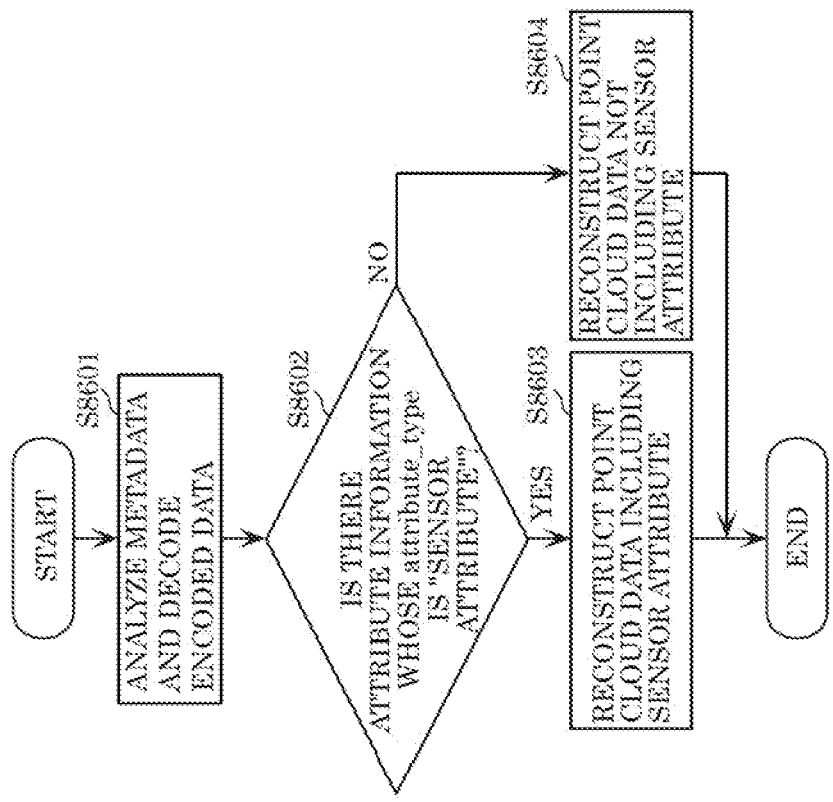
FIG. 46 is a flowchart of a decoding process according to Embodiment 2.

Next, the decoding method and a utilization example of the synthesized point cloud data will be described. FIG. 46 is a flowchart of the decoding process in the three-dimensional data decoding device. First, the three-dimensional data decoding device analyzes the metadata included in a bitstream, obtains the information on the geometry information and the attribute information constituting encoded data, and decodes each encoded data (S8601).

Additionally, the three-dimensional data decoding device determines whether or not the encoded data includes the attribute information whose attribute_type is "sensor attribute" (S8602). When the attribute information of the sensor attribute is included in the encoded data (Yes in S8602), the three-dimensional data decoding device reconstructs point cloud data including the sensor attribute (S8603). When the attribute information of the sensor attribute is not included in the encoded data (No in S8602), the three-dimensional data decoding device reconstructs point cloud data that does not include the sensor attribute (S8604).

Figure 47:
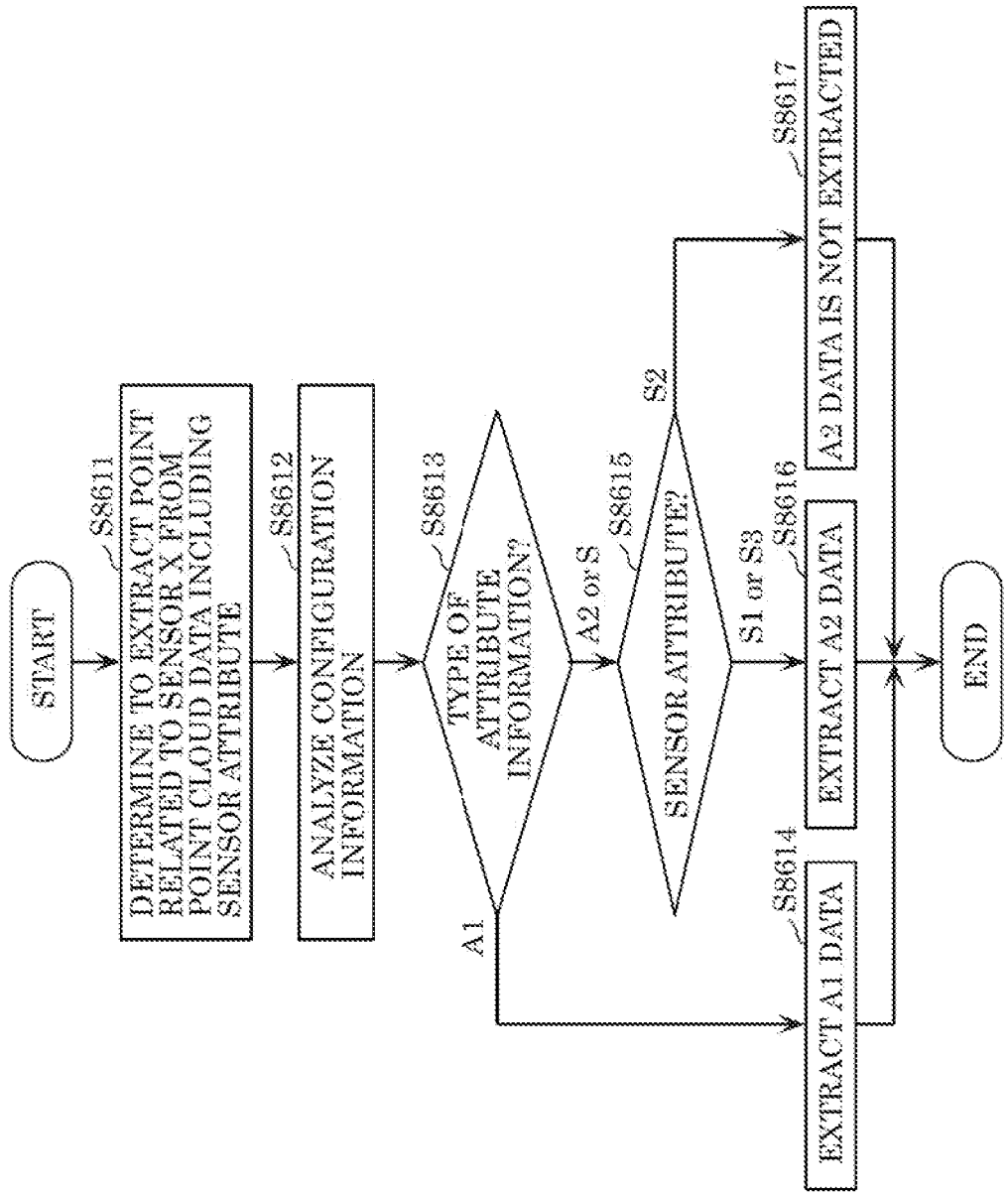
FIG. 47 is a flowchart of an extraction process according to Embodiment 2.
Figure 48:
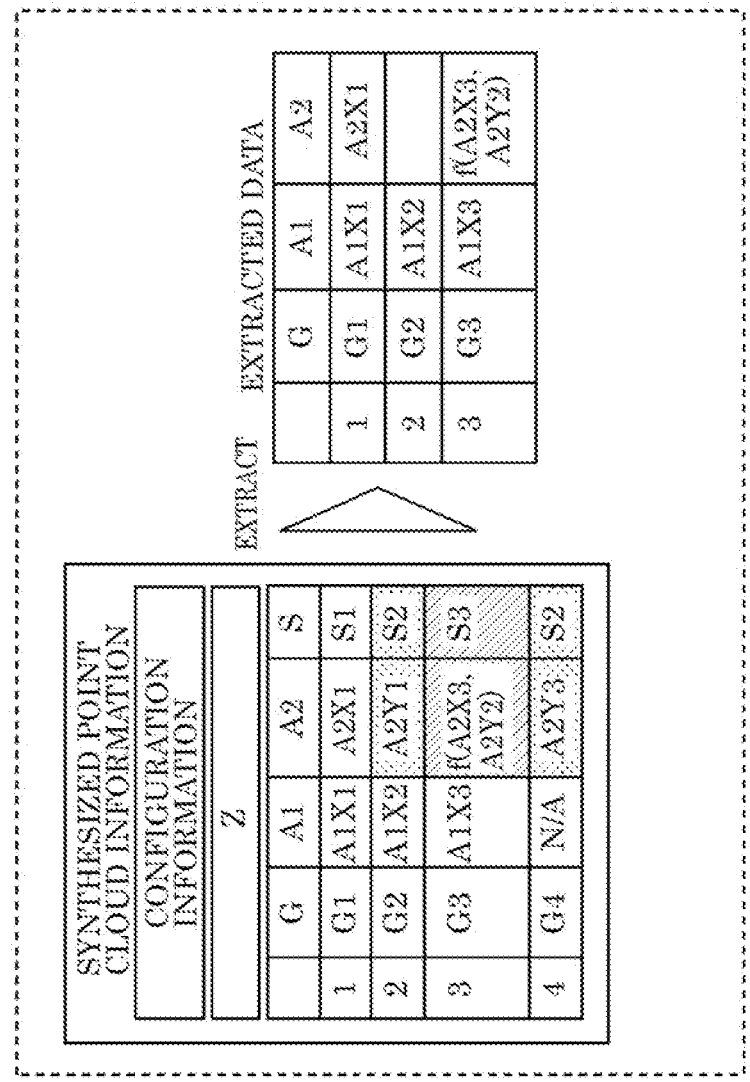
FIG. 48 is a diagram illustrating an example of the extraction process according to Embodiment 2.

FIG. 47 is a flowchart illustrating the processing of extracting a specific point from the point cloud data including the sensor attribute. Additionally FIG. 48 is a diagram illustrating an example of data extraction. First, the three-dimensional data decoding device determines to extract a point related to the sensor X (SensorX) from the point cloud data including the sensor attribute (S8611). Next, the three-dimensional data decoding device analyzes the configuration information, and recognizes that attribute information A1 has been obtained by the sensor X, and that the attribute information S indicates from which sensor attribute information A2 has been obtained (S8612).

Next, the three-dimensional data decoding device determines the type of the attribute information (S8613). When the type of the attribute information is A1 (A1 in S8613), the three-dimensional data decoding device determines that the data is based on the sensor X, and extracts A1 data (S8614). Note that, when data is N/A, the three-dimensional data decoding device does not extract the data.

When the type of the attribute information is A2 or S (A2 or S in S8613), the three-dimensional data decoding device analyzes the sensor attribute of A2 based on the attribute information S (S8615). When the sensor attribute is S1 or S3 (S1 or S3 in S8615), the three-dimensional data decoding device determines that the data is based on the sensor X, and extracts A2 data (S8616). On the other hand, when the sensor attribute is S2 (S2 in S8615), the three-dimensional data decoding device determines that the data is based on the sensor y and does not extract A2 data (S8617).

Note that, when the sensor attribute is S3 in the analysis of the sensor attribute (S8615), the three-dimensional data decoding device may convert or correct the merged f(A2X3, A2Y2) with a predetermined method. Additionally when extracting the original data obtained by the sensor X, the three-dimensional data decoding device need not extract the data of S3 in the analysis of the sensor attribute.

Additionally similar to FIG. 40, the configuration information illustrated in FIG. 48 includes, in addition to the sensor ID, at least one of the sensor information (Sensor), the version (Version) of the sensor, the maker name (Maker) of the sensor, the mount information (Mount Info.) of the sensor, and the position coordinates of the sensor (World Coordinate). Accordingly the three-dimensional data decoding device can obtain the information on various sensors from the configuration information.

Next, the encoding method of the synthesized point cloud data in the case of performing data dividing will be described. Data dividing is effective for speeding up by parallel processing, and the coding efficiency improvement by the grouping of the attribute information having the same attribute, and the point cloud data is divided with a predetermined method.

Figure 49:
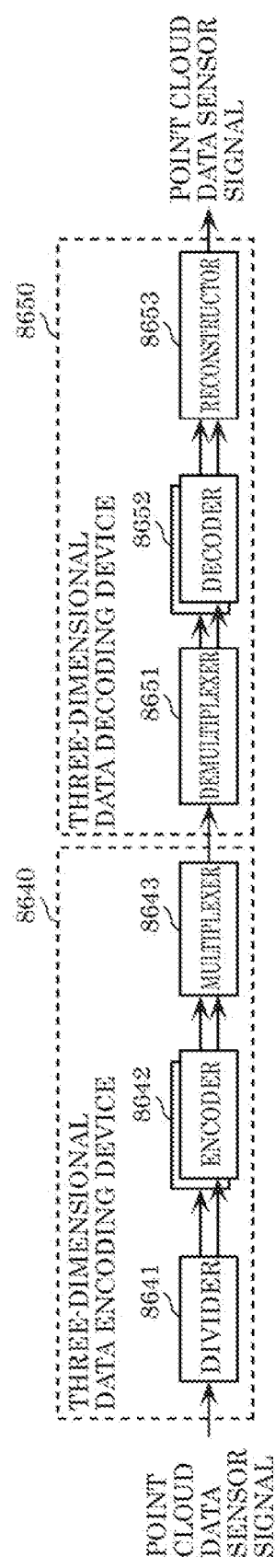
FIG. 49 is a block diagram of a three-dimensional data encoding decoding system according to Embodiment 2.

FIG. 49 is a block diagram of a three-dimensional data encoding decoding system. The system illustrated in the diagram includes three-dimensional data encoding device 8640 and three-dimensional data decoding device 8650. Three-dimensional data encoding device 8640 includes divider 8641, a plurality of encoders 8642, and multiplexer 8643.

Divider 8641 generates a plurality of divided data by dividing point cloud data into a plurality of data units, such as tiles or slices. Alternatively, divider 8641 generates a plurality of divided data by dividing the attribute information included in the point cloud data for each sensor information.

A plurality of encoders 8642 encode the plurality of divided data for each dividing unit to generate a plurality of encoded data. Multiplexer 8643 generates a multiplexed signal (bitstream) by multiplexing the plurality of encoded data.

Three-dimensional data decoding device 8650 includes demultiplexer 8651, a plurality of decoders 8652, and reconstructor 8653. Demultiplexer 8651 generates a plurality of encoded data by demultiplexing the multiplexed signal. Decoders 8652 generate a plurality of decoded data by decoding the plurality of items of encoded data. Reconstructor 8653 reconstructs the point cloud data by reconstructing the plurality of decoded data.

Figure 50:
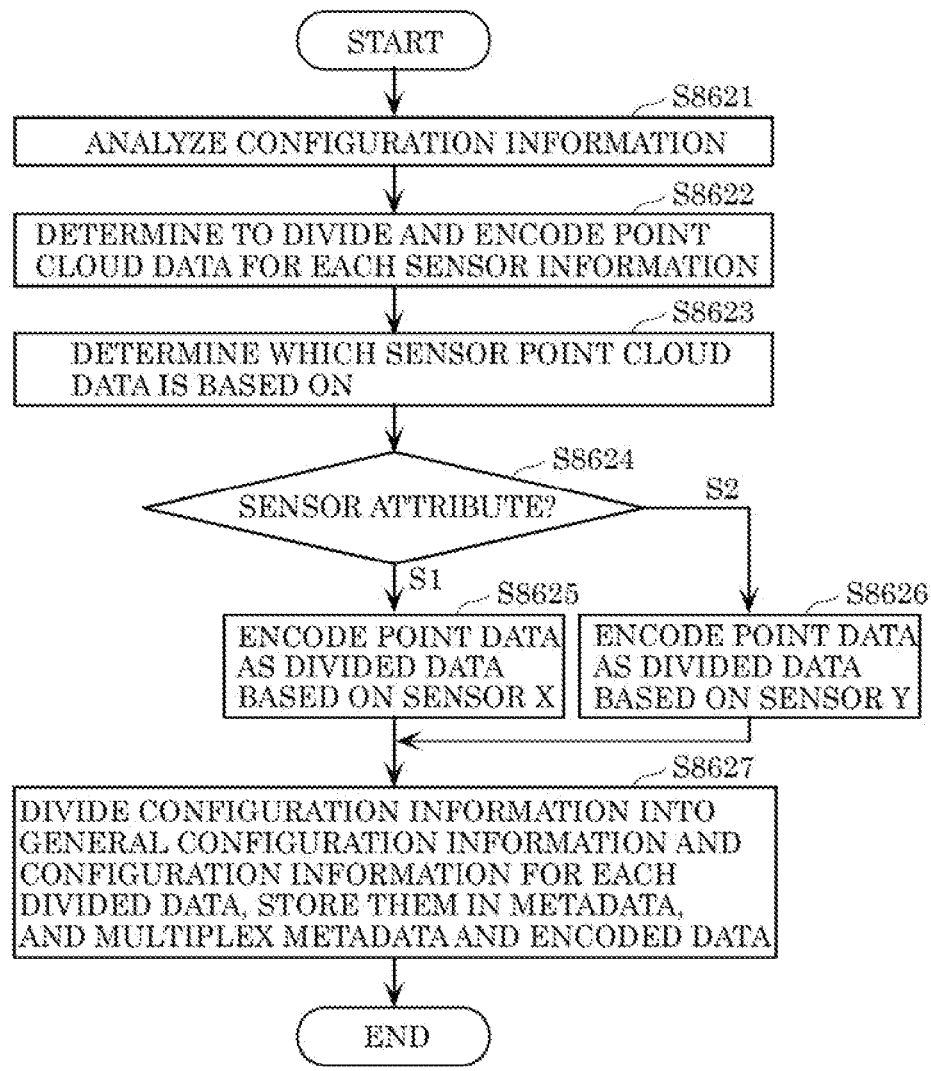
FIG. 50 is a flowchart of an encoding process according to Embodiment 2.

FIG. 50 is a flowchart of the encoding process in the case of performing data dividing for each sensor information. First, a three-dimensional data encoding device analyzes the configuration information on input point cloud data (S8621). Next, it is determined that the three-dimensional data encoding device will divide and encode point cloud data (geometry information and attribute information) for each sensor information (S8622). For example, it may be determined that the three-dimensional data encoding device will divide the point cloud data when it is determined based on configuration information that the coding efficiency is better when dividing is performed. Or a three-dimensional data encoding device may actually estimate a coding efficiency and may determine whether to perform division based on the result. Or a three-dimensional data encoding device may determine whether to perform division based on the instructions from the outside, such as an application.

Next, a three-dimensional data encoding device determines on which sensor point data is based (S8623). A sensor attribute is S1, and when point data is based on the sensor X (it is S1 at S8624), a three-dimensional data encoding device encodes the data concerned as divided data based on the sensor X (S8625). On the other hand, a sensor attribute is S2, and when point data is based on the sensor Y (it is S2 at S8624), a three-dimensional data encoding device encodes the data concerned as divided data based on the sensor Y (S8626).

Next, a three-dimensional data encoding device divides the configuration information on input data into general configuration information and the configuration information for each divided data, and stores general configuration information and the configuration information for each divided data in metadata. In addition, a three-dimensional data encoding device generates a multiplexed signal (bitstream) by multiplexing metadata and encoded data (S8627).

Figure 51:
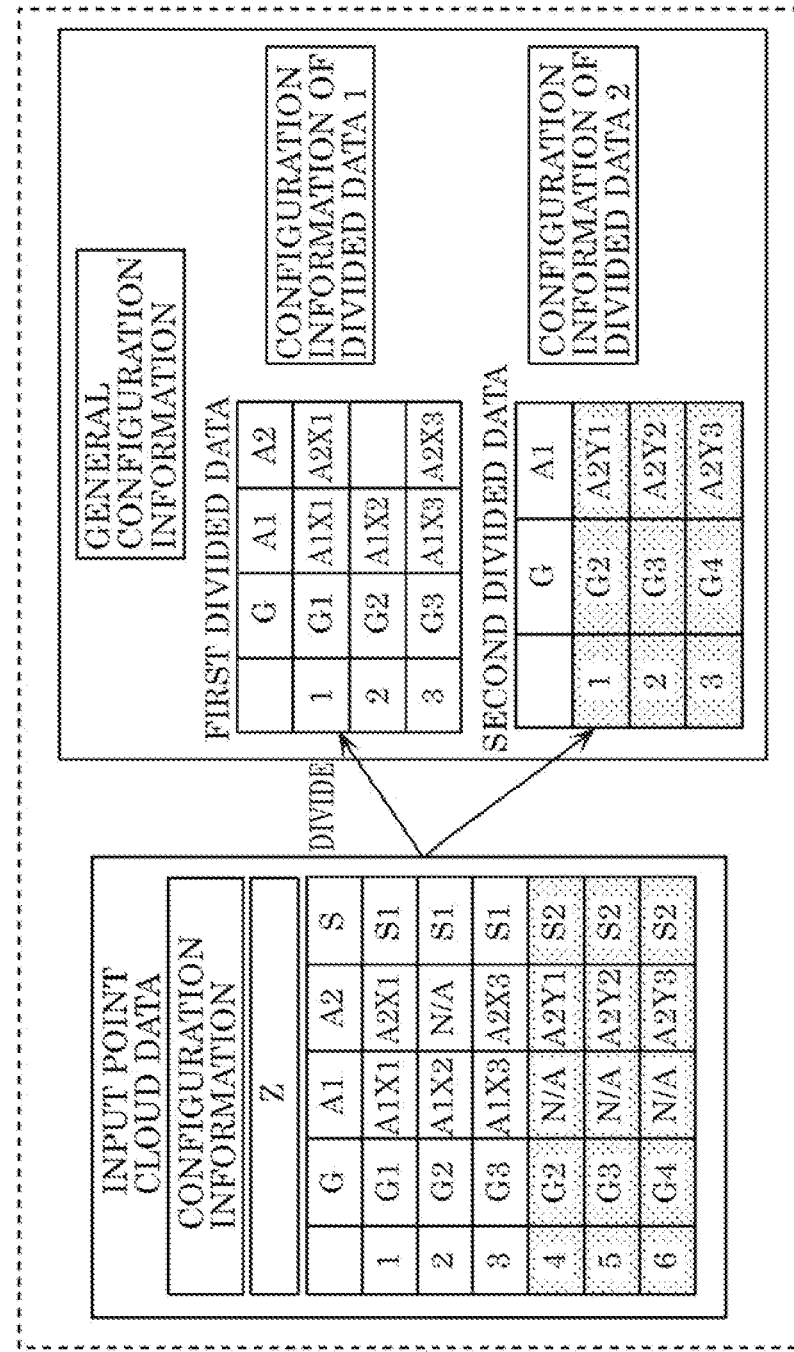
FIG. 51 is a diagram for describing a division process according to Embodiment 2.

FIG. 51 is a flowchart illustrating an example of this dividing process. As illustrated in FIG. 51, first divided data has attribute information A1 and A2, and second divided data has attribute information A2, and does not have attribute information A1.

Additionally, similar to FIG. 40, at least one of the general configuration information illustrated in FIG. 51 and the configuration information for each divided data includes, in addition to the sensor ID, at least one of the sensor information (Sensor), the version (Version) of the sensor, the maker name (Maker) of the sensor, the mount information (Mount Info.) of the sensor, and the position coordinates of the sensor (World Coordinate). Accordingly the three-dimensional data decoding device can obtain the information on various sensors from the configuration information.

Figure 52:
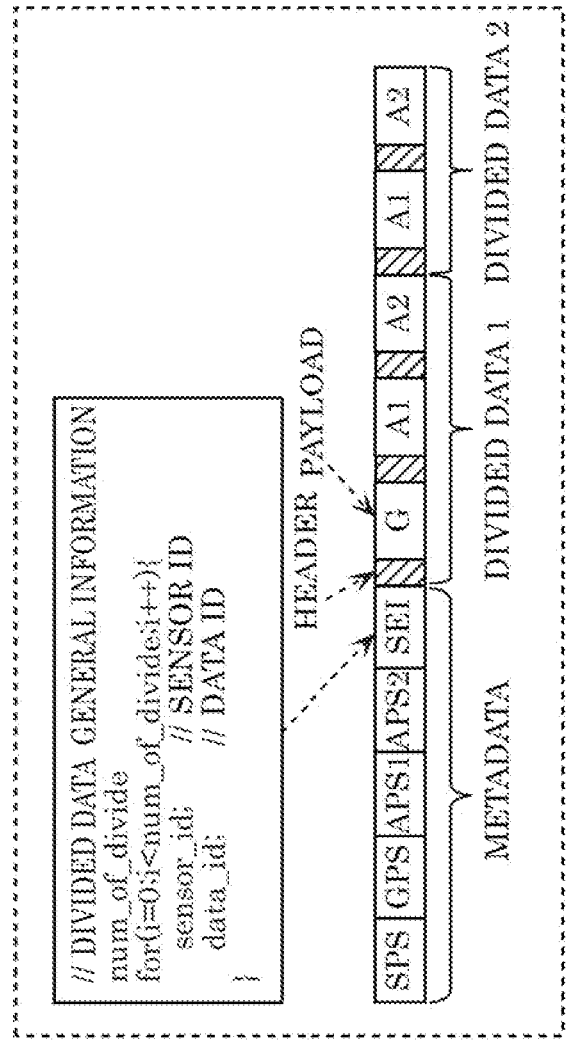
FIG. 52 is a diagram illustrating a configuration example of a bitstream according to Embodiment 2.

Hereinafter, an example of decoding and application of divided data will be described. First, the information on divided data will be described. FIG. 52 is a diagram illustrating a configuration example of a bitstream. The general information of divided data indicates, for each divided data, the sensor ID (sensor id) and data ID (data_id) of the divided data. Note that the data ID is also indicated in the header of each encoded data.

Note that, similar to FIG. 40, the general information of divided data illustrated in FIG. 52 includes, in addition to the sensor ID, at least one of the sensor information (Sensor), the version (Version) of the sensor, the maker name (Maker) of the sensor, the mount information (Mount Info.) of the sensor, and the position coordinates of the sensor (World Coordinate). Accordingly, the three-dimensional data decoding device can obtain the information on various sensors from the configuration information.

The general information of divided data may be stored in SPS, UPS, or APS, which is the metadata, or may be stored in SEI, which is the metadata not required for encoding. Additionally, at the time of multiplexing, the three-dimensional data encoding device stores the SEI in a file of ISOBMFF. The three-dimensional data decoding device can obtain desired divided data based on the metadata.

In FIG. 52, SPS is the metadata of the entire encoded data, UPS is the metadata of the geometry information, APS is the metadata for each attribute information, G is encoded data of the geometry information for each divided data, and A1, etc. are encoded data of the attribute information for each divided data.

Figure 53:
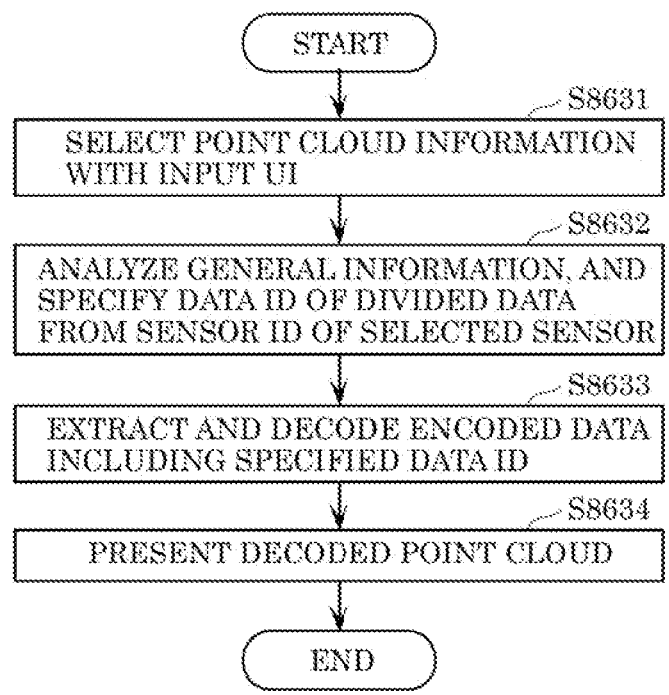
FIG. 53 is a flowchart of a point cloud selection process according to Embodiment 2.
Figure 54:
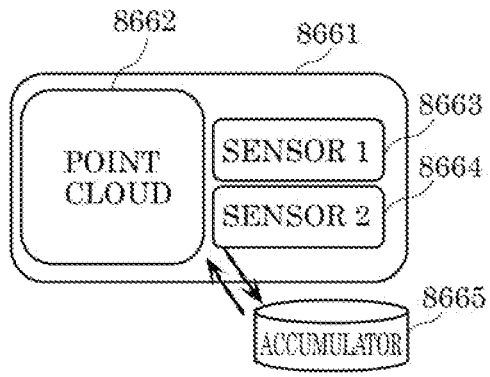
FIG. 54 is a diagram illustrating a screen example for point cloud selection process according to Embodiment 2.
Figure 55:
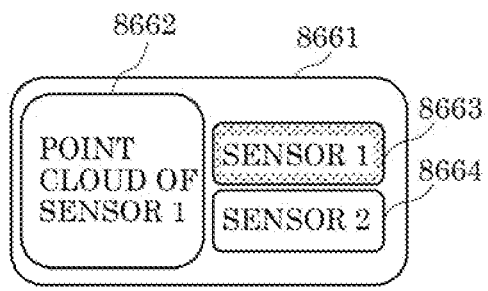
FIG. 55 is a diagram illustrating a screen example of the point cloud selection process according to Embodiment 2.
Figure 56:
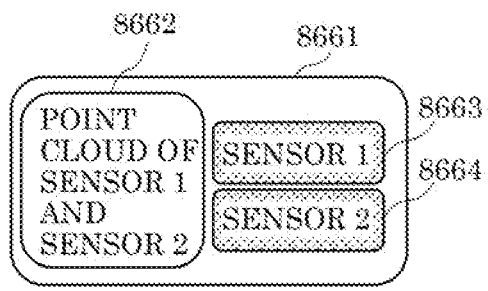
FIG. 56 is a diagram illustrating a screen example of the point cloud selection process according to Embodiment 2.

Next, an application example of divided data will be described. An example of application will be described in which an arbitrary point cloud is selected, and the selected point cloud is presented. FIG. 53 is a flowchart of a point cloud selection process performed by this application. FIG. 54 to FIG. 56 are diagrams illustrating screen examples of the point cloud selection process.

As illustrated in FIG. 54, the three-dimensional data decoding device that performs the application includes, for example, a UI unit that displays an input UI (user interface) 8661 for selecting an arbitrary point cloud. Input UI 8661 includes presenter 8662 that presents the selected point cloud, and an operation unit (buttons 8663 and 8664) that receives operations by a user. After a point cloud is selected in UI 8661, the three-dimensional data decoding device obtains desired data from accumulator 8665.

First, based on an operation by the user on input UI 8661, the point cloud information that the user wants to display is selected (S8631). Specifically, by selecting button 8663, the point cloud based on sensor 1 is selected. By selecting button 8664, the point cloud based on sensor 2 is selected. Alternatively, by selecting both button 8663 and button 8664, the point cloud based on sensor 1 and the point cloud based on sensor 2 are selected. Note that it is an example of the selection method of point cloud, and it is not limited to this.

Next, the three-dimensional data decoding device analyzes the general information of divided data included in the multiplexed signal (bitstream) or encoded data, and specifies the data ID (data_id) of the divided data constituting the selected point cloud from the sensor ID (sensor_id) of the selected sensor (S8632). Next, the three-dimensional data decoding device extracts, from the multiplexed signal, the encoded data including the specified and desired data ID, and decodes the extracted encoded data to decode the point cloud based on the selected sensor (S8633). Note that the three-dimensional data decoding device does not decode the other encoded data.

Lastly, the three-dimensional data decoding device presents (for example, displays) the decoded point cloud (S8634). FIG. 55 illustrates an example in the case where button 8663 for sensor 1 is pressed, and the point cloud of sensor 1 is presented. FIG. 56 illustrates an example in the case where both button 8663 for sensor 1 and button 8664 for sensor 2 are pressed, and the point clouds of sensor 1 and sensor 2 are presented.

Figure 57:
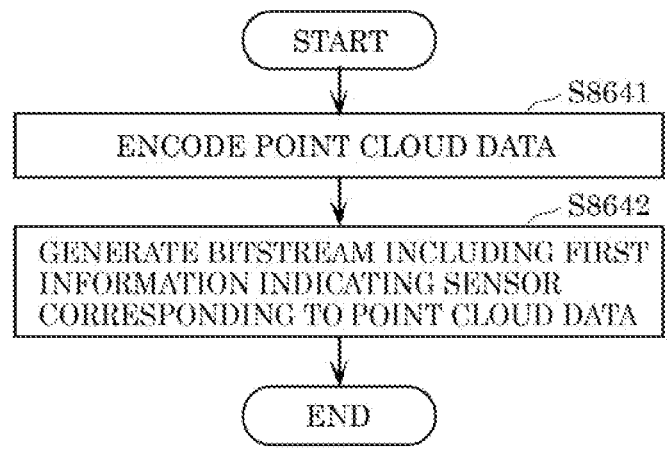
FIG. 57 is a flowchart of a three-dimensional data encoding process according to Embodiment 2.

As described above, the three-dimensional data encoding device according to the present embodiment performs the process described in FIG. 57. The three-dimensional data encoding device encodes point cloud data to generate encoded data (S8641); and generates a bitstream including the encoded data (S8642). The bitstream includes first information indicating a sensor corresponding to the point cloud data (for example, configuration information or attribute information S, and the like).

According to this, the three-dimensional data decoding device can extract the point cloud data obtained by a desired sensor by using the first information. Therefore, the three-dimensional data encoding device can generate a bitstream from which the point cloud data can be appropriately extracted.

For example, as shown in FIG. 40, and so on, the first information includes items of second information (for example, attribute information S) respectively generated for three-dimensional points included in the point cloud data, the items of second information each indicating a sensor corresponding to the three-dimensional point for which the item of second information was generated.

For example, as shown in FIG. 40, and so on, the point cloud data includes, for each of the three-dimensional points, geometry information (for example, G) and one or more items of attribute information (for example, A1), and the items of second information are each included in the encoded data as one (for example, attribute information S) of the one or more items of attribute information of a corresponding one of the three-dimensional points.

For example, as shown in FIG. 40, and so on, the bitstream includes third information (for example, configuration information) which is common to the three-dimensional points, the items of second information are identifiers (for example, S1, etc.) of the sensors, and the third information includes fourth information (for example, ID, etc.) indicating a relationship between the identifiers of the sensors and the sensors.

For example, as shown in FIG. 41, and so on, the bitstream includes third information which is common to the three-dimensional points, and the third information indicates a total number of three-dimensional points (for example, numPoints), among the three-dimensional points, for each of the sensors.

For example, as shown in FIG. 42, and so on, the point cloud data includes, for each of the three-dimensional points, geometry information and one or more items of attribute information, and the first information indicates one or more sensors respectively corresponding to the one or more items of attribute information.

For example, as shown in FIG. 43, the three-dimensional data encoding device further synthesizes first point cloud data which is based on a first sensor and second point cloud data which is based on a second sensor to generate the point-cloud data (for example, synthesized point cloud information (without duplicated point)). In the synthesizing, when attribute information of a first point having same geometry information is included in the first point cloud data and the second point cloud data, attribute information (for example, f (A2X3, A2Y2) based on (i) the attribute information of the first point included in the first point cloud data and (ii) the attribute information of the first point included in the second point cloud data is generated as synthesized attribute information, and the first information indicates that information of the first point included in the point cloud data is based on the first sensor and the second sensor (for example, S8).

For example, as shown in FIG. 51, the three-dimensional data encoding device, in the encoding of the point cloud data: divides the point cloud data into first point cloud data which is based on a first sensor and second point cloud data which is based on a second sensor; and encodes the first point cloud data and the second point cloud data to generate the encoded data. The bitstream includes first control information (for example, configuration information of divided data 1) for the first point, cloud data and second control information (for example, configuration information of divided data 2) for the second point cloud data. The first information includes (i) information included in the first control information and indicating a sensor corresponding to the first point cloud data and (ii) information included in the second control information and indicating a sensor corresponding to the second point cloud data.

For example, as shown in FIG. 51, the three-dimensional data encoding device, in the encoding of the point cloud data: divides the point cloud data into first point cloud data which is based on a first sensor and second point cloud data which is based on the second sensor; and encodes the first point cloud data and the second point cloud data to generate the encoded data. The bitstream includes control information (for example, general configuration information) which is common to the first point cloud data and the second point cloud data, and the first information is included in the control information.

For example, the three-dimensional data encoding device includes a processor and memory, and the processor performs the above process using the memory.

Figure 58:
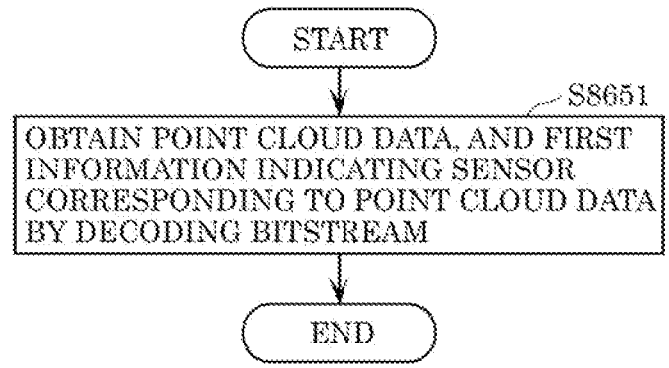
FIG. 58 is a flowchart of a three-dimensional data decoding process according to Embodiment 2.

Furthermore, the three-dimensional data decoding device according to the present embodiment performs the process described in FIG. 58. The three-dimensional data decoding device decodes a bitstream including (i) encoded data generated by encoding point cloud data and (ii) first information indicating a sensor corresponding to the point cloud data, to obtain the first information and the point cloud data (S8651). For example, the three-dimensional data decoding device obtains the point cloud data corresponding to a desired sensor from the bitstream using the obtained first information.

According to this, the three-dimensional data decoding device can obtain the point cloud data by decoding the bitstream from which the point cloud data can be appropriately extracted.

For example, as shown in FIG. 40, and so on, the first information includes items of second information (for example, attribute information S) respectively generated for three-dimensional points included in the point cloud data, the items of second information each indicating a sensor corresponding to the three-dimensional point for which the item of second information was generated.

For example, as shown in FIG. 40, and so on, the point cloud data includes, for each of the three-dimensional points, geometry information (for example, G) and one or more items of attribute information (for example, A1), and the items of second information are each included in the encoded data as one (for example, attribute information S) of the one or more items of attribute information of a corresponding one of the three-dimensional points.

For example, as shown in FIG. 40, and so on, the bitstream includes third information (for example, configuration information) which is common to the three-dimensional points, the items of second information are identifiers (for example, S1, etc.) of the sensors, and the third information includes fourth information (for example, ID, etc.) indicating a relationship between the identifiers of the sensors and the sensors.

For example, as shown in FIG. 41, and so on, the bitstream includes third information which is common to the three-dimensional points, and the third information indicates a total number of three-dimensional points (for example, numPoints), among the three-dimensional points, for each of the sensors.

For example, as shown in FIG. 42, and so on, the point cloud data includes, for each of the three-dimensional points, geometry information and one or more items of attribute information, and the first information indicates one or more sensors respectively corresponding to the one or more items of attribute information.

For example, as shown in FIG. 43, the point cloud data (for example, synthesized point cloud information (without duplicated point)) is generated by synthesizing first point cloud data which is based on a first sensor and second point cloud data which is based on a second sensor. In the synthesizing, when attribute information of a first point having same geometry information is included in the first point cloud data and the second point cloud data, attribute information (for example, f(A2X3, A2Y2) based on (i) the attribute information of the first point included in the first point cloud data and (ii) the attribute information of the first point included in the second point cloud data is generated as synthesized attribute information, and the first information indicates that information of the first point included in the point cloud data is based on the first sensor and the second sensor (for example, S3).

For example, as shown in FIG. 51, the encoded data is generated by dividing the point cloud data into first point cloud data which is based on a first sensor and second point cloud data which is based on a second sensor, and encoding the first point cloud data and the second point cloud data. The bitstream includes first control information (for example, configuration information of divided data 1) for the first point cloud data and second control information (for example, configuration information of divided data 2) for the second point cloud data. The first information includes (i) information included in the first control information and indicating a sensor corresponding to the first point cloud data and (i) information included in the second control information and indicating a sensor corresponding to the second point cloud data.

For example, as shown in FIG. 51, the encoded data is generated by dividing the point cloud data into first point cloud data which is based on a first sensor and second point cloud data which is based on a second sensor, and encoding the first point cloud data and the second point cloud data. The bitstream includes control information (for example, general configuration information) which is common to the first point cloud data and the second point cloud data, and the first information is included in the control information.

For example, the three-dimensional data decoding device includes a processor and memory, and the processor performs the above process using the memory.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the above embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

What is claimed is:

1. A three-dimensional data encoding method, comprising:
    encoding first point cloud data obtained by a plurality of sensors to generate encoded data; and
    generating a bitstream including the encoded data,
    wherein for each of three-dimensional points included in the first point cloud data, the first point cloud data includes (i) geometry information indicating a three-dimensional position of the three-dimensional point and (ii) one or more items of attribute information of the three-dimensional point,
    wherein the bitstream includes first information includes configuration information indicating the plurality of sensors from which the first point cloud data is obtained,
    wherein the first information includes items of second information respectively generated for the three-dimensional points included in the first point cloud data so that each of the items of second information corresponds one-to-one with each of the three-dimensional points included in the first point cloud data,
    wherein each of the items of second information indicates (i) the three-dimensional point corresponding to the item of second information, (ii) the geometry information indicating the three-dimensional position of the three-dimensional point corresponding to the item of second information, (iii) the one or more items of attribute information of the three-dimensional point corresponding to the item of second information, and (iv) a sensor, among the plurality of sensors indicated in the first information, from which data corresponding to the three-dimensional point is obtained, and
    wherein when the first point cloud data is divided into one of more items of second point cloud data, the first point cloud data is divided according to the items of second information.

2. The three-dimensional data encoding method according to claim 1,
    wherein the bitstream includes third information which is common to the three-dimensional points,
    each of the items of second information indicates an identifier of the sensor from which data corresponding to the three-dimensional point is obtained, and
    the third information includes fourth information indicating a relationship between the identifiers of the plurality of sensors and the plurality of sensors.

3. The three-dimensional data encoding method according to claim 1,
    wherein the bitstream includes third information which is common to the three-dimensional points, and
    the third information indicates a total number of three-dimensional points, among the three-dimensional points, for each of the plurality of sensors.

4. The three-dimensional data encoding method according to claim 1, further comprising:
    synthesizing third point cloud data which is based on a first sensor and fourth point cloud data which is based on a second sensor to generate the first point cloud data, the first sensor and the second sensor being included in the plurality of sensors, wherein in the synthesizing, when attribute information of a first point having same geometry information is included in the third point cloud data and the fourth point cloud data, attribute information based on (i) the attribute information of the first point included in the third point cloud data and (ii) the attribute information of the first point included in the fourth point cloud data is generated as synthesized attribute information, and the first information indicates that information of the third point included in the first point cloud data is based on the first sensor and the second sensor.

5. The three-dimensional data encoding method according to claim 1,
wherein in the encoding of the first point cloud data:
the first point cloud data is divided into third point cloud data which is based on a first sensor and fourth point cloud data which is based on a second sensor, the first sensor and the second sensor being included in the plurality of sensors; and
the third point cloud data and the fourth point cloud data are encoded to generate the encoded data,
the bitstream includes first control information for the third point cloud data and second control information for the fourth point cloud data, and
the first information includes (i) information included in the first control information and indicating a sensor corresponding to the third point cloud data and (ii) information included in the second control information and indicating a sensor corresponding to the fourth point cloud data.

6. The three-dimensional data encoding method according to claim 1,
wherein in the encoding of the first point cloud data:
the first point cloud data is divided into third point cloud data which is based on a first sensor and fourth point cloud data which is based on the second sensor, the first sensor and the second sensor being included in the plurality of sensors; and
the third point cloud data and the fourth point cloud data are encoded to generate the encoded data,
the bitstream includes control information which is common to the third point cloud data and the fourth point cloud data, and
the first information is included in the control information.

7. A three-dimensional data decoding method, comprising:
decoding a bitstream including encoded data generated by encoding first point cloud data obtained by a plurality of sensors,
wherein for each of three-dimensional points included in the first point cloud data, the first point cloud data includes (i) geometry information indicating a three-dimensional position of the three-dimensional point and (ii) one or more items of attribute information of the three-dimensional point,
wherein the bitstream includes first information including configuration information indicating the plurality of sensors from which the first point cloud data is obtained,
wherein the first information includes items of second information respectively generated for the three-dimensional points included in the first point cloud data so that each of the items of second information corresponds one-to-one with each of the three-dimensional points included in the first point cloud data,
wherein each of the items of second information indicates (i) the three-dimensional point corresponding to the item of second information, (ii) the geometry information indicating the three-dimensional position of the three-dimensional point corresponding to the item of second information, (iii) the one or more items of attribute information of the three-dimensional point corresponding to the item of second information, and (iv) a sensor, among the plurality of sensors indicated in the first information, from which data corresponding to the three-dimensional point is obtained, and
wherein when the first point cloud data is divided into one of more items of second point cloud data, the first point cloud data is divided according to the items of second information.

8. The three-dimensional data decoding method according to claim 7,
wherein the bitstream includes third information which is common to the three-dimensional points,
each of the items of second information indicates an identifier of the sensor from which data corresponding to the three-dimensional point is obtained, and
the third information includes fourth information indicating a relationship between the identifiers of the plurality of sensors and the plurality of sensors.

9. The three-dimensional data decoding method according to claim 7,
wherein the bitstream includes third information which is common to the three-dimensional points, and
the third information indicates a total number of three-dimensional points, among the three-dimensional points, for each of the plurality of sensors.

10. The three-dimensional data decoding method according to claim 7,
wherein the first point cloud data is generated by synthesizing third point cloud data which is based on a first sensor and fourth point cloud data which is based on a second sensor, the first sensor and the second sensor being included in the plurality of sensors, and
in the synthesizing, when attribute information of a first point having same geometry information is included in the third point cloud data and the fourth point cloud data, attribute information based on (i) the attribute information of the first point included in the third point cloud data and (ii) the attribute information of the first point included in the fourth point cloud data is generated as synthesized attribute information, and the first information indicates that information of the first point included in the first point cloud data is based on the first sensor and the second sensor.

11. The three-dimensional data decoding method according to claim 7,
wherein the encoded data includes third point cloud data which is based on a first sensor and fourth point cloud data based on a second sensor, the first sensor and the second sensor being included in the plurality of sensors,
the bitstream includes first control information for the third point cloud data and second control information for the fourth point cloud data, and
the first information includes (i) information included in the first control information and indicating a sensor corresponding to the third point cloud data and (i) information included in the second control information and indicating a sensor corresponding to the fourth point cloud data.

12. The three-dimensional data decoding method according to claim 7,
wherein the encoded data includes third point cloud data which is based on a first sensor and fourth point cloud data based on a second sensor, the first sensor and the second sensor being included in the plurality of sensors,
the bitstream includes control information which is common to the third point cloud data and the fourth point cloud data, and
the first information is included in the control information.

13. A three-dimensional data encoding device, comprising:
a processor; and
memory,
wherein using the memory, the processor:
encodes first point cloud data obtained by a plurality of sensors to generate encoded data; and
generates a bitstream including the encoded data,
wherein for each of three-dimensional points included in the first point cloud data, the first point cloud data includes (i) geometry information indicating a three-dimensional position of the three-dimensional point and (ii) one or more items of attribute information of the three-dimensional point,
wherein the bitstream includes first information includes configuration information indicating the plurality of sensors from which the first point cloud data is obtained,
wherein the first information includes items of second information respectively generated for three-dimensional points included in the first point cloud data so that each of the items of second information corresponds one-to-one with each of the three-dimensional points included in the first point cloud data,
wherein each of the items of second information indicates (i) the three-dimensional point corresponding to the item of second information, (ii) the geometry information indicating the three-dimensional position of the three-dimensional point corresponding to the item of second information, (iii) the one or more items of attribute information of the three-dimensional point corresponding to the item of second information, and (iv) a sensor, among the plurality of sensors indicated in the first information, from which data corresponding to the three-dimensional point is obtained, and
wherein when the first point cloud data is divided into one of more items of second point cloud data, the first point cloud data is divided according to the items of second information.

14. A three-dimensional data decoding device, comprising:
a processor; and
memory,
wherein using the memory, the processor:
decodes a bitstream including (i) encoded data generated by encoding first point cloud data obtained by a plurality of sensors,
wherein for each of three-dimensional points included in the first point cloud data, the first point cloud data includes (i) geometry information indicating a three-dimensional position of the three-dimensional point and (ii) one or more items of attribute information of the three-dimensional point,
wherein the bitstream includes first information including configuration information indicating the plurality of sensors from which the first point cloud data is obtained,
wherein the first information includes items of second information respectively generated for the three-dimensional points included in the first point cloud data so that each of the items of second information corresponds one-to-one with each of the three-dimensional points included in the first point cloud data,
wherein each of the items of second information indicates (i) the three-dimensional point corresponding to the item of second information, (ii) the geometry information indicating the three-dimensional position of the three-dimensional point corresponding to the item of second information, (iii) the one or more items of attribute information of the three-dimensional point corresponding to the item of second information, and (iv) a sensor, among the plurality of sensors indicated in the first information, from which data corresponding to the three-dimensional point is obtained, and
wherein when the first point cloud data is divided into one of more items of second point cloud data, the first point cloud data is divided according to the items of second information.

15. The three-dimensional encoding method according to claim 1, wherein
the one or more items of the second point cloud data each include three-dimensional points assigned with items of the second information having a same value.

16. The three-dimensional encoding method according to claim 1, wherein
the bitstream includes control information,
the control information includes attribute identification information identifying a type of each of the one or more items of the attribute information.

17. The three-dimensional decoding method according to claim 7, wherein
the one or more items of the second point cloud data each include three-dimensional points assigned with items of the second information having a same value.

18. The three-dimensional decoding method according to claim 7, wherein
the bitstream includes control information,
the control information includes attribute identification information identifying a type of each of the one or more items of attribute information.

* * * * *